United States Patent [19]
Gunji et al.

[11] Patent Number: 6,097,841
[45] Date of Patent: Aug. 1, 2000

[54] APPARATUS FOR RECOGNIZING INPUT CHARACTER STRINGS BY INFERENCE

[75] Inventors: Keiko Gunji, Mito; Koyo Katsura, Hitachiohta; Soshiro Kuzunuki, Hitachinaka; Masaki Miura, Hitachi; Toshimi Yokota, Hitachiohta, all of Japan

[73] Assignee: Hitachi, Ltd., Tokyo, Japan

[21] Appl. No.: 08/859,410

[22] Filed: May 20, 1997

[30]     Foreign Application Priority Data

| May 21, 1996 | [JP] | Japan | 8-125360 |
| Aug. 27, 1996 | [JP] | Japan | 8-224808 |
| Oct. 2, 1996 | [JP] | Japan | 8-261936 |

[51] Int. Cl.[7] .................................................. G06K 9/72
[52] U.S. Cl. ................................................... 382/229
[58] Field of Search ................................... 382/228, 229, 382/230, 231

[56]            References Cited

U.S. PATENT DOCUMENTS 5,067,165  11/1991  Nishida ................................ 382/229
5,787,197   7/1998  Beigi et al. ........................... 382/229
5,909,510   6/1999  Nakayama ............................ 382/229

*Primary Examiner*—Christopher S. Kelley
*Attorney, Agent, or Firm*—Antonelli, Terry, Stout & Kraus, LLP

[57]            ABSTRACT

A character recognition apparatus for inferring the entire character string solely from a user-input handwritten keyword and displaying the inferred result as a candidate character string. The apparatus of the invention comprises: a word dictionary storing word identification information and hierarchy information for layering a plurality of words into a hierarchy and for recognizing each of the words within the hierarchy; a character transition probability table a4 storing probabilities of transitions from any one character to another, and those pieces of the word identification information which correspond to combinations of characters resulting from the transitions; and an optimization unit for using the character transition probability table in optimizing candidate character strings obtained by a recognition unit. The word dictionary is searched for a word defined by the word identification information which corresponds to the optimized candidate character string, whereby the searched word is retrieved which applies to the hierarchy information and which has yet to be input.

15 Claims, 40 Drawing Sheets

FIG.25

| A | Null | 茨城製薬 | A4 | トウカリン | X4 | TRN |

PURPOSES OF A MEDICINE RECIPE

- CHRONIC ARTHROPATHY RHEUMATIC
- LUMBAGO
- COLD SYMPTOMS
- PROTEIFORM MYELITIS
- PELVIS INFLAMMATION
- .....

CAUTIONS IN TAKING THE MEDICINE

- BE CAREFUL WHEN PROVIDING THE MEDICINE TO A PATIENT WITH A DIGESTION ULCER, BLOOD TROUBLE

SIDE EFFECTS

- THE SAFETY OF PROVIDING THE MEDICINE TO A PREGNANT WOMAN OR A CHILD IS NOT GUARANTEED
- ERUPTION, HIVES, STOMACH BLEEDING, GIDDINESS AND HEADACHE
- OCCASIONAL BREATHING DIFFICULTY AND LIMB PARALYSIS

CAUTIONS WHEN TAKING OTHER MEDICINES

- LITHIUM ··· EFFECTS ARE STRENGTHENED
- ASPIRIN ··· EFFECTS ARE WEAKENED

FIG.29

BOOK- COLLECTION LEDGER a22

| BOOK-COLLECTION NUMBER | TITLE | AUTHOR | PUBLISHER | KEYWORD |
|---|---|---|---|---|
| ... | ... | ... | ... | ... |
| 11163 | マンマシンインターフェースの設計技術 | 横田他 | YHG社 | ... |
| ... | ... | ... | ... | ... |
| 14273 | マンマシンインターフェースの最適設計 | 山田他 | 日本館 | ... |
| ... | ... | ... | ... | ... |

FIG.30A

BOOK-COLLECTION TABLE a19

| BOOK-COLLECTION NUMBER | TITLE | AUTHOR NUMBER | PUBLISHER NUMBER | KEYWORD NUMBER |
|---|---|---|---|---|
| ... | ... | ... | ... | ... |
| 11163 | マンマシンインターフェースの設計技術 | 29,30 | 3 | ... |
| ... | ... | ... | ... | ... |
| 14273 | マンマシンインターフェースの最適設計 | 40 | 35 | ... |
| ... | ... | ... | ... | ... |

FIG.30B

AUTHOR-NAME TABLE a20

| AUTHOR NUMBER | AUTHOR | BOOK-COLLECTION NUMBER |
|---|---|---|
| ... | | |
| 29 | 横田　登志美 | 11163 |
| ... | | |
| 40 | 山田　耕作 | 20、150 |
| ... | | |

FIG.30C

PUBLISHER TABLE a21

| PUBLISHER NUMBER | PUBLISHER | BOOK-COLLECTION NUMBER |
|---|---|---|
| ... | | |
| 3 | YHG社 | 11163、1164 |
| ... | | |
| 35 | 日本館 | 14273 |
| ... | | |

FIG.32 a12 BOOK-TITLE CHARACTER-TO-CHARACTER TRANSITION PROBABILITY TABLE a12-1 CHARACTER APPEARANCE TABLE

| PRECEDING CHARACTER | ... | サ | シ | ス | セ | ソ | タ | チ | ... |
|---|---|---|---|---|---|---|---|---|---|
| NUMBER OF APPEARANCES | | | | 27 | 108 | | 250 | | | a12-2 CHARACTER-TO-CHARACTER TRANSITION COUNT TABLE

SUCCEEDING CHARACTER

| PRECEDING CHARACTER | ... | サ | シ | ス | セ | ソ | タ | チ | ... |
|---|---|---|---|---|---|---|---|---|---|
| ... | | | | | | | | | |
| サ | | | | | | | | | |
| シ | | | | 17 | | | | | |
| ス | | | | | | | | | |
| セ | | | | | | | | | |
| ソ | | | | | | | | | |
| タ | | | | | | | | | |
| チ | | | | | | | | | |
| ... | | | | | | | | | | a12-3 TABLE OF CHARACTER-TO-CHARACTER TRANSITIONS AND BOOK-COLLECTION NUMBERS

SUCCEEDING CHARACTER

| PRECEDING CHARACTER | ... | サ | シ | ス | セ | ソ | タ | チ | ... |
|---|---|---|---|---|---|---|---|---|---|
| ... | | | | | | | | | |
| サ | | | | | | | | | |
| シ | | | | →Bk,Bk+1...,Bk+16 | | | | | |
| ス | | | | | | | | | |
| セ | | | | | | | | | |
| ソ | | | | | | | | | |
| タ | | | | | | | | | |
| チ | | | | | | | | | |
| ... | | | | | | | | | |

FIG.35

| NUMBER | 12 BOOKS HAVE BEEN FOUND |
|--------|--------------------------|
| 1 | マンマシンインターフェースの設計技術　横田他　YHG社 |
| 2 | マンマシンインターフェースの最適設計　山田他　日本館 |
| 3 | 日立は今インターフェース　横田他　きりん堂 |
| 4 | マリーとボンターフェース　ルター著　よい子の童話社 |
| 5 | お庭の設計　横田太郎　大邸宅社 |

DISPLAY OF SEARCH RESULTS — W3

FIG.39(a)

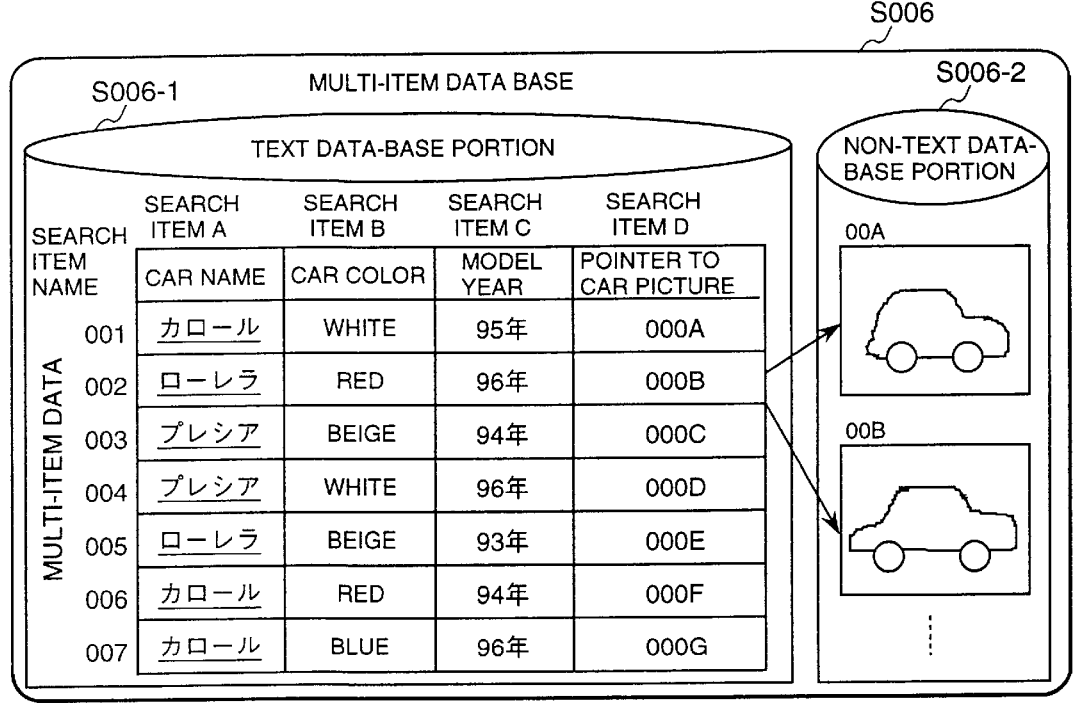

FIG.39(b)

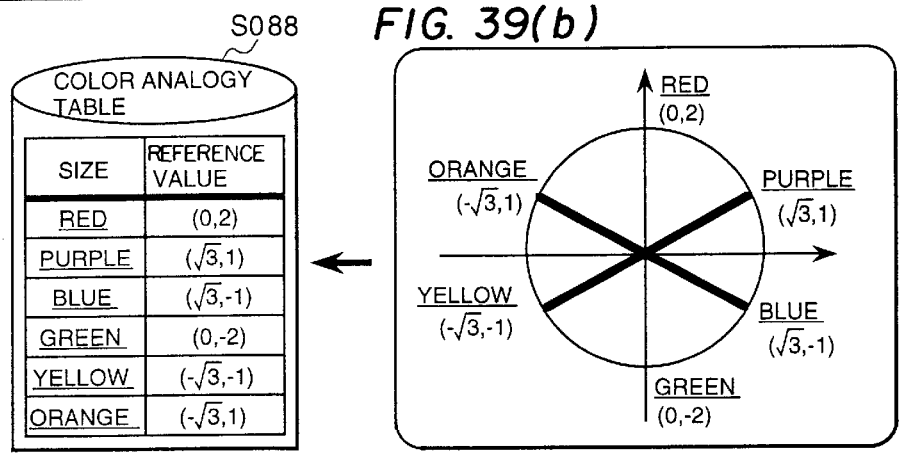

COLOR ANALOGY TABLE S088

| SIZE | REFERENCE VALUE |
|---|---|
| RED | (0,2) |
| PURPLE | (√3,1) |
| BLUE | (√3,-1) |
| GREEN | (0,-2) |
| YELLOW | (-√3,-1) |
| ORANGE | (-√3,1) |

RED (0,2)
ORANGE (-√3,1)
PURPLE (√3,1)
YELLOW (-√3,-1)
BLUE (√3,-1)
GREEN (0,-2)

FIG.39(c)

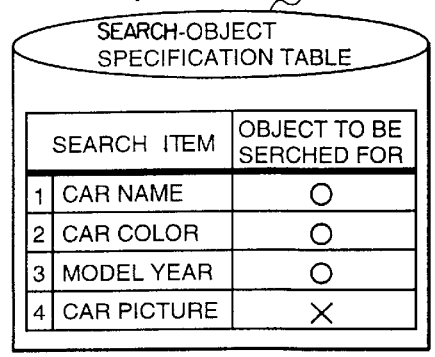

SEARCH-OBJECT SPECIFICATION TABLE S014

| SEARCH ITEM | OBJECT TO BE SERCHED FOR |
|---|---|
| 1 CAR NAME | ○ |
| 2 CAR COLOR | ○ |
| 3 MODEL YEAR | ○ |
| 4 CAR PICTURE | × |

FIG.39(d)

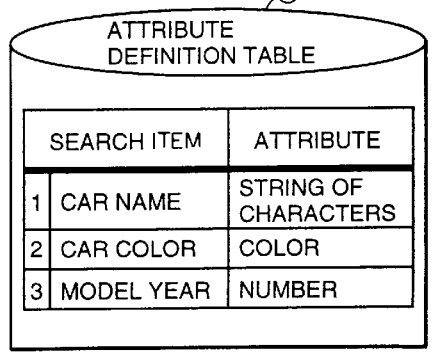

ATTRIBUTE DEFINITION TABLE S015

| SEARCH ITEM | ATTRIBUTE |
|---|---|
| 1 CAR NAME | STRING OF CHARACTERS |
| 2 CAR COLOR | COLOR |
| 3 MODEL YEAR | NUMBER |

FIG.40
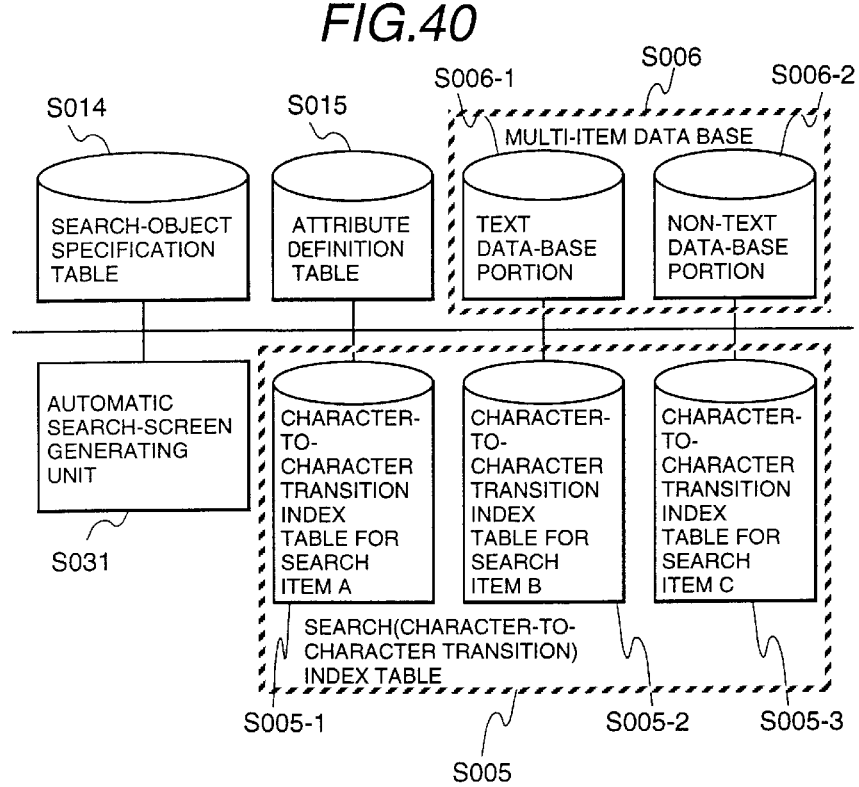
FIG.41(a)　　FIG.41(b)　　FIG.41(c)
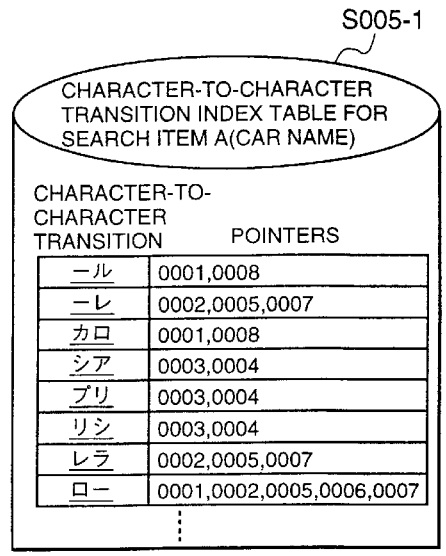 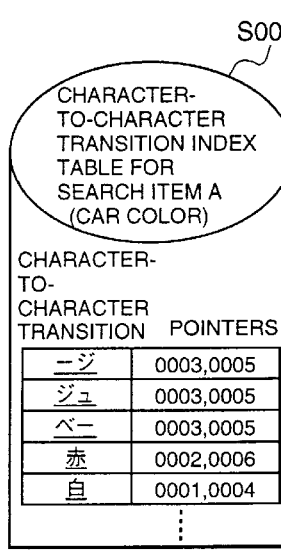 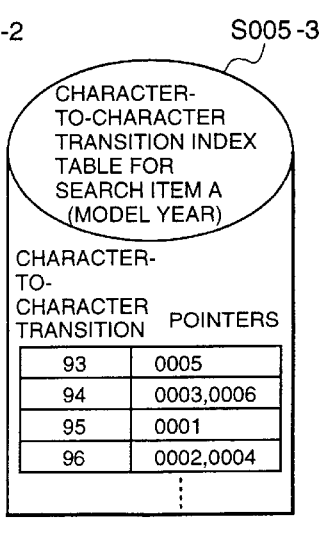

FIG.43

SEARCH-KEYWORD INPUT PALLET

SEARCH-ITEM SPECIFYING KEYWORD

- CAR NAME (FIRST PRIORITY): ロ ー レ
- MODEL YEAR (SECOND PRIORITY): 9 6
- CAR COLOR (THIRD PRIORITY):

FREE KEYWORD

Buttons: CLEAR, SEARCH, CANCEL, CLEAR, SEARCH, CANCEL

FIG.44

CAR INFORMATION : SEARCH RESULTS

| PRIORITY | DATA NUMBER | (SEARCH ITEM A) CAR NAME | (SEARCH ITEM B) CAR COLOR | (SEARCH ITEM C) MODEL YEAR | (SEARCH ITEM D) POINTER TO CAR PICTURE |
|---|---|---|---|---|---|
| 1 | 002 | ローレラ | RED | 95年 | 000A |
| 2 | 002 | ローレラ | BEIGE | 96年 | 000B |
| 3 | 003 | プレシア | RED | 94年 | 000C |
| 3 | 003 | プレシア | RED | 94年 | 000C |

IS A NON-SEARCH OBJECT TO BE DISPLAYED

YES | NO | OK | SQUEEZE | MORE RESULTS | CANCEL

FIG.47(a)
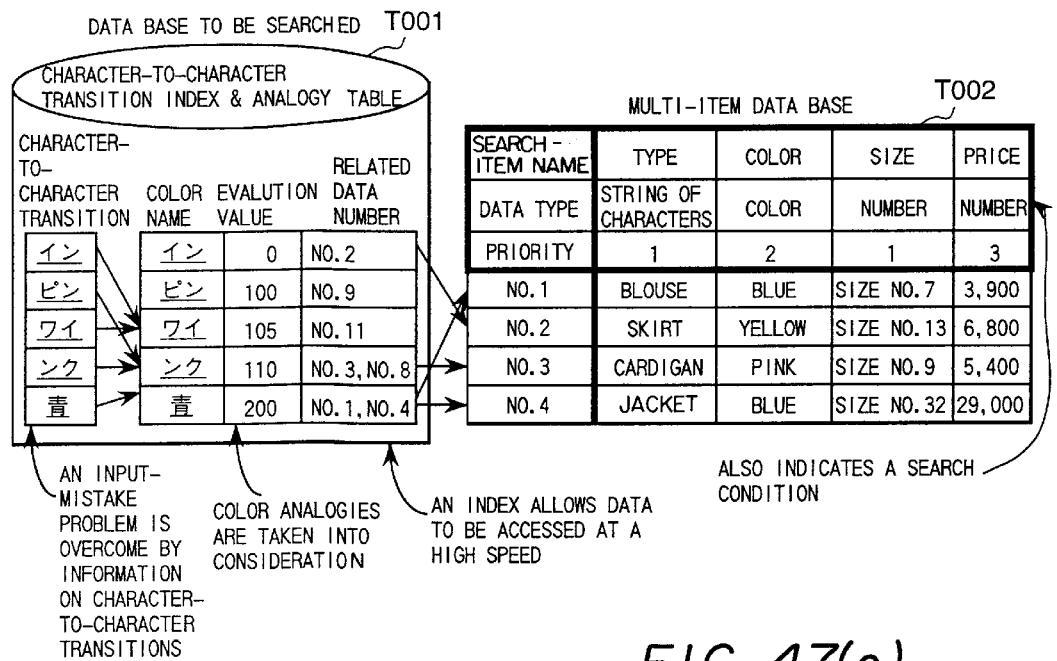
FIG. 47(b)
FIG. 47(c)
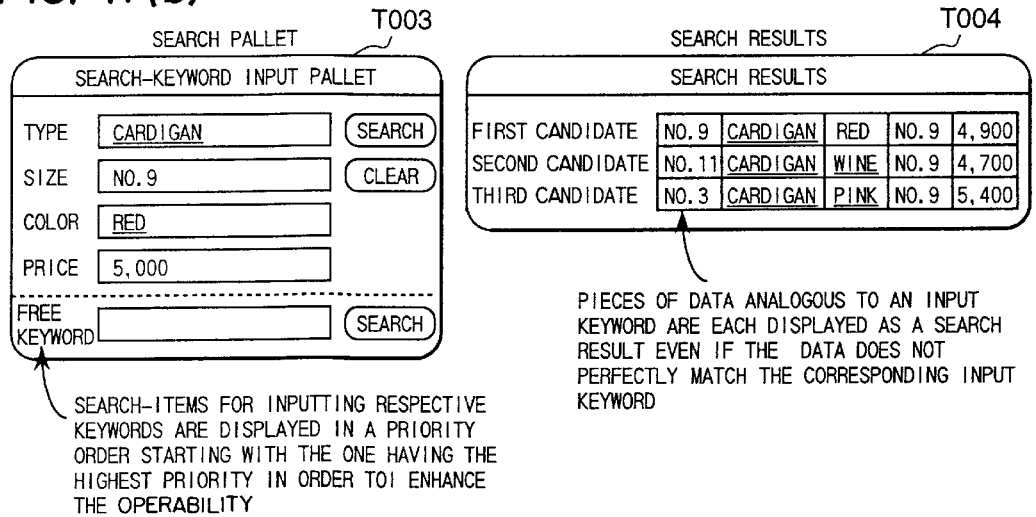

APPARATUS FOR RECOGNIZING INPUT CHARACTER STRINGS BY INFERENCE

BACKGROUND OF THE INVENTION

The present invention relates to a pattern recognition apparatus for recognizing input patterns and displaying recognized results. More particularly, the invention relates to a pattern recognition apparatus to which predetermined character strings, such as addresses and fixed phrases, are handwritten for inputting.

A majority of applications for processing of slips, invoices and other forms by so-called pen PC's (pen-input computers) primarily involve inputting addresses and fixed phrases to the apparatus. Three representative methods have been proposed to have predetermined character strings, such as addresses and fixed phrases, entered: (1) choose from among candidates in a menu format; (2) in a menu-and-character recognition combination format, input a ZIP code to generate a menu-display of candidate addresses to choose from; (3) write by hand characters to be recognized so that their candidates are optimized by use of a word dictionary.

The method (1) above is disclosed illustratively in "Recognition of Handwritten Addresses in Unframed Setup Allowing for Character Position Displacements" (Periodical D-2 of the Institute of Electronics, Information and Communication Engineers of Japan, January, 1994). The method generally involves, given hierarchical data such as addresses, selecting candidate data successively from the top through the bottom layers of hierarchy. For example, "茨城県 (Ibaraki-ken (a prefecture in Japan))" may be followed by "日立市 (Hitachi-shi (city))" which in turn can be followed by "大みか町 (Oomika-cho (town))". One disadvantage of this method is that if a user is not certain whether Hitachi-shi is located in, say, Tochigi-ken or Ibaraki-ken (i.e., the prefectural or topmost category), the user has difficulty selecting illustratively Hitachi-shi.

With the method (2) above, the user need only input a ZIP code, and the system will give a menu-display of code-prompted addresses to choose from. The procedure is relatively simple so long as the user remembers all necessary ZIP codes; they can be difficult to memorize except probably for the user's own ZIP code.

The method (3) above allows handwritten characters to be recognized and their candidates to be optimized through the use of a word dictionary. How this method works is outlined below with reference to some of the accompanying drawings. FIG. 3 is a schematic block diagram of a conventional character recognition apparatus. In FIG. 3, a handwritten pattern input through a tablet a1 is pattern-matched with a recognition dictionary a2 in a character recognition process a3. Candidate characters thus obtained are matched in words with a word dictionary a6 in a word collation. Following the word matching, the applicable words are displayed on an LCD a8.

FIG. 4 is a schematic flow diagram showing how a conventional character recognition apparatus is used to input an address. For example, to input 茨城県 "(Ibaraki-ken (prefecture))", "日立市 Hitachi-shi (city))", "大みか町 (Oomika-cho (town))", the user writes by hand all these characters into a predetermined address input area b1. The handwritten characters are then recognized in the process a3. Candidate characters obtained from the recognition process are matched in words with the word dictionary a6, starting from the highest layer category (i.e., prefectural level). The candidate characters are thus optimized and the results are output as candidate characters.

Conventionally, hierarchical data such as addresses are accessed from the highest hierarchical layer down. This is because the higher the layer is in hierarchy, the smaller will be the amount of data stored so that once the highest layer candidate is determined, the lower candidates are readily inferred therefrom. But suppose that the conventional system receives a keyword "大みか町 (Oomika-cho (town))" for a search through the word dictionary. In that case, the system has no choice but to search through an entire word dictionary which may be as large as 1.5 MB because the layer of the input keyword is unknown. This scheme is thus impractical in applications such as online character recognition where high degrees of responsiveness are required.

A typical word dictionary that stores addresses in Japan may be constituted as follows:

Prefectural Names:
about 50 names×about 3 characters per name×2 bytes per character=about 300 B in capacity Cities and Towns:
about 4,000 names×about 3 characters per name×2 bytes per character=about 2.5 kB in capacity Subordinate Municipalities:
about 160,000 names×about 4 characters per name×2 bytes per character=about 1.3 MB in capacity The total volume of data in such a representative dictionary is about 1.5 MB.

One disadvantage of the above conventional method is the chores that the user must put up with in writing by hand the entire address desired, which can be as long as, say, "茨城県 (Ibaraki-ken), 日立市 (Hitachi-shi), 大みか町 (Oomika-cho)".

One problem common to all three methods (1) through (3) outlined above is that in character recognition applications, the user is subject to the tedious task of writing by hand all character strings such as addresses and fixed phrases. Another common problem is that a search through the word dictionary for a word in any layer other than the topmost layer of hierarchy can take a very long time. A further problem is that in a menu-driven environment of a hierarchical data structure illustratively made up of addresses, lower-layer items cannot be selected unless their upward items are known.

It is therefore an object of the present invention to provide a pattern recognition apparatus for accepting only key characters (e.g, "大みか (Oomika)" or "~みか町 (~Mika-cho") written by hand in order to infer the remaining character string (e.g., "茨城県 (Iaragi-ken), 日立市 (Hitachi-shi"), whereby the entire character string recognized is output (e.g., "茨城県 (Ibaraki-ken), 日立市 (Hitachi-shi), 大みか町 (Oomika-cho)").

SUMMARY OF THE INVENTION

In carrying out the invention and according to one aspect thereof, there is provided a character recognition apparatus having recognition means for recognizing input character strings and display means for displaying recognized results, the character recognition apparatus comprising: a word dictionary storing word identification information and hierarchy information for layering a plurality of words into a hierarchy and for recognizing each of the words within the hierarchy; a character transition probability table storing at least probabilities of transitions from any one character to another, and those pieces of the word identification information which correspond to combinations of characters resulting from the transitions; optimization means for using the character transition probability table in optimizing candidate character strings obtained by the recognition means; and retrieval means for searching through the word dictionary for words defined by those pieces of the word identification information which correspond to the optimized candidate character string, thereby retrieving the searched words which are identified by the applicable pieces of the hierarchy information and which have yet to be input.

When characters of a low hierarchical level such as "Oomika-cho" alone are input, the inventive character recognition apparatus outlined above first extracts "Oomika-cho" as the candidate character string optimized by the optimization means. The word dictionary is then searched for higher-level words on the basis of the word identification information corresponding to the optimized character string. The search yields yet-to-be input words "Ibaraki-ken, Hitachi-shi," higher in hierarchy than the input "Oomika-cho." The recognized result is "Ibaraki-ken, Hitachi-shi, Oomika-cho," the entire character string made up of the entered and unentered words.

According to another aspect of the invention, there is provided a character recognition apparatus having recognition means for recognizing input character strings and display means for displaying recognized results, the character recognition apparatus comprising: a dictionary having each of a plurality of character strings stored beforehand at a specific address; a character transition probability table storing at least probabilities of transitions from any one character to another, the probabilities being stored in correspondence with the addresses of those of the character strings which include combined characters involved in the transitions; and optimization means for using the character transition probability table in optimizing candidate character strings obtained by the recognition means; wherein the dictionary is accessed for the addresses of the character strings corresponding to the optimized candidate character string, and wherein the character strings at the addresses in the dictionary are displayed as recognized results.

BRIEF DESCRIPTION OF THE DRAWINGS

FIG. 25 is an explanatory diagram showing a table describing purposes of a recipe of each medicine, cautions in taking the medicine, side effects of the medicine and cautions when taking other medicines;

FIG. 29 is a diagram showing the structure of a book-collection ledger;

FIGS. 30(a), 30(b) and 30(c) are diagrams showing a book-collection table, an author-name table and a publisher table respectively;

FIG. 32 is a diagram showing another structure of the book-title character-to-character transition probability table;

FIG. 35 is a diagram showing an example of a display of a search result produced by library search processing;

FIGS. 39(a) to 39(d) are diagrams showing tables used in a search of a multi-item data base including non-text data such as pictures;

FIG. 40 is a diagram showing the configuration of a search-index creating tool;

FIGS. 41(a) to 41(c) are diagrams showing examples of character-to-character transition index tables;

FIG. 43 is a diagram showing an example of a search keyword input pallet;

FIG. 44 is a diagram an example of a search-result displaying pallet;

FIGS. 47(a) to 47(c) are diagrams showing an outline of a search tolerating an ambiguous input using a table containing indexes each linking a character-to-character transition to a word and a degree of analogy for the index.

DETAILED DESCRIPTION OF THE PREFERRED EMBODIMENTS

A preferred embodiment of the invention will now be described with reference to the accompanying drawings, the embodiment operating to receive a handwritten address for character recognition.

Figure 2:
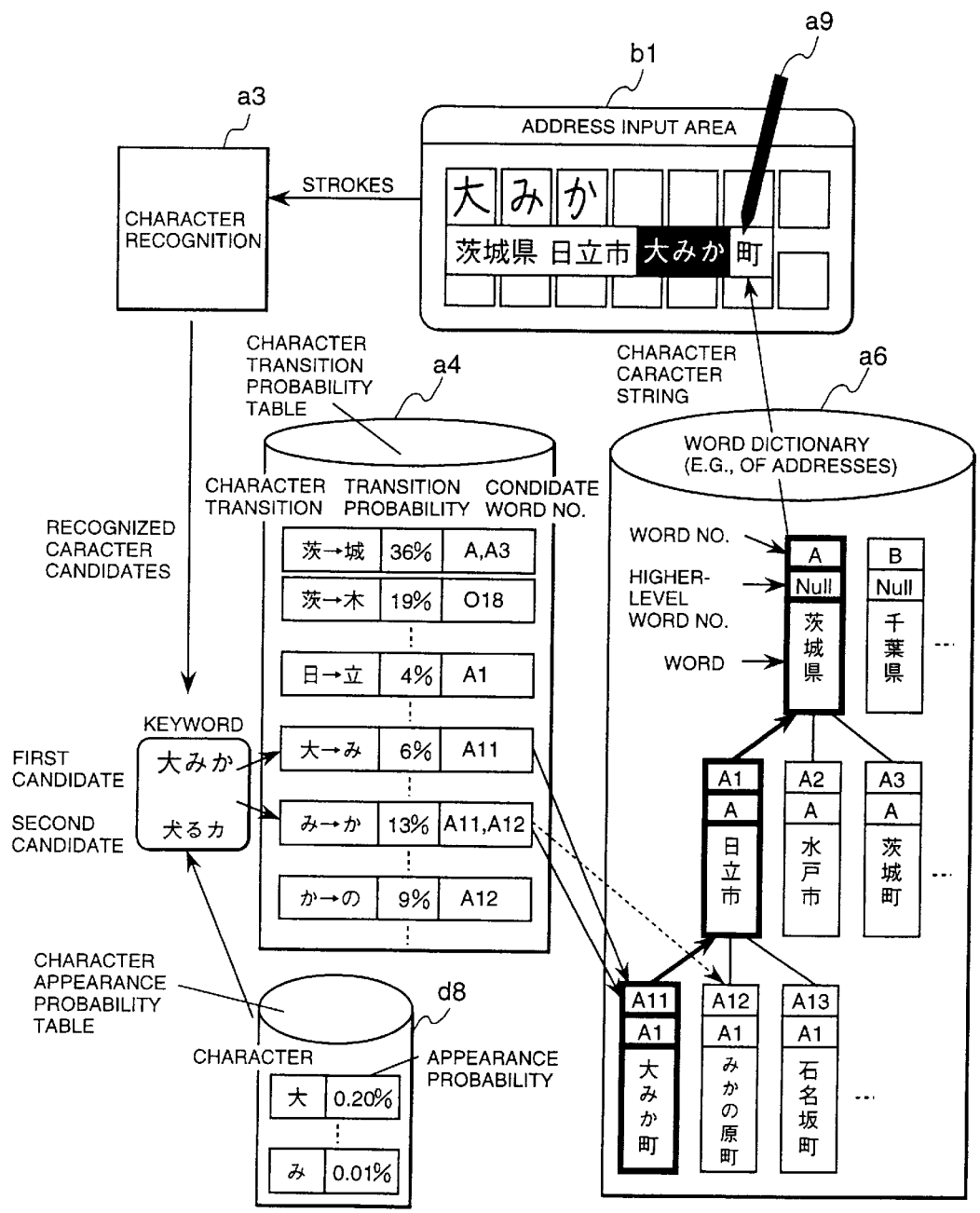
FIG. 2 is a schematic flow diagram outlining how the handwritten input address recognition apparatus embodying the invention works.
Figure 4:
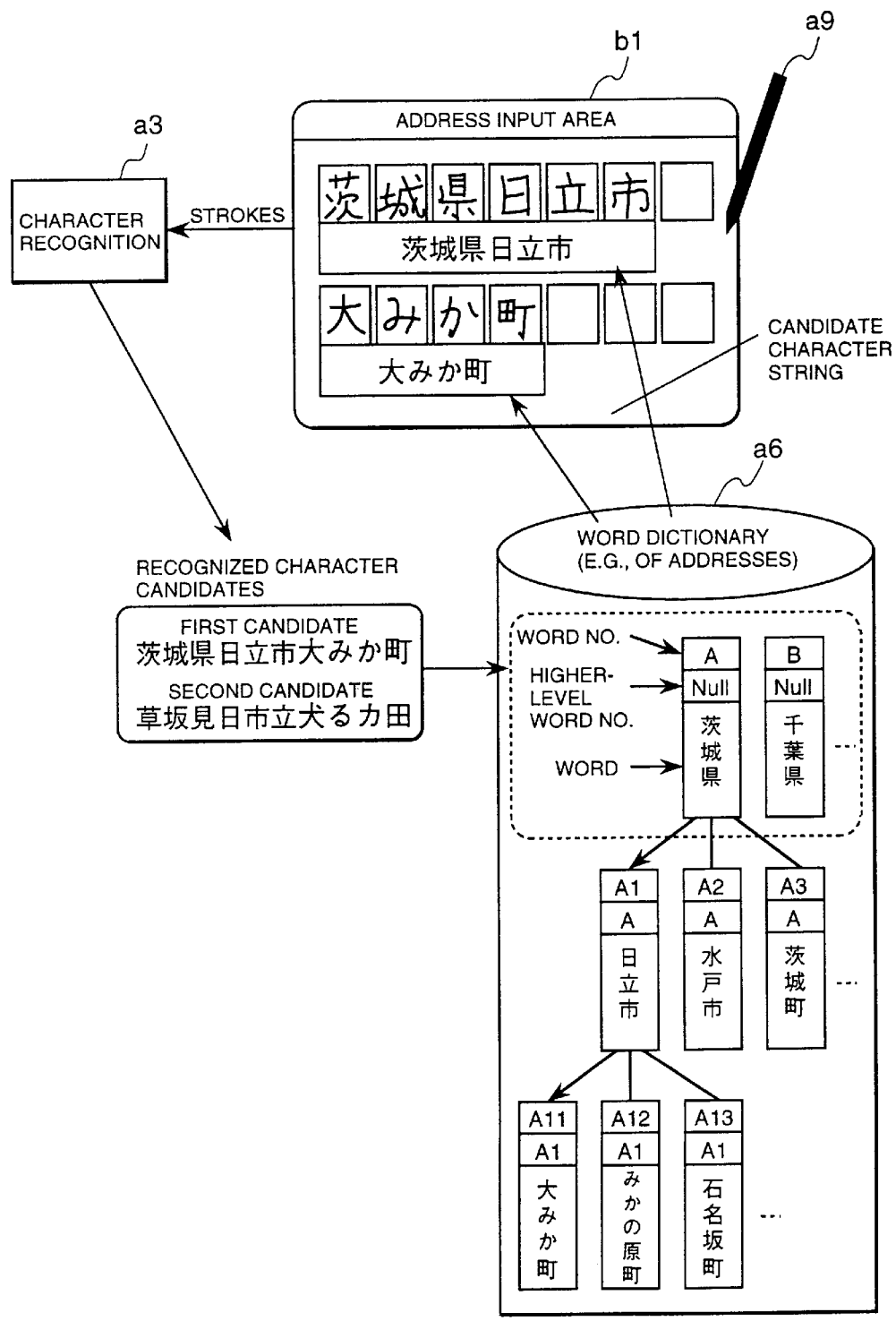
FIG. 4 is a schematic flow diagram showing how the conventional character recognition apparatus is used to input an address.

FIG. 2 is a schematic flow diagram outlining how a handwritten input address recognition apparatus embodying the invention works. A user illustratively writes a keyword "Oomika" to an address input area b1 with a stylus pen a9. Handwritten strokes are recognized in a character recognition process a3. The recognition process produces a first candidate character string "大みか (Oomika)" and a second candidate "犬るか (Inuruka)" based on the keyword. Given the candidate character strings, a transition probability table a4 is referenced for the probabilities of character-to-character transitions in the strings (e.g., probability of transition from character A to character B). Then a character appearance probability table is referenced for the appearance probabilities of the characters involved. The orders of the candidate characters are optimized so as to maximize the appearance probabilities of the character strings. The character transition probability table is further referenced for candidate word numbers, whereby pointers to the words including the character-to-character transitions in the candidate character strings are obtained. In the example of FIG. 2, the probabilities of word appearances are maximized when the candidate characters are combined into "大みか (Oomika)", so that a pointer No. A11 pointing to a word comprising a "大(oo)" to "み (mi)" transition and a "み (Mi)" to "か (ka)" transition is obtained from the character transition probability table. Under this scheme, a target word is accessed quickly when pointers to words in the word dictionary are provided in the character transition probability table for use in the post-processing of character recognition. Once the appropriate word is found in the word dictionary, the layer information about that word in the dictionary allows the applicable higher layer or layers to be identified uniquely. In the example of FIG. 2, the upper layer words are uniquely obtained as "茨城県 (Ibaraki-ken), 日立市 (Hitachi-shi)". That is, simply writing "大みか (Oomika)" by hand causes the target address "茨城県 (Ibaraki-ken), 日立市 (Hitachi-shi), 大みか町 (Oomika-cho)" to be displayed as the probable candidate and input as such.

Figure 1:
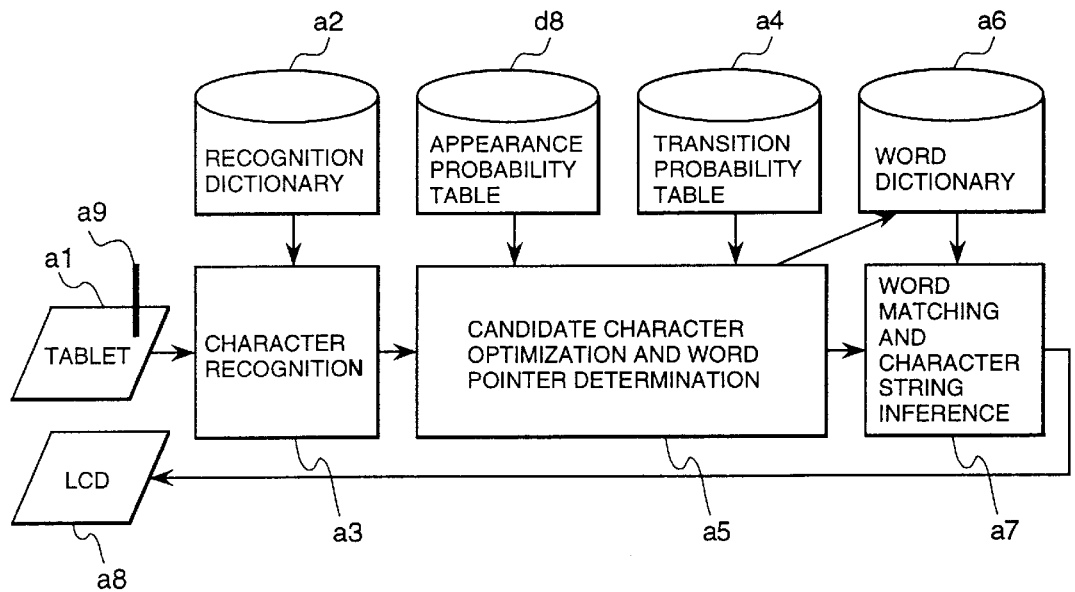
FIG. 1 is a functional block diagram of a handwritten input address recognition apparatus embodying the invention.
Figure 3:
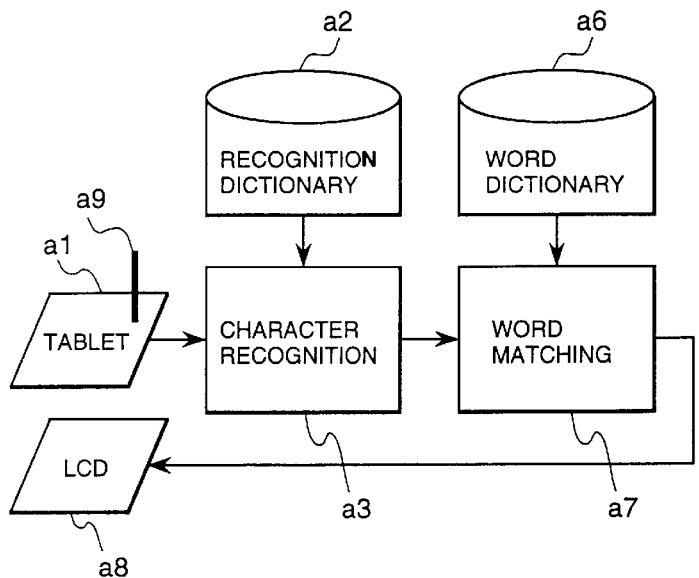
FIG. 3 is a schematic block diagram of a conventional character recognition apparatus.

FIG. 1 is a functional block diagram of the handwritten input address recognition apparatus embodying the invention. How the embodiment works is outlined below with reference to FIG. 1. Sliding the stylus pen a9 over the tablet a1 inputs handwritten character patterns. The handwritten patterns thus input are matched with character patterns held in the recognition dictionary a2 in the character recognition process a3. The recognition process yields candidate characters whose orders are optimized by referencing two tables created in advance through learning. One of the tables is the transition probability table a4 containing the probabilities of character-to-character transitions as well as the pointers to those candidate words in the word dictionary which include such transitions. The other table to be referenced is the character appearance probability table d8 comprising the probabilities of character appearances. In optimization, the candidate characters are optimally sequenced so as to maximize the probabilities of the characters appearing as character strings. Concurrently, pointers are determined which point to those words in the word dictionary which are applicable to the optimized character strings (in process a5). The words obtained as described above from the word dictionary a6 are matched with the candidate character strings, and information about each applicable word and about the words preceding and following the word is acquired from layer information in the word dictionary (in process a7). The obtained results are displayed on the LCD a8.

There are four major aspects to be considered in implementing this invention: (1) how to create the transition probability table a4; (2) how to optimize the orders of candidate characters so as to maximize the probabilities of the characters appearing as character strings, and how to find pointers to the words including the character-to-character transitions in the optimized character strings; (3) how to infer the character string including the handwritten input word (i.e., keyword) using the pointer of the words detected; and (4) how to display an inferred character string. These aspects will be described later in more detail.

Figure 5:
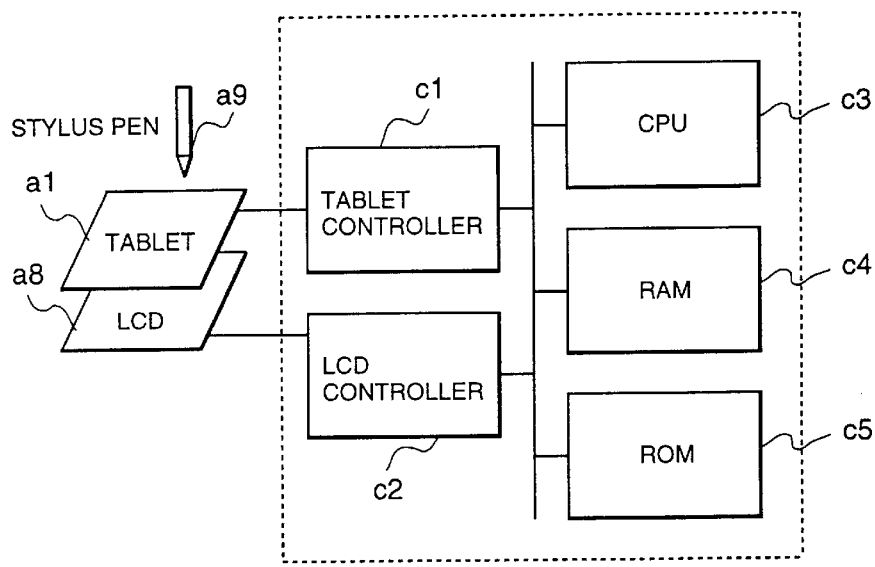
FIG. 5 is a hardware block diagram of the handwritten input address recognition apparatus embodying the invention.

FIG. 5 is a hardware block diagram of the handwritten input address recognition apparatus embodying the invention. The apparatus comprises a function for matching input patterns with dictionary patterns; a function for optimizing candidate characters obtained from pattern matching and finding pointers to the words including the candidate characters; and a function for matching the candidate characters with words so as to retrieve information about the words preceding and following each of these words. Any one of these functions is carried out illustratively by a CPU c3 executing the corresponding program retrieved from a ROM c5. The functions will be described later in more detail with reference to the applicable drawings.

[1] How to Create the Transition Probability Table a4

Figure 6:
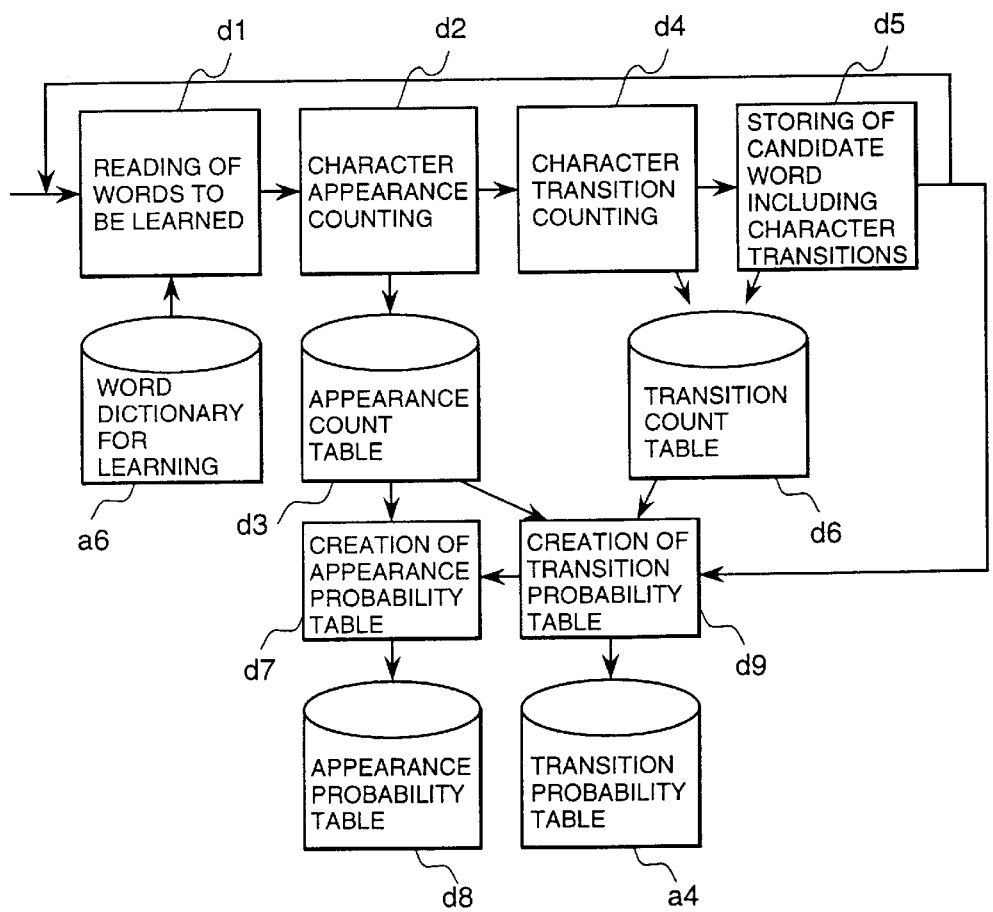
FIG. 6 is a schematic flow diagram showing steps for creating a character transition probability table.

FIG. 6 is a schematic flow diagram showing steps for creating the transition probability table a4. In step d1, the word dictionary a6 is read out for learning purposes. With any one word retrieved from the dictionary, the number of times each component character appears in the word is counted (step d2). The character appearance counts are written to a character appearance count table d3. Then character-to-character transitions in the word are counted (step d4). The transition counts are written to a character transition count table d6. The word number (i.e., word pointer) of the original word containing the character-to-character transitions is written to the character transition count table d6 (step d5). Illustratively, in the case of a Japanese word "大みか町 (Oomika)", the component Japanese characters "大(Oo)", "み (mi)" and "か (ka)" each appear once and are thus counted once for appearance each. Likewise, an "大(Oo)" to "み (mi)" transition and a "み (mi)" to "か (ka)" transition in the word are each counted once. The word number of the word "大みか (Oomika)" is written to the candidate word number of the "大 (Oo)" to "み (mi)" transition and to that of the "み (mi)" to "か (ka)" transition. The above steps d1 through d6 are repeated for all words in the word dictionary a6. Thereafter, the character appearance count table d3 and character transition count table d6 thus created are referenced in order to prepare a transition probability table a4 describing character-to-character transition probabilities and information about word numbers of the candidate words including such transitions (step d9). If necessary, the character appearance count table d3 is further referenced to create a character appearance probability table d8 describing the appearance probability of each of the characters involved (step d7). The constitutions of these tables will be described later with reference to the applicable drawings.

Figure 7:
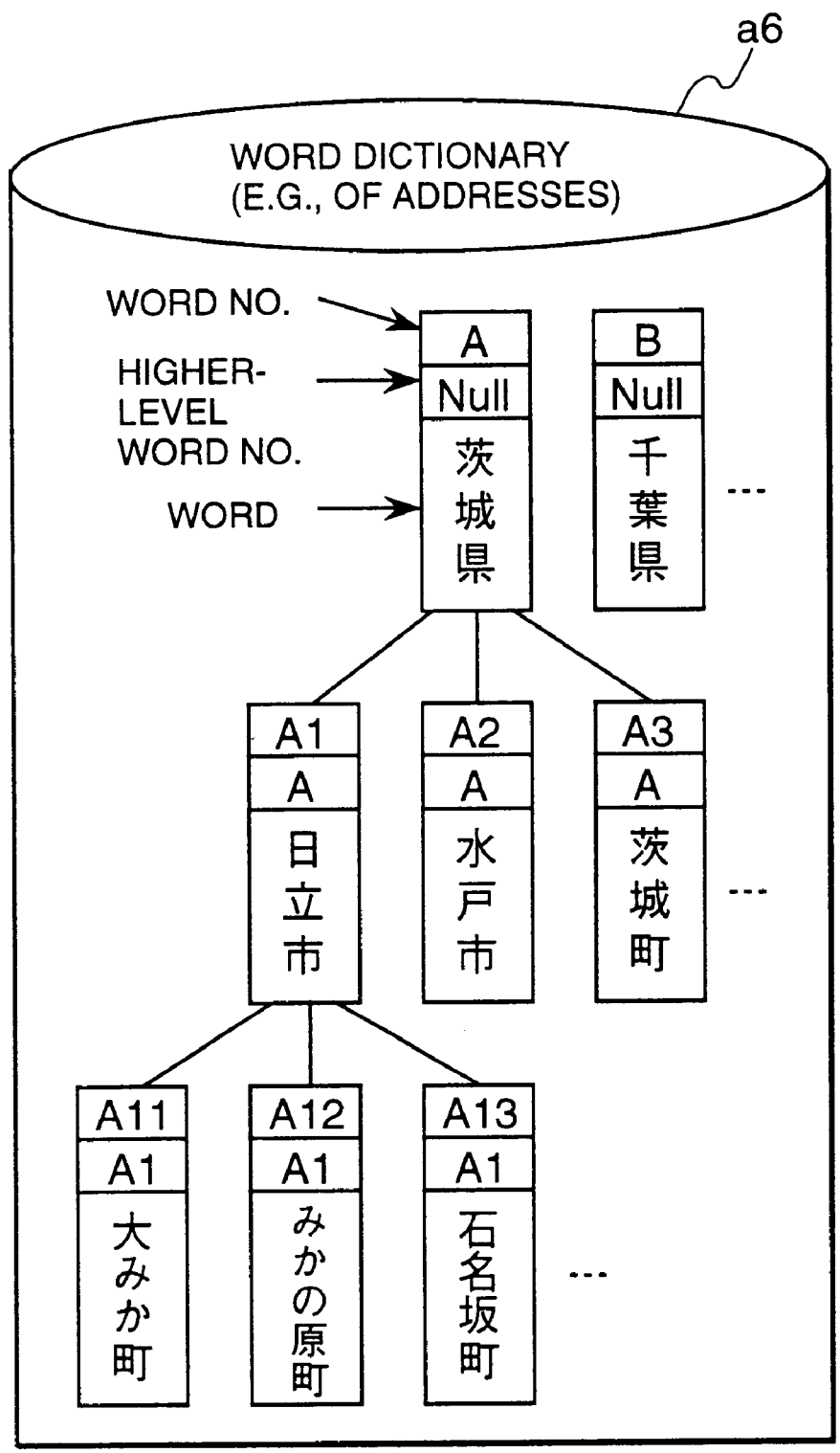
FIG. 7 is a schematic diagram of a typical word dictionary.

FIG. 7 is a schematic view of a typical word dictionary. Shown in FIG. 7 is an address word dictionary a6 of a hierarchical structure made up of the names of prefectures, cities, towns and subordinate municipalities in Japan. The component items constituting the dictionary are each made of a word number (i.e., word location information), a higher-level word number, and a word (character string). Each word is accessed through the use of its word number. The hierarchical relation of each word is identified by its higher-level word number.

Figure 8:
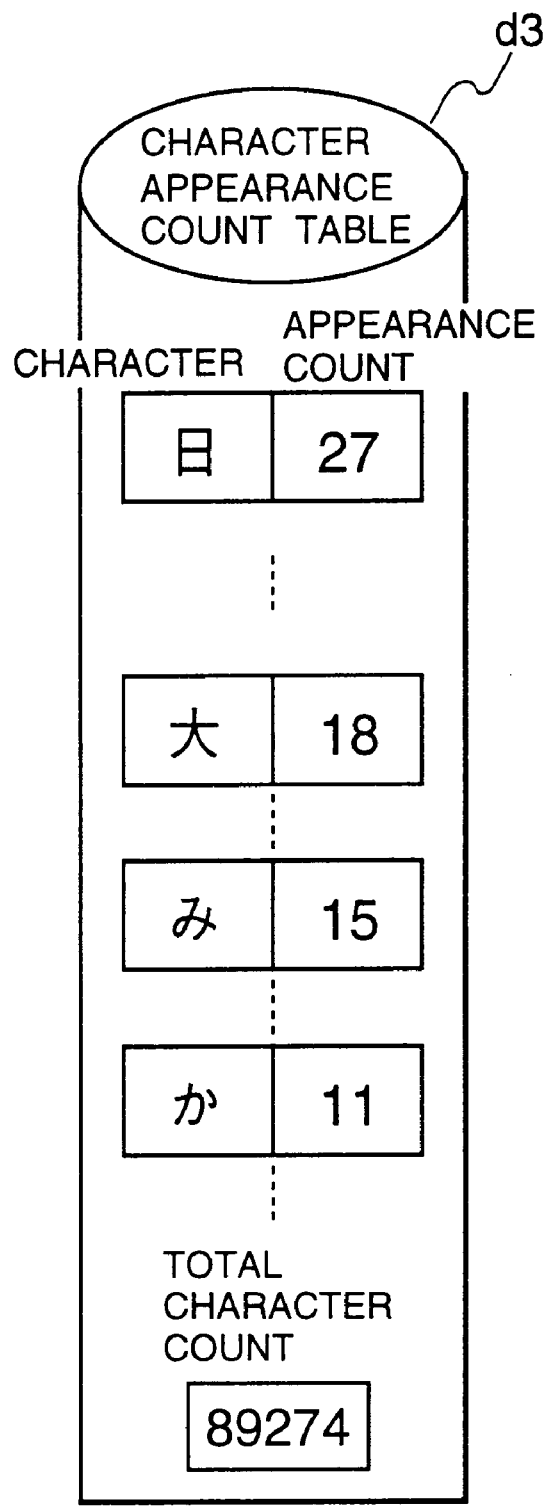
FIG. 8 is a schematic diagram of a typical character appearance count table.

FIG. 8 is a schematic view of a typical character appearance count table. The character appearance count table d3 stores the number of times each character appears in the word dictionary for learning. As such, the table d3 is used to count the number of times each character appears in the words to be learned.

Figure 9:
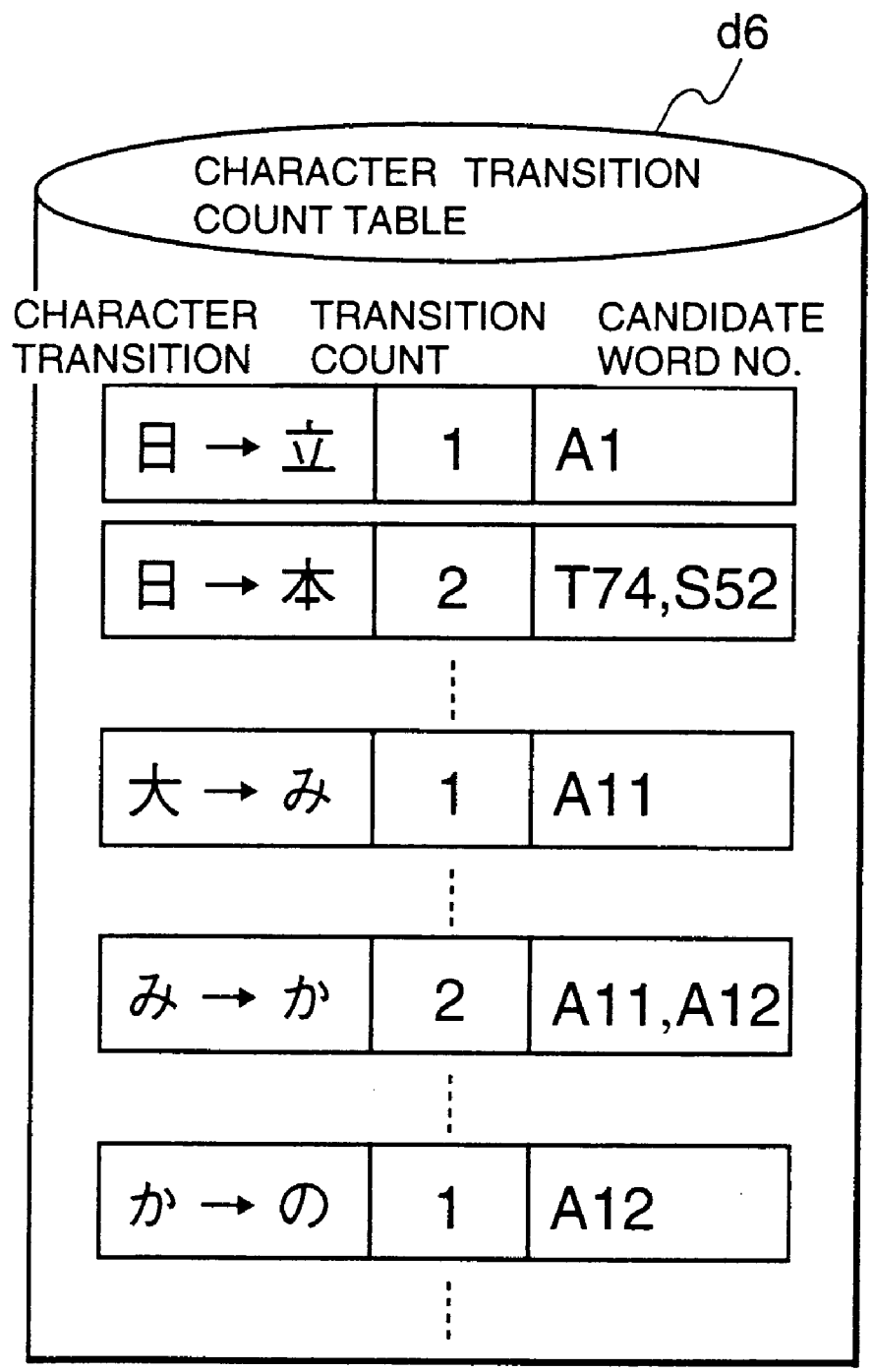
FIG. 9 is a schematic diagram of a typical character transition count table.

FIG. 9 is a schematic view of a typical character transition count table. The character transition count table d6 stores the number of times each of the character-to-character transitions appears in the word dictionary for learning, and the numbers of words including such transitions (i.e., candidate character numbers).

Figure 10:
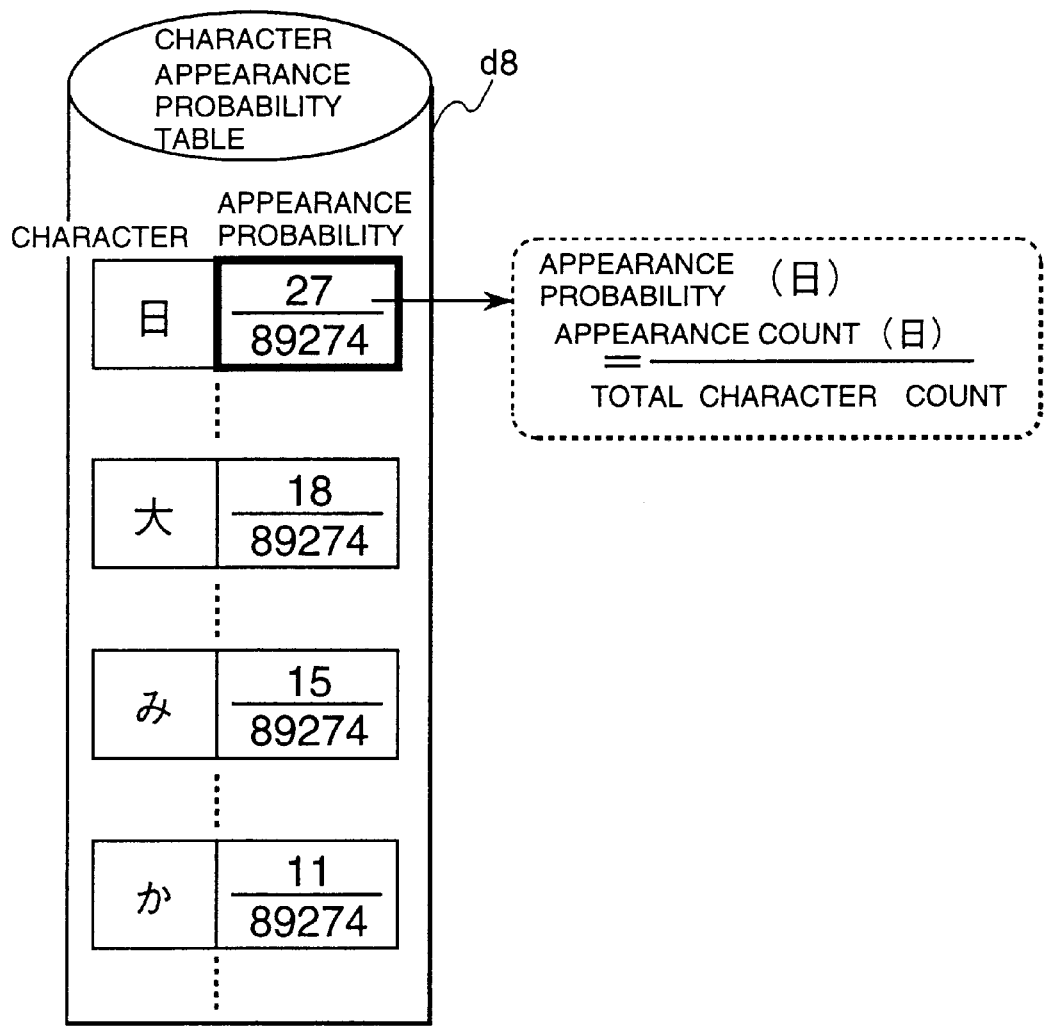
FIG. 10 is a schematic diagram of a typical character appearance probability table.

FIG. 10 is a schematic view of a typical character appearance probability table. Illustratively, the appearance probability of a Japanese character "hi" is given as the number of times the character "hi" appears, divided by the total number of characters. Thus the character appearance probability table d8 is created by first referencing the character appearance count table d3 to find the appearance count of each character involved. The appearance counts thus obtained are written to the character appearance probability table d8.

Figure 11:
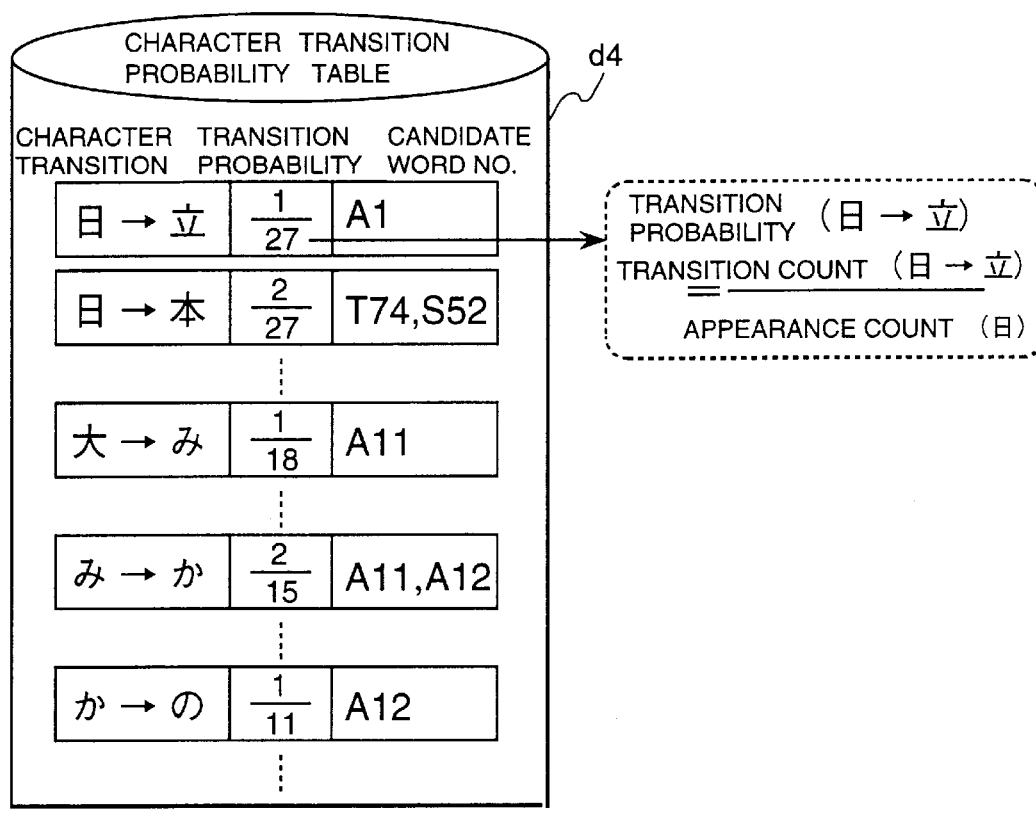
FIG. 11 is a schematic diagram of a typical character transition probability table.

FIG. 11 is a schematic view of a typical character transition probability table. Illustratively, the probability of a "日 (hi)" to "立 (tachi)" transition is expressed as the number of "日 (hi)" to "立 (tachi)" transitions taking place, divided by the number of "日 (hi)" appearances. Thus the character transition probability table a4 is created by first referencing the character appearance count table d3 and character transition count table d6 to find the transition probability of each character. The probabilities thus acquired are written to the character transition probability table a4.

Carrying out the processes above creates the transition probability table a4 having pointers to the words in the word dictionary. Although the embodiment above uses word numbers as word identification information for identifying each of the words in the dictionary, this is not an absolute requirement of the invention. Alternatively, code information may be used as word identification information. In addition, although the embodiment above uses higher-level word numbers as hierarchical information representing the hierarchical relations between the words in the word dictionary, this is not an absolute requirement of the invention. Alternatively, any other type of information such as code information may be used to denote the hierarchical relations between the words.

[2] Post-Processing Based on Transition Probabilities
(i.e., How to Optimize Candidate Characters and How to Determine Pointers to Candidate Words)

Figure 12:
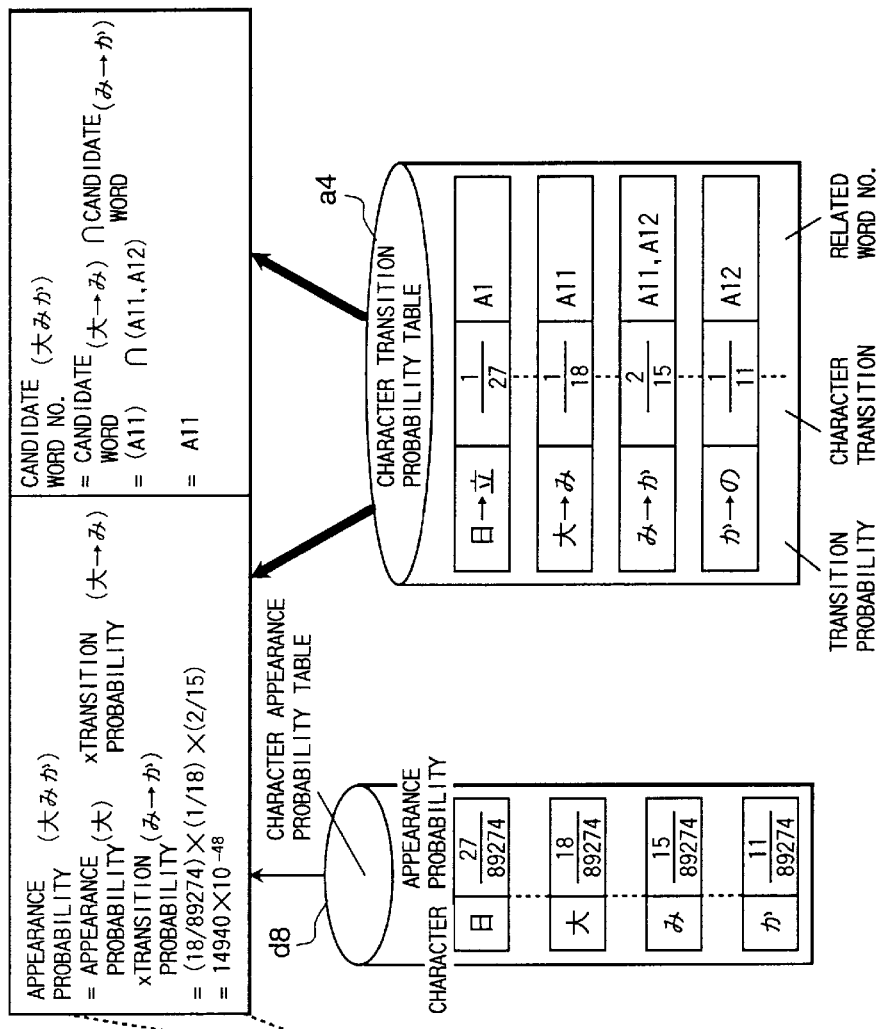
FIG. 12 is a schematic flow diagram of post-processing of character recognition by use of a transition probability table.

FIG. 12 is a schematic flow diagram of post-processing of character recognition by use of a transition probability table. As shown in FIG. 12, it is assumed that an input pattern "大みか町 (Oomika)" has a first candidate character string "犬るか (Inuruka)" and a second candidate character string "犬みか (Kenmika)". That is, contrary to the example in FIG. 2, the input character string "大みか (Oomika)" is assumed here to be incorrectly recognized. In this case, as will be described below, the faulty result of character recognition is nevertheless circumvented by optimizing the candidate characters based on their transition probabilities. There are eight probable candidate character combinations as indicated in FIG. 12. For each of these character strings, the character transition probability table is referenced to find the appearance probability of the character string in question and to obtain pointers to candidate words in the word dictionary. The combination of the candidate characters into the character string with the highest appearance probability is the optimum candidate character combination. The character combination is regarded, together with the candidate word number, as the result of the post-processing based on transition probability processing.

The appearance probability of character strings is calculated as follows: generally, the appearance probability of character strings $S1, S2, \ldots, Sn$ is approximated by use of the following expression:

$$\text{Appearance probability } (S1, S2, \ldots, Sn) = \text{appearance probability } (S1) \times \text{transition probability } (S1 \to S2) \times \ldots \times \text{transition probability } (Sn-1 \to Sn) \quad (1)$$

The appearance probability of, say, character combination No. 3 "大みか (Oomika)" in FIG. 12 is calculated as:

Appearance probability ("大みか (Oomika)")
=appearance probability ("大(Oo)")×transition probability ("大 (Oo)"→"み (mi)")×transition probability ("み (mi)"→"か (ka)")

More specifically, the desired probability is obtained by referencing the transition probability table a4 and appearance probability table a8 as follows:

$$\text{Appearance probability} (\text{"大みか (Oomika)"}) = (18/89{,}274) \times \quad (2)$$
$$(1/18) \times (2/15) \times$$
$$(2/198)$$
$$= 14{,}940 \times 108^{-8\%}$$

Described below is how the candidate word number is acquired (i.e., how to find pointer 0 to the word candidate in the word dictionary). Illustratively, the candidate word number for character strings S1, S2, ..., Sn is obtained by use of the expression:

Candidate word No. $(S1, S2, \ldots, Sn)$=candidate word No. $(S1 \rightarrow S2) \cap \ldots \cap$ candidate word No. $(Sn-1 \rightarrow Sn)$    (3)

The character string "大みか (Oomika)" in FIG. 12 is given the candidate word number acquired by referencing the character transition probability table a4 and using the expression:

Candidate word No. ("大みか (Oomika)")=∩candidate word No. ("(Oo)"→"(mi)")∩candidate word No. ("mi"→"ka")= (A11)∩(A11,A12)=A11    (4)

In the above example, the candidate word numbers are AND'ed (∩) so as to reduce the candidates to "大みか町 (Oomika-cho)" (A11). Alternatively, the candidate word numbers may be OR'ed (∪) so that "大みか町 (Oomika-cho)" and "みかの原町 (Mikanohara-cho)" may be selected as candidates. In the alternative case, the word "大みか町 (Oomika-cho)" may be selected as the first candidate based on the character count.

In the manner described, the candidate characters obtained from the character recognition process are optimized into the character string having a significantly high appearance probability. The candidate word number of the optimized candidate character string (i.e., pointer to the word) is then acquired. With the above method, inputting only part of the word "大みか町 (Oomika-cho)" (e.g., "みか (mika)") still evokes two candidates, "大みか町 (Oomika-cho)" and "みかの原町 (Mikanohara-cho)".

[3] How to Infer the Character String Including the Handwritten Input Word (i.e., Keyword)

How to infer the entire character string including the optimized candidate character string (i.e., handwritten input keyword) is described below with reference to the applicable drawings.

Figure 13:
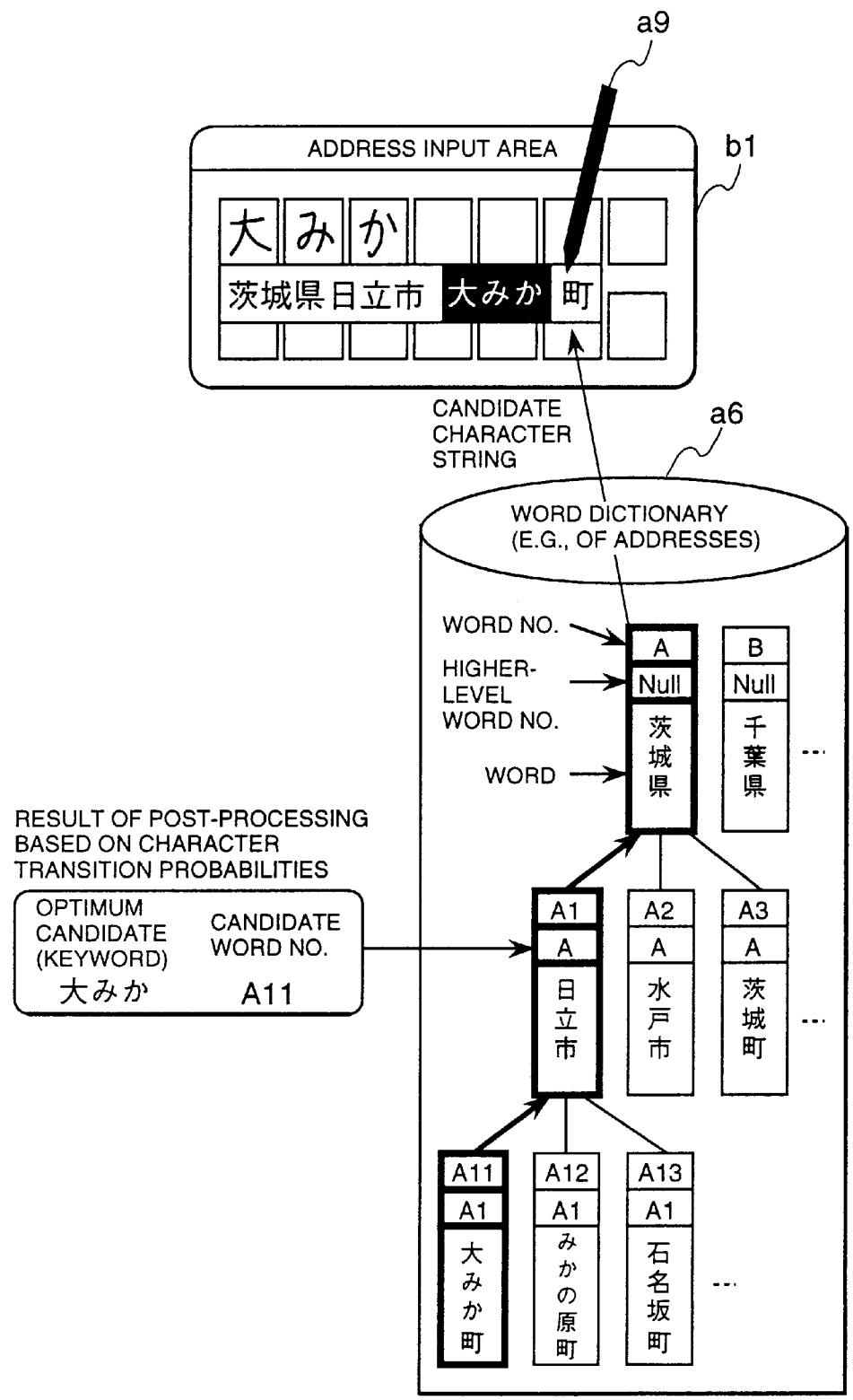
FIG. 13 is a schematic flow diagram showing how a character string is illustratively inferred from the result of post-processing.

FIG. 13 is a schematic flow diagram showing how a character string is illustratively inferred from the result of post-processing. In the example of FIG. 13, the post-processing based on transition probabilities yields a keyword "大みか (Oomika)" (candidate characters) and candidate word No. A11. As illustrated, only one word "大みか (Oomika)" exists as a keyword in the word dictionary. Because the word "大みか (Oomika)" is in the lowest layer of hierarchy, the upper-level character string "茨城県日立市 (Ibaraki-ken, Hitachi-shi)" is uniquely determined. As a result of overall inference based on the handwritten characters "大みか (Oomika)", a candidate character string "茨城県日立市大みか町 (Ibaraki-ken, Hitachi-shi, Oomika-cho)" is displayed.

Figure 22:
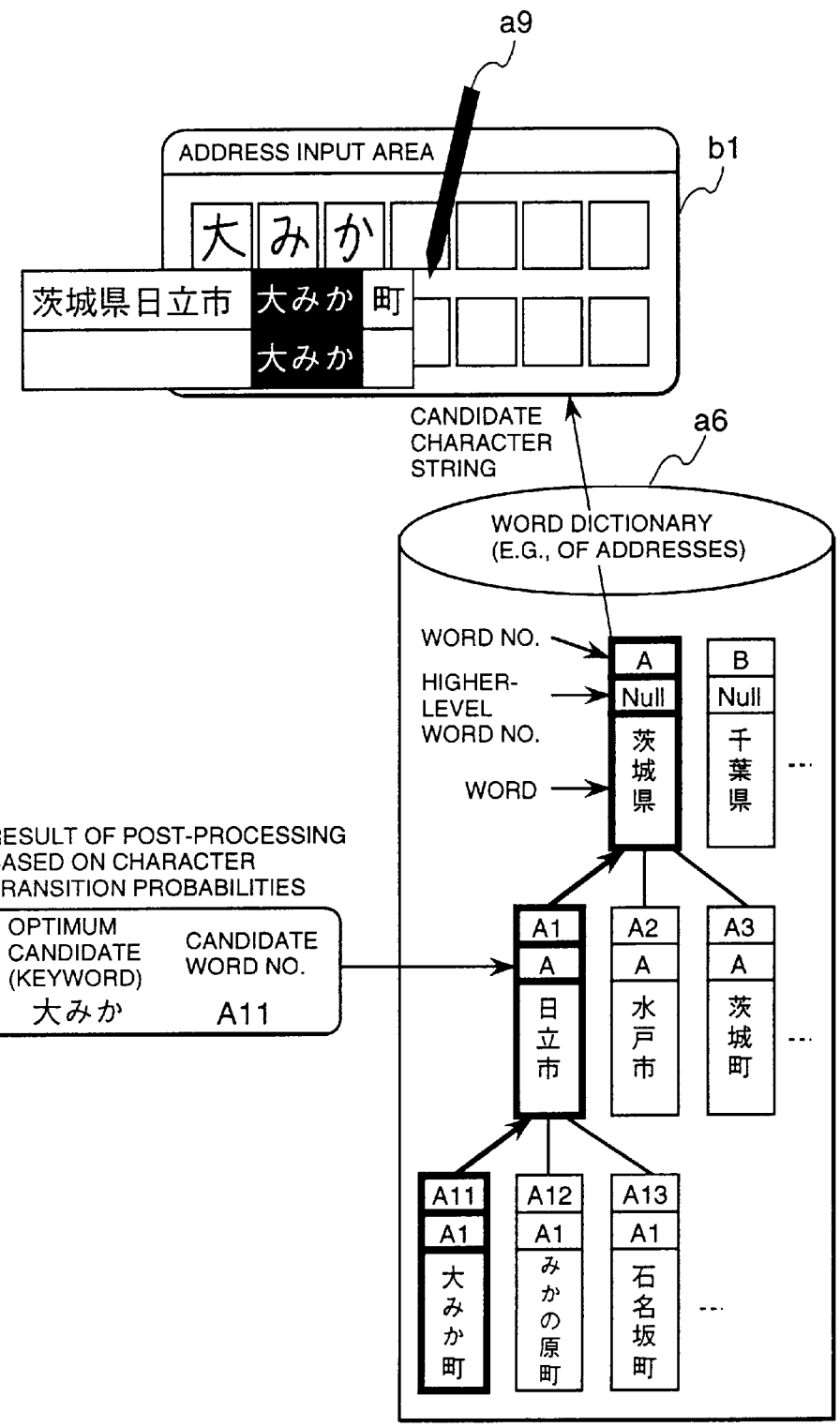
FIG. 22 is another schematic flow diagram showing how a character string is illustratively inferred from the result of post-processing.

What is shown in FIG. 22 is similar to the example of FIG. 13, except that the example of FIG. 22 submits two candidate character strings for the handwritten characters "大みか (Oomika)". One candidate is "茨城県日立市大みか町 (Ibaraki-ken, Hitachi-shi, Oomika-cho)" resulting from character string inference, and the other candidate is "大みか町 (Oomika-cho)" from character recognition without inference processing, so that the user may choose one of the two candidates. An advantage of this setup is that the user is given a choice between a character string inferred from a keyword, and the keyword alone without inference.

Figure 14:
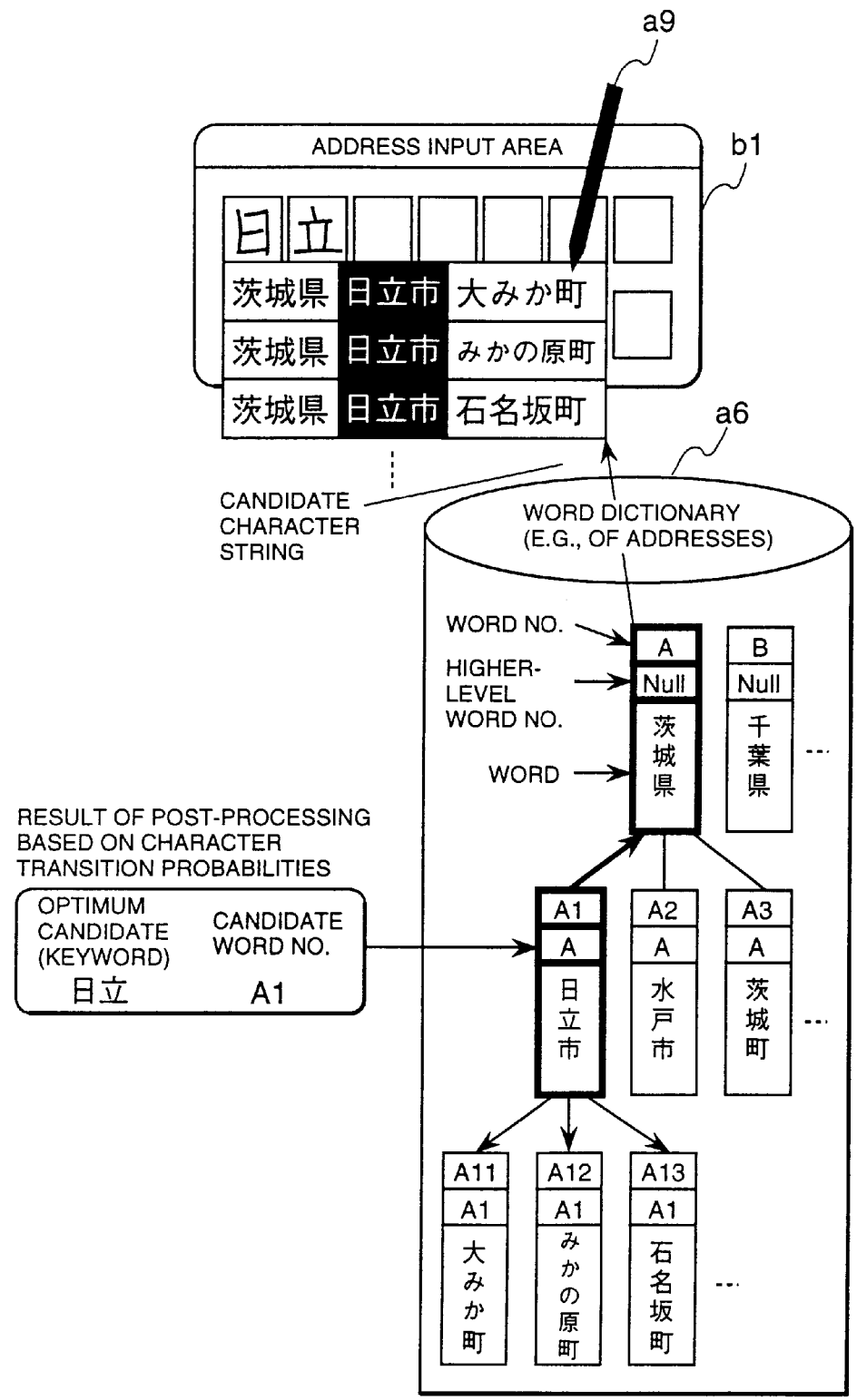
FIG. 14 is another schematic flow diagram showing how a character string is illustratively inferred from the result of post-processing.

FIG. 14 is another schematic flow diagram showing how a character string is illustratively inferred from the result of post-processing. In the example of FIG. 14, the post-processing based on transition probabilities yields an intermediate-level word "日立市 (Hitachi)" (candidate word No. A1) from within the word dictionary. As illustrated, only one word "日立 (Hitachi)" exists as a keyword in the word dictionary, so that the upper-level character string "茨城県 (Ibaraki-ken)" is uniquely determined. In this case, the keyword "日立 (Hitachi)" has a plurality of lower-level words related thereto. Thus a plurality of candidates are displayed (e.g., "茨城県日立市大みか町 (Ibaraki-ken, Hitachi-shi, Oomika-cho)" "茨城県日立市みかの原町 (Ibaraki-ken, Hitachi-shi, Mikanohara-cho)", etc.), one of which may be selected by the user.

Figure 15:
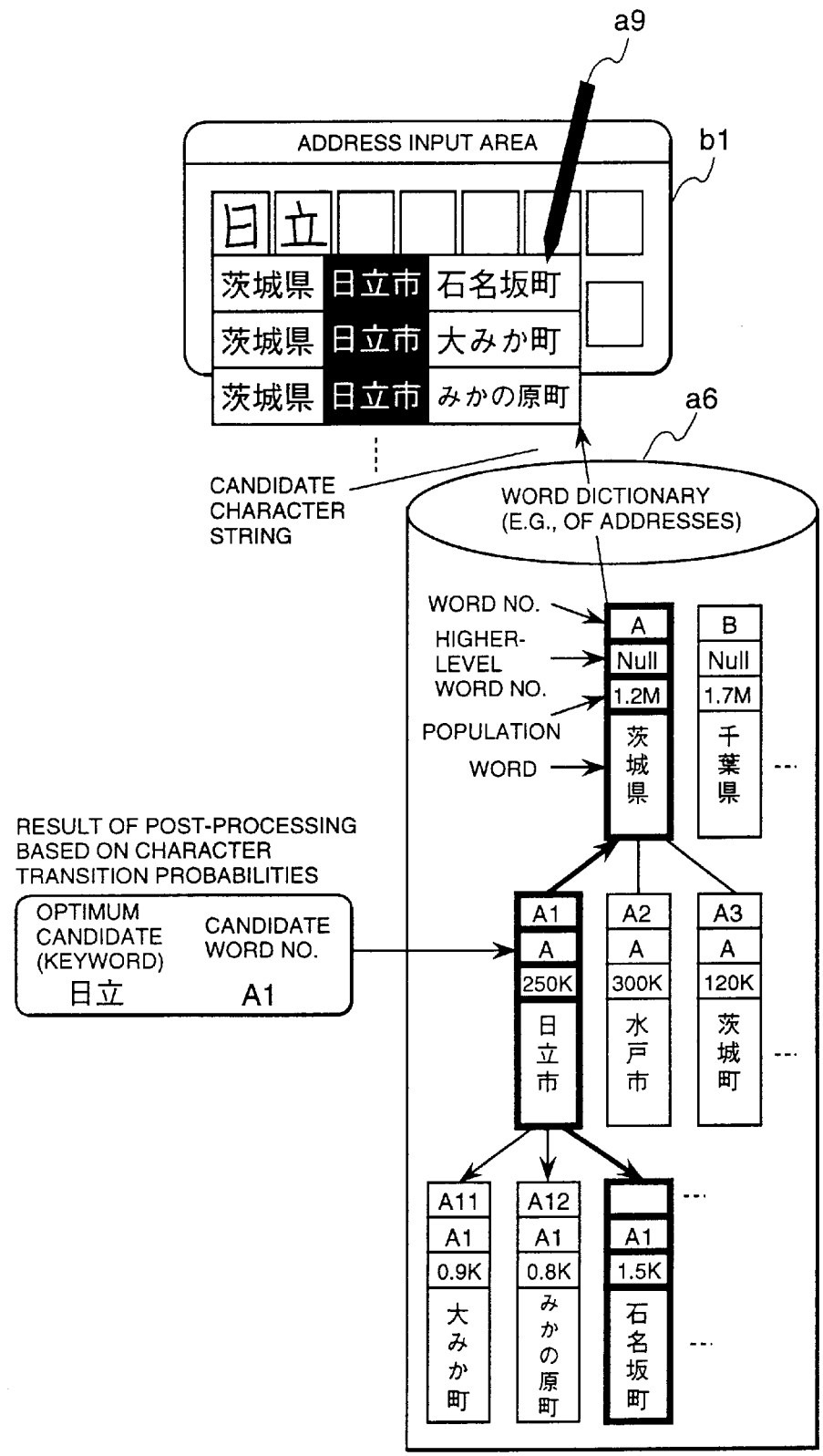
FIG. 15 is another schematic flow diagram showing how a character string is illustratively inferred from the result of post-processing.

The example of FIG. 15 is similar to that of FIG. 14 in that the intermediate-level word "日立 (Hitachi)" (candidate word No. A1) is retrieved from the word dictionary by the post-processing based on transition probabilities, with the word having a plurality of lower-level candidates related thereto. In the illustrated example, the word dictionary retains demographic information about various cities and towns so that a plurality of candidate lower-level words are displayed in order of population. The user finds it easier to choose from the demographically arranged candidate cities and towns on display.

Figure 16:
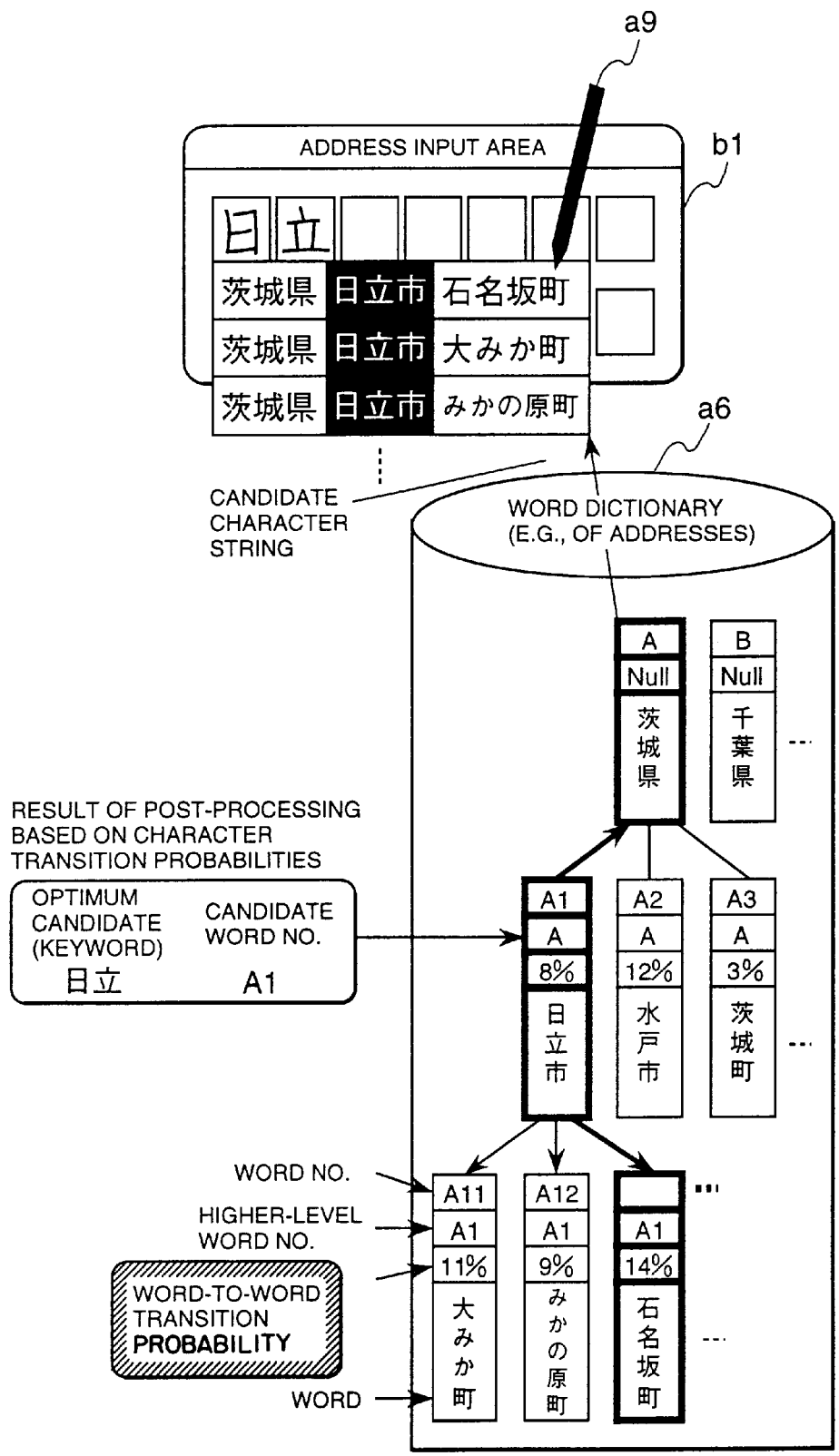
FIG. 16 is another schematic flow diagram showing how a character string is illustratively inferred from the result of post-processing.

What is shown in FIG. 16 is similar to the example of FIG. 15, except that in the example of FIG. 16, the word dictionary retains word-to-word transition probabilities instead of demographic information. That is, a plurality of candidate lower-level words are displayed in order of transition probabilities. The user also finds it easy to choose from such probability-based word indications. The word-to-word transition probabilities may illustratively be learned from texts containing numerous geographical names. In a simplified arrangement, the transition probabilities may be determined on the basis of populations in the cities and towns involved.

Figure 21:
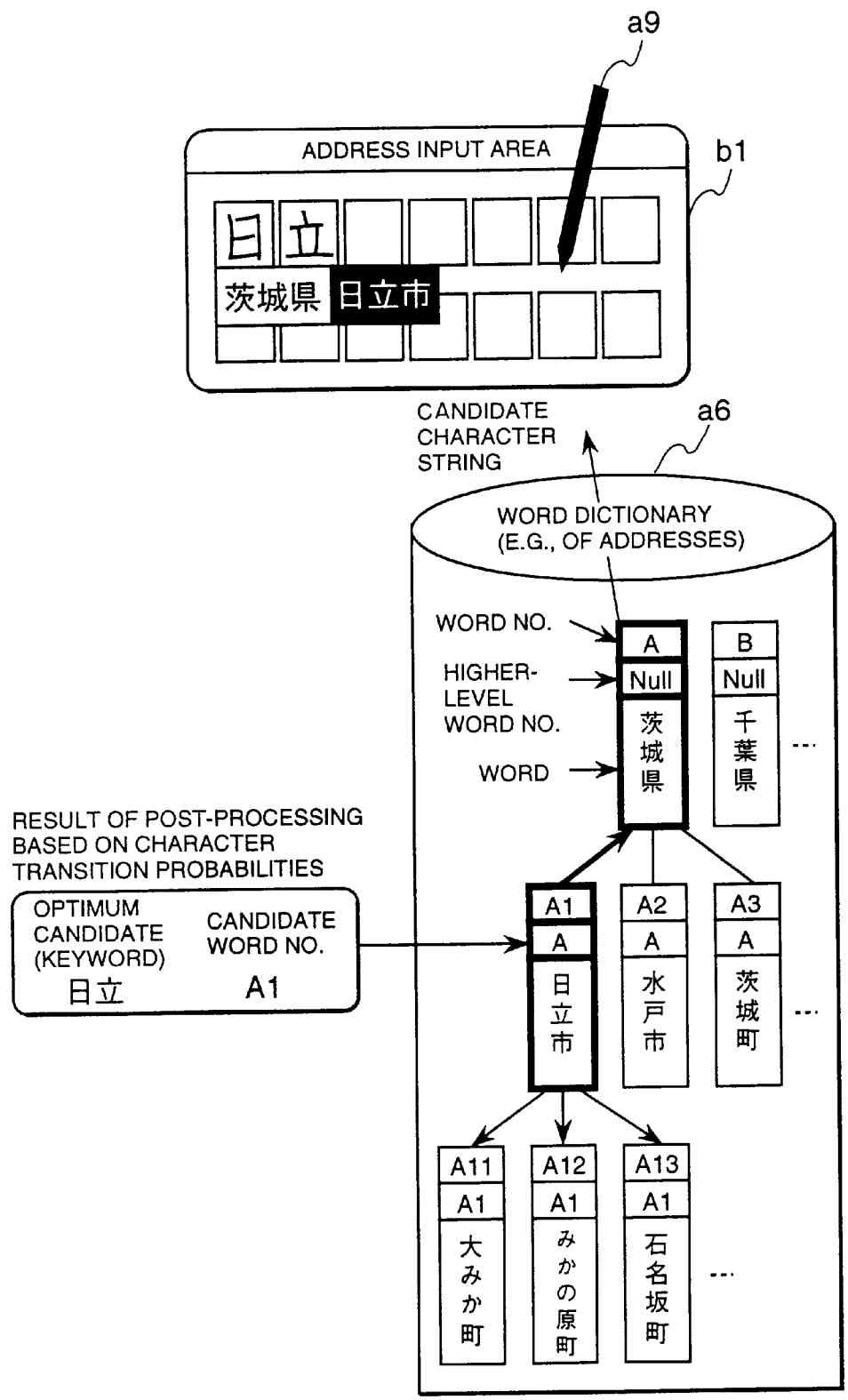
FIG. 21 is a another schematic flow diagram showing how a character string is illustratively inferred from the result of post-processing.

In an example of FIG. 21, as in the example of FIG. 14, the intermediate-level keyword "日立 (Hitachi)" (candidate word No. A1) is retrieved from the word dictionary by the post-processing based on transition probabilities, and lower-level candidates related to the keyword have yet to be determined. The example of FIG. 21 differs from that of FIG. 14 in that only the uniquely determined character string "茨城県日立市 (Ibaraki-ken, Hitachi-shi)" is displayed. Lower level municipalities, which are not determined uniquely, are to be entered again by the user.

As described above, the words higher than the keyword in hierarchy are inferred uniquely and automatically according to the invention. Where there are a plurality of lower-level candidates subordinate to the keyword, they are not uniquely determined. In such cases, the user may be presented with a menu to choose from or may be requested to make additional entries required.

[4] How to Display an Inferred Character String

Below is a description of how the character string candidate obtained in the manner described above is displayed.

FIGS. 17 through 20 show how inferred character strings are illustratively displayed. In each of the examples, a word "大みか (Oomika)" is input and a character string "茨城県日立市大みか町 (Ibaraki-ken, Hitachi-shi, Oomika-cho)" is inferred and displayed accordingly. What characterizes the illustrated examples is their different displacements of the character strings on display.

Figure 17:
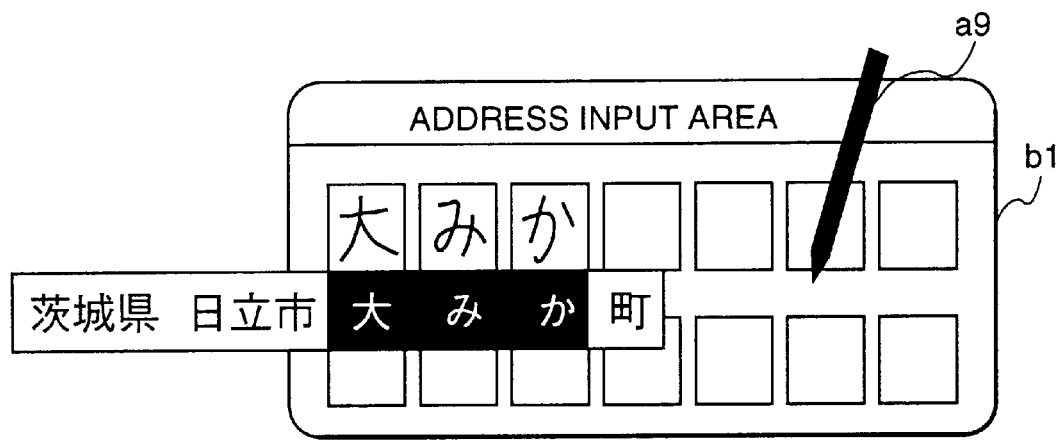
FIG. 17 is a diagram of one typical format in which an inferred character string is displayed.

In the example of FIG. 17, the portion "大みか町 (Oomika-cho)" in the candidate character string "茨城県日立市大みか町 (Ibaraki-ken, Hitachi-shi, Oomika-cho)" is displayed close to the handwritten characters "大みか (Oomika)". This type of display has the advantage of allowing the user to compare the handwritten characters easily with the recognized candidate characters positioned nearby.

Figure 18:
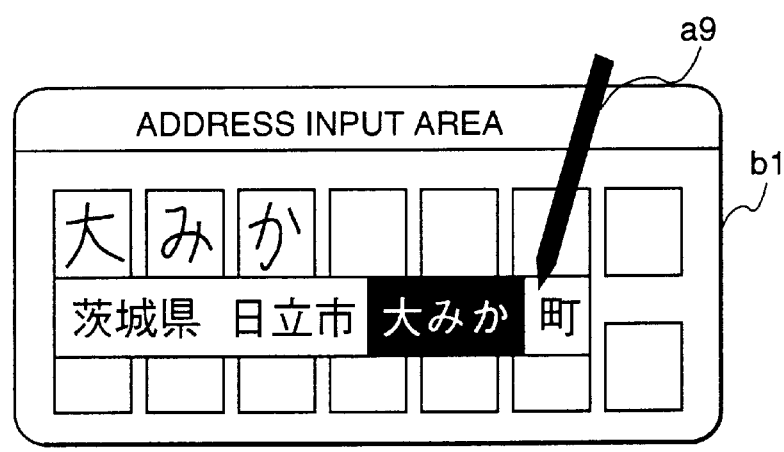
FIG. 18 is a diagram of another typical format in which an inferred character string is displayed.

In the example of FIG. 18, the candidate character string "茨城県日立市大みか町 (Ibaraki-ken, Hitachi-shi, Oomika-cho)" is displayed from around the starting position of the handwritten characters "大みか (Oomika)". This display left-justifies both the handwritten characters and the candidate character string, thus clearly indicating where the recognized result starts on the display.

Figure 19:
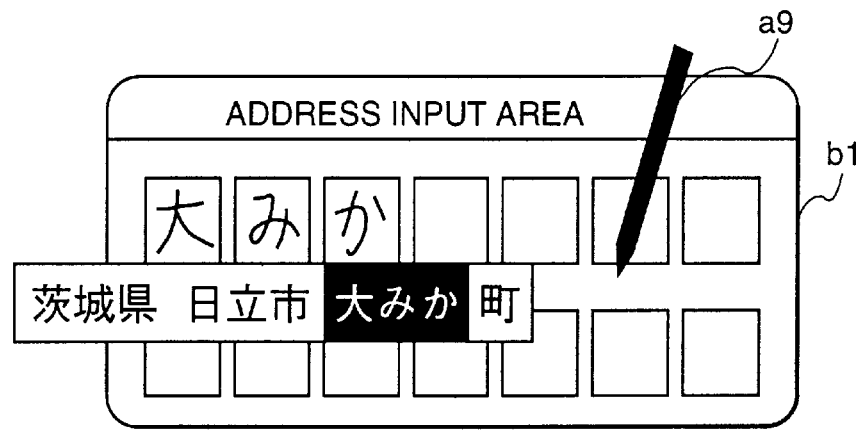
FIG. 19 is a diagram of another typical format in which an inferred character string is displayed.

In the example of FIG. 19, the displayed candidate character string "茨城県日立市大みか町 (Ibaraki-ken, Hitachi-shi, Oomika-cho)" is centered on the position of the handwritten characters "大みか (Oomika)". This display has the advantage of showing the handwritten character string and the candidate character string being most closely located to each other so that the user need not move his or her viewpoint much.

Figure 20:
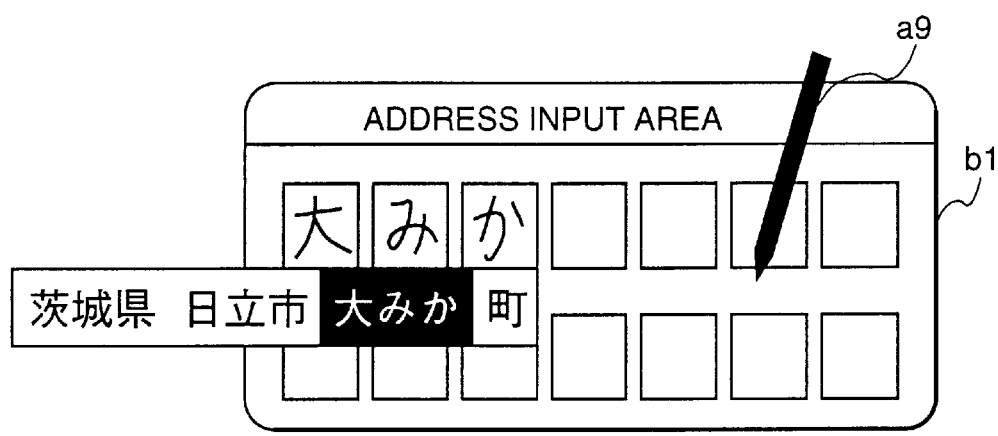
FIG. 20 is a diagram of another typical format in which an inferred character string is displayed.

In the example of FIG. 20, the handwritten character string "Oomika" and the candidate character string "茨城県日立市大みか町 (Ibaraki-ken, Hitachi-shi, Oomika-cho)" are displayed with their last characters positioned in the same column. This display benefits particularly the right-handed user in that the candidate character string is not hidden under the user's right hand holding the pen.

Any one of diverse display format variations such as those illustrated in FIGS. 17 through 20 may be selected either by the system or by users according to their preferences.

In the examples of FIGS. 17 through 20, the keyword "大みか (Oomika)" in the candidate character string is displayed in reverse video for emphasis. Alternatively, the keyword may be highlighted by use of a different font or by any other appropriate method. Another alternative would be to dispense with the highlighting display altogether.

As described, the character recognition apparatus according to the invention infers the entire character string solely from a user-input handwritten keyword such as an address or fixed phrase from within a hierarchical data structure, and displays the inferred result as a candidate character string. The inventive apparatus permits quick access to an internal word dictionary for word matching. Where the word dictionary is layered as in the above-described embodiment, access to any of the layers constituting the dictionary is carried out at high speed regardless of the layer being high or low.

According to the invention, the user need only write key characters by hand; the remaining character string is inferred by the inventive apparatus so that the entire character string is output as the recognized result. These and other features of the invention boost the operability of character recognition processing considerably.

Described next is a medical-care searching apparatus which is capable of readily finding, among other things, purposes of a medicine and cautions in taking the medicine by inputting the name of a medicine manufacturer, the name of the medicine or part of a medicine code, or which is capable of finding the history of a case and the medical care of a patient by inputting part of the name of the patient by carrying out a search operation. In the search operation, a character recognition apparatus is used for recognizing an input character pattern and inferring uninput words by referring to a hierarchical word dictionary and a character-to-character transition probability table.

Figure 23:
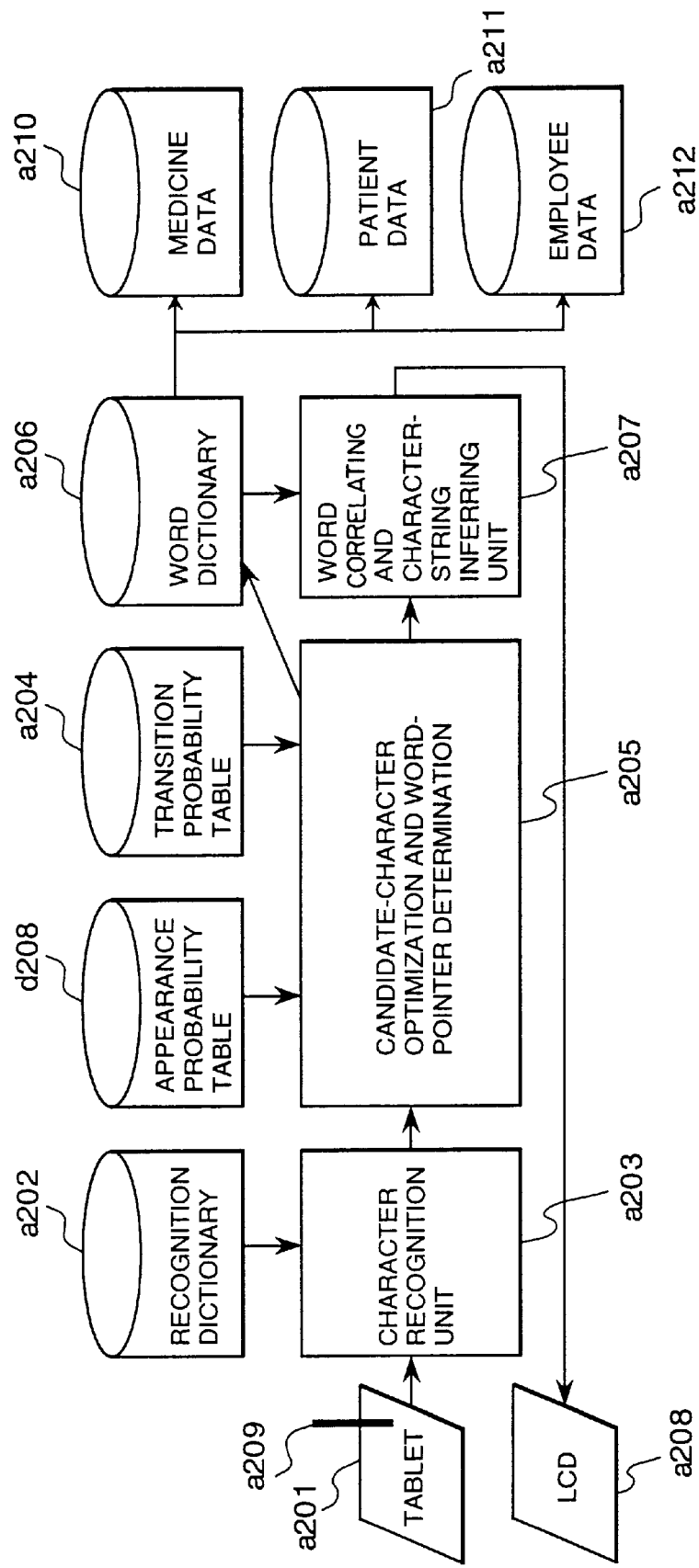
FIG. 23 is a functional block diagram showing a handwritten-input medical-care searching apparatus embodying the invention.

FIG. 23 is a functional block diagram showing a handwritten-input medical-care searching apparatus embodying the present invention.

First of all, character patterns are written on a tablet a201 by using a stylus pen a209. Each input character pattern is compared with character patterns cataloged in a recognition dictionary a202 in advance to find a cataloged character pattern that matches the input one. For each input character pattern, recognized characters including candidate characters are output. An optimal order in which the candidate characters are sequenced to form a string of characters is found by referring to a character-to-character transition probability table a204 and a character appearance probability table a208. Much like the character-to-character transition probability described before, this character-to-character transition probability table a204 is also used for storing in advance the probability of each character-to-character transitions as well as pointers to words each including such a transition cataloged in a word dictionary a206. To put it in detail, in the optimization, recognized and candidate characters are sequenced so as to produce an optimal string of characters for which the sum of probabilities of the characters appearing as the string is maximized. Then, in a process a205, the optimal string of candidate characters is used for finding a pointer pointing to a word in the word dictionary a206 from the character-to-character transition probability table a204. The word pointed to by the pointer is the optimal string of characters. Then, in a word correlating and character-string inferring unit a207, the word in the word dictionary a206 found by using this technique is then correlated with the string of the candidate characters, and information on the word as well as preceding and succeeding words is found.

Reference numeral a210 is a medicine table describing information such as purposes of each medicine, cautions in taking the medicine, side effects of the medicine and cautions when taking other medicines. Reference numeral a211 is a patient table containing information including the history of a case and the medical care of each patient whereas reference numeral a212 is an employee record table for storing employment information on employees of the hospital such as physicians, nurses, pharmacists and medical-equipment technicians.

Results of the operation carried out by the handwritten-input medical-care searching apparatus described above are displayed on an LCD a208.

Figure 24:
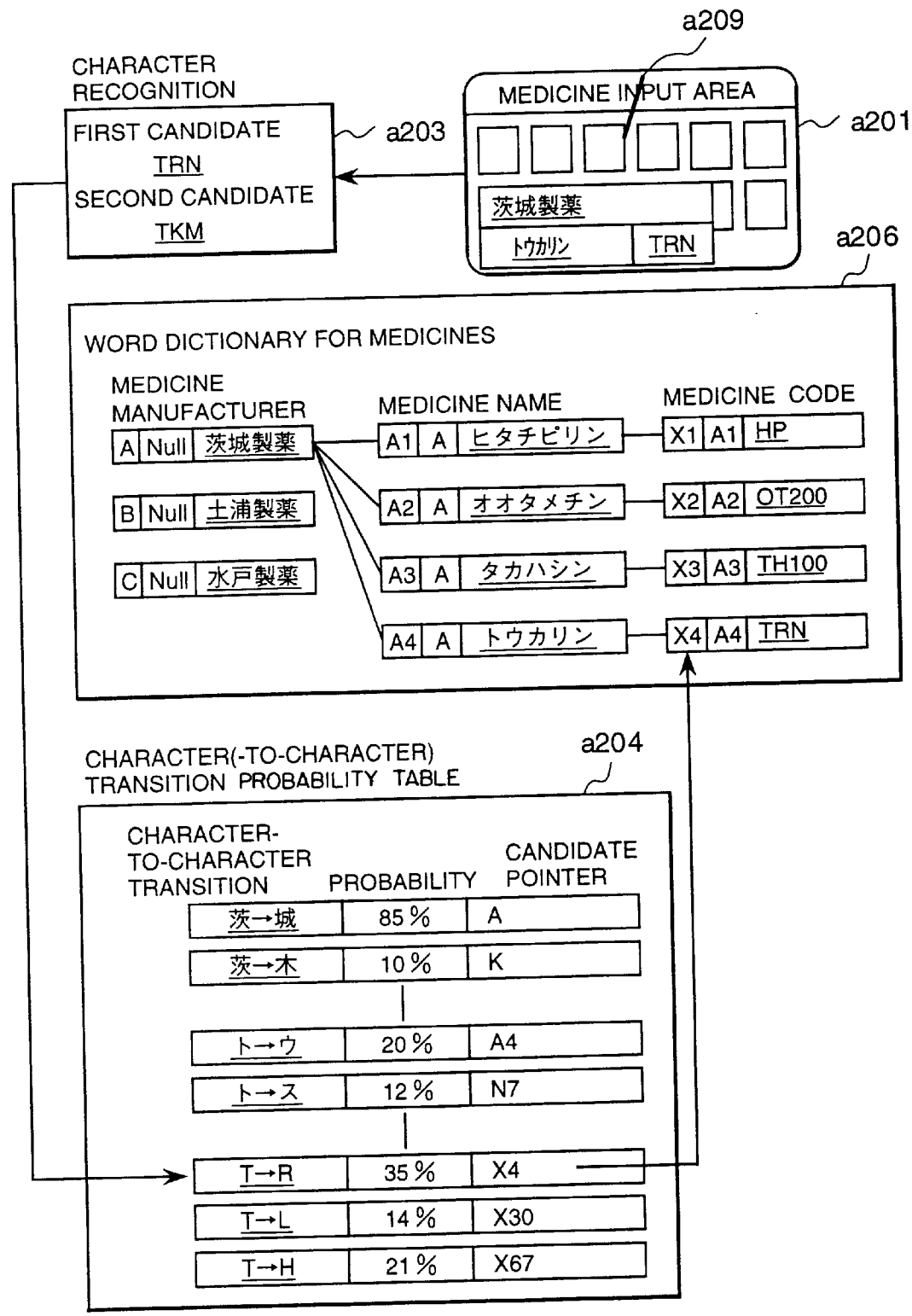
FIG. 24 is an explanatory diagram used for describing the operation of a handwritten-input medicine searching apparatus embodying the invention.

Described below with reference to FIGS. 23, 24 and 25 is an embodiment used for searching for purposes of each medicine, cautions in taking the medicine, side effects of the medicine and cautions when taking other medicines from part of the code of the medicine entered to the handwritten-input medical-care searching apparatus.

FIG. 24 is an explanatory diagram used for describing the operation of a handwritten-input medicine searching apparatus embodying the invention.

As shown in the figure, a medicine code TRN is entered to a medicine input area a201 by using a stylus pen a209.

The handwritten stroke is used by the character recognition unit a203 for searching the recognition dictionary a202. As a result of the search, the character recognition unit a203 outputs, among other candidates, a first candidate TRN and a second candidate TKM. An optimal order in which the candidate characters T, R, N, K and M are sequenced to form a string of characters is found by referencing the character-to-character transition probability table a204 and the character appearance probability table a208. The character-to-character transition probability table a204 is used for storing probabilities of character-to-character transitions for these candidate characters of medicine codes as well as pointers to medicines cataloged in the word dictionary a206 in advance. It should be noted that the character appearance probability table a208 is not shown in FIG. 24. Since the probability of transition from the character T to the character R and then to the character N entered to the medicine input area a201 is found highest, the character string TRN is determined as the optimal order of the candidate characters representing the medicine code and the character string TRN is found associated with a pointer X4 in the character-to-character transition probability table a204. The pointer X4 points to a medicine called "トウカリン (tokarin)" and the name "茨城製薬 (Ibaraki Seiyaku)" of the company manufacturing the medicine in the word dictionary a206 for cataloging names of medicines and medicine manufacturers as well as medicine codes in advance. As a result, the names of the medicine and the manufacturer thereof can be identified with ease.

Once the names of the medicine and the manufacturer thereof have been identified, information on purposes of a recipe of the medicine, cautions in taking the medicine, side effects of the medicine and cautions when taking other medicines shown in FIG. 25 can be found by referring to the table a210. It is obvious from FIG. 25 that the effect of the medicine "トウカリン (tokarin)" strengthens the effect of a medicine called lithium but is weakened by a medicine called an aspirin.

Figure 26:
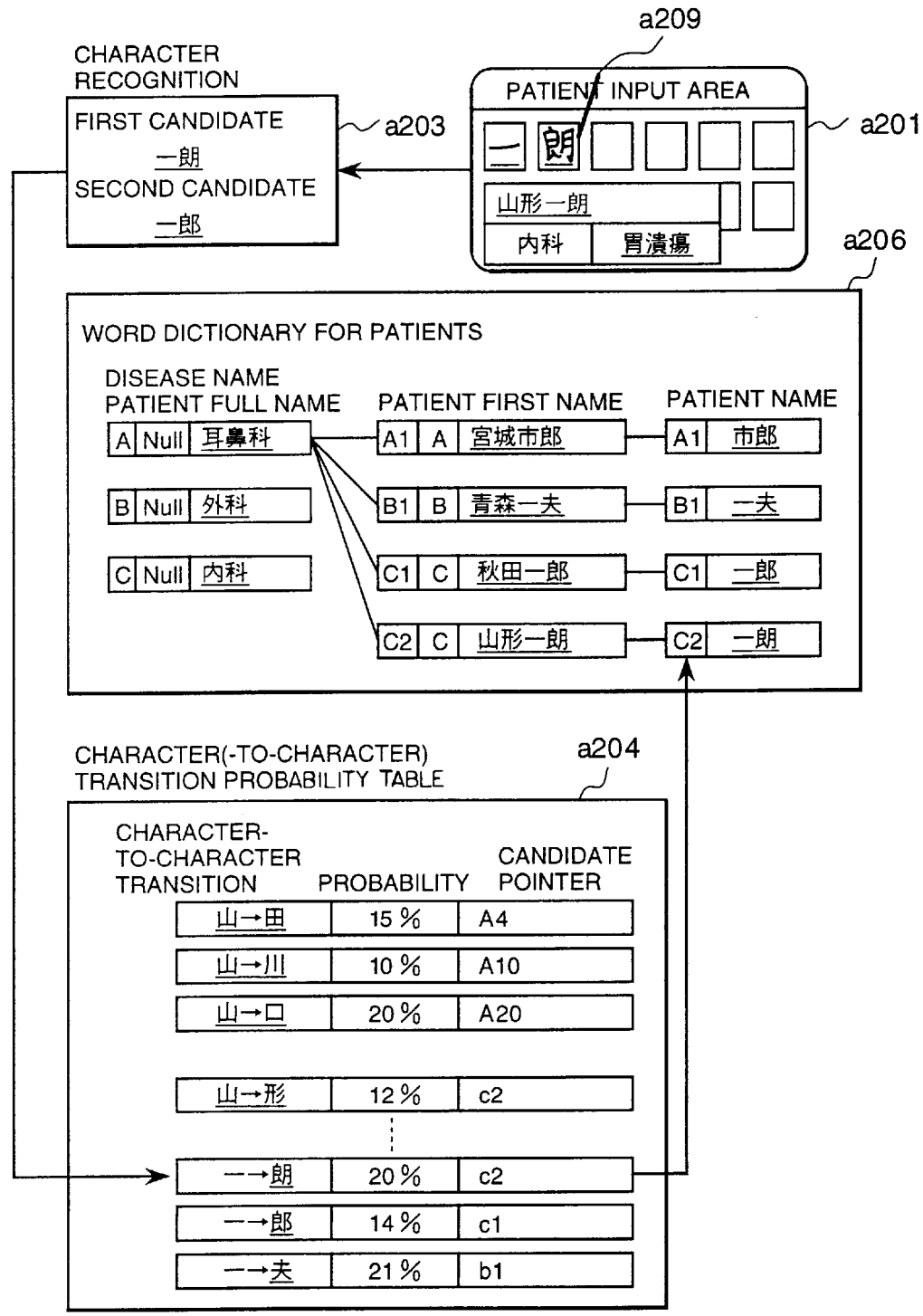
FIG. 26 is an explanatory diagram showing the operation of a patient-name searching apparatus based on a procedure embodying the invention.

Now, let the name "一朗 (Ichiro)" of a patient be entered to a patient-name input area a201 by using the stylus pen a209. The handwritten stroke is used by the character recognition unit a203 for searching the recognition dictionary a202. As a result of the search, the character recognition unit a203 outputs, among other candidates, a first candidate "一朗 (Ichiro)" and a second candidate "一郎 (Ichiro)". An optimal order in which the candidate Japanese characters "一 (ichi)", "一 (ichi)" and "朗 (ro)" are sequenced to form a string of characters is found by referencing the character-to-character transition probability table a204 and the character appearance probability table a208. The character-to-character transition probability table a204 is used for storing the probability of each character-to-character transition for these candidate Japanese characters of patient names as well as pointers to patient names including the transition cataloged in the word dictionary a206 in advance. It should be noted that the character appearance probability table a208 is not shown in FIG. 26. Since the probability of transition from the Japanese character "一 (ichi)" to the Japanese character "朗 (ro)" entered to the patient-name input area a201 is found highest, the character string "一朗 (Ichiro)" is determined as the optimal order of the candidate Japanese characters representing the name of a patient and, the character string "一朗 (Ichiro)" is found associated with a pointer C2 in the character-to-character transition probability table a204. The pointer C2 points to the name of a patient "山形一朗 (Ichiro Yamagata)" in the word dictionary a206 for cataloging the names of patients in advance. As a result, the name of a patient can be identified with ease.

Then, the doctor or the nurse updates the information such as the history of a case and the medical treatment of the patient in the patient table a211.

In the embodiment described above, operations to process information on a patient are explained. It should be noted that the processing can be applied to operations to process status and employment records of employees working in large hospitals such as physicians, nurses and medical-equipment technicians. In this case, a word dictionary for storing employment records and employment relations needs to be created in advance.

The embodiment can be applied not only to employment records of a large hospital but also to those of a general company.

As described above, by merely entering a handwritten part of the name of a medicine, the name of a patient or the name of an employee, information such as the usage of the medicine and cautions in taking the medicine or records on the medical treatment of the patient can be searched for readily, allowing the operatability of the handwritten-input medical-care searching apparatus to be enhanced.

Next, an application to a library searching system will be described.

Figure 27:
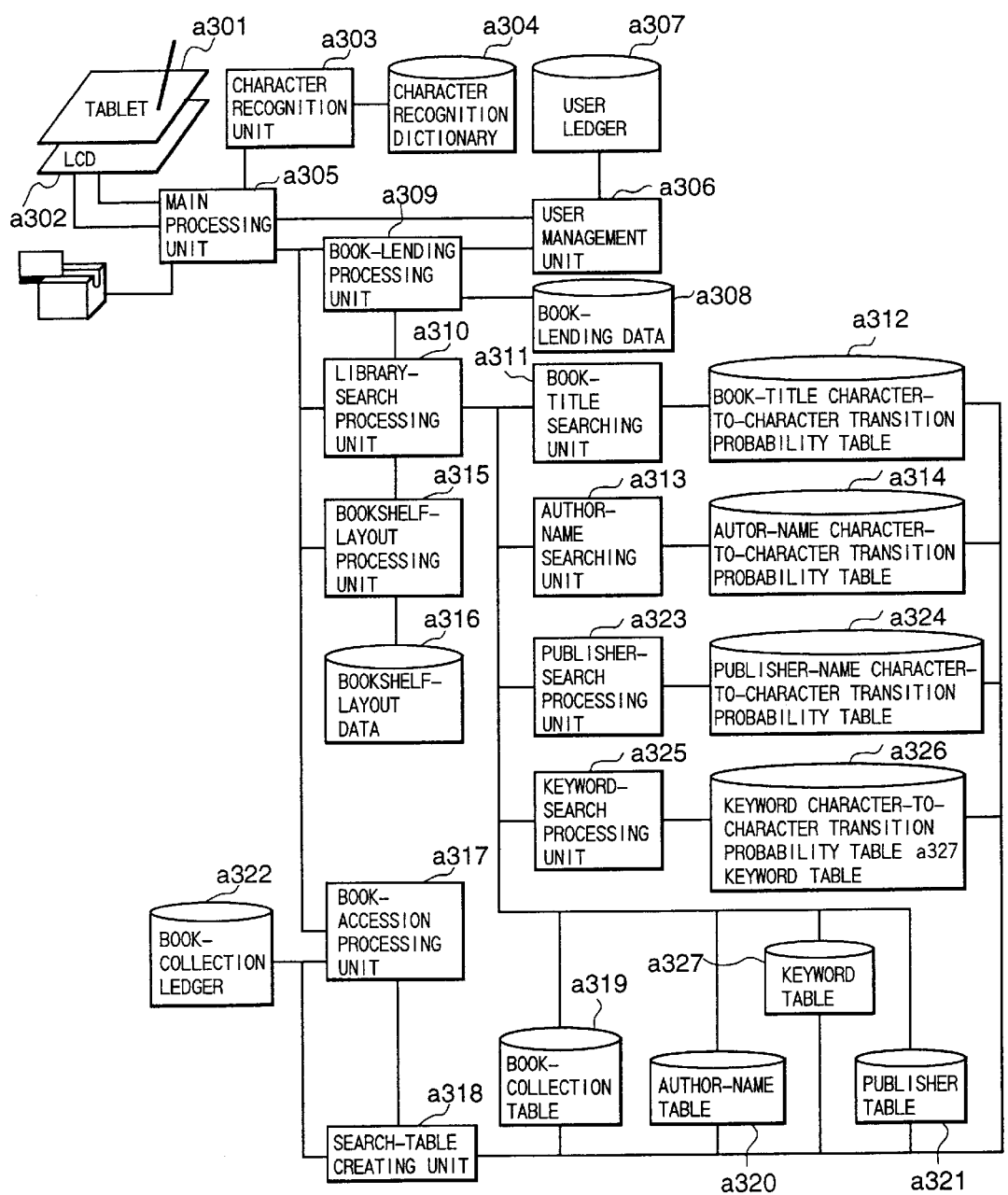
FIG. 27 is a block diagram showing the configuration of a library searching system.

FIG. 27 is a block diagram showing the configuration of a library searching system.

Reference numerals a301 and a302 shown in the figure are a tablet and an LCD (liquid-crystal display) respectively. Reference numeral a303 denotes a character recognition unit and reference numeral a304 denotes a character recognition dictionary. Reference numerals a305 and a306 denote a main processing unit and a user management unit respectively. Reference numeral a307 denotes a user ledger and reference numeral a308 denotes book-lending data. Reference numerals a309 and a310 denote a book-lending processing unit and a library-search processing unit respectively. Reference numeral a311 denotes a book-title searching unit and reference numeral a312 denotes a book-title character-to-character transition probability table. Reference numerals a313 and a314 denote an author-name searching unit and an author-name character-to-character transition probability table respectively. Reference numeral a315 denotes a bookshelf-layout processing unit and reference numeral a316 denotes bookshelf-layout data. Reference numerals a317 and a318 indicate a book-accession processing unit and a search-table creating unit respectively. Reference numeral a319 denotes a book-collection table and reference numeral a320 denotes an author-name table. Reference numerals a321 and a322 denote a publisher table and a book-collection ledger. Reference numeral a323 denotes a publisher-search processing unit and reference numeral a324 denotes a publisher-name character-to-character transition probability table. Reference numerals a325 and a326 denote a keyword-search processing unit and a keyword character-to-character transition probability table respectively. Reference numeral a327 denotes a keyword table and reference numeral a328 denotes a card reader.

In such a library searching system, the user enters an input to the system by writing characters or the like on the tablet a301 by means of a stylus pen. On the other hand, the library searching system displays an output to the user on the LCD a302.

The operation of the library searching system is explained as follows.

When the library searching system is activated, the main processing unit a305 displays a menu on the LCD a302. The library searching system has menus for use by the user such as book lending, book searching, and bookshelf-layout guidance and menus for library administrators such as user management and book accession.

When the user selects a book lending menu, the main processing unit a305 requests the book-lending processing unit a309 to carry out book-lending processing. The book-lending menu is used by the user to borrow a book and to make a reservation to borrow a book. The book-lending processing unit a309 displays a proper message on the LCD a302 by way of the main processing unit a305 in order to request the user to perform an operation. In response to the message, the user typically enters a user card issued in advance to the card reader a328 for reading information from the user card. The card reader a328 obtains a user number from the user card, passing on the user number to the user management unit a306. The user management unit a306 searches the user ledger a307 for the number to find out whether or not the number is cataloged on the user ledger a307 to indicate that the user is a valid user, that is, to find out whether or not a book can be lent to the user. At the same time, information on the user is read out from the user ledger a307 and forwarded to the book-lending processing unit a309. The information passed on to the book-lending processing unit a309 includes the present status of book lending and conditions to make a reservation to borrow a book. In addition, the user ledger a307 also includes information on each user such as a name, an address and a means for contacting the user.

If the book-lending processing unit a309 can not obtain authentication of the user from the user management unit a306, a message is displayed on the LCD a302, requesting the user to contact a library administrator. Here, the processing is ended. A message requesting the user to return a borrowed book with an expired lending period or a message explaining the conditions to make a reservation to borrow a book may be displayed on the LCD a302. If the book-lending processing unit a309 obtains authentication of the user from the user management unit a306, on the other hand, the book-lending processing unit a309 accepts cataloging of borrowing a book or a reservation to borrow a book by the user in an interactive manner. The borrowing of a book or the reservation to borrow a book is recorded in the book-lending data a308 which used for cataloging the book-lending status of each book.

Figure 28:
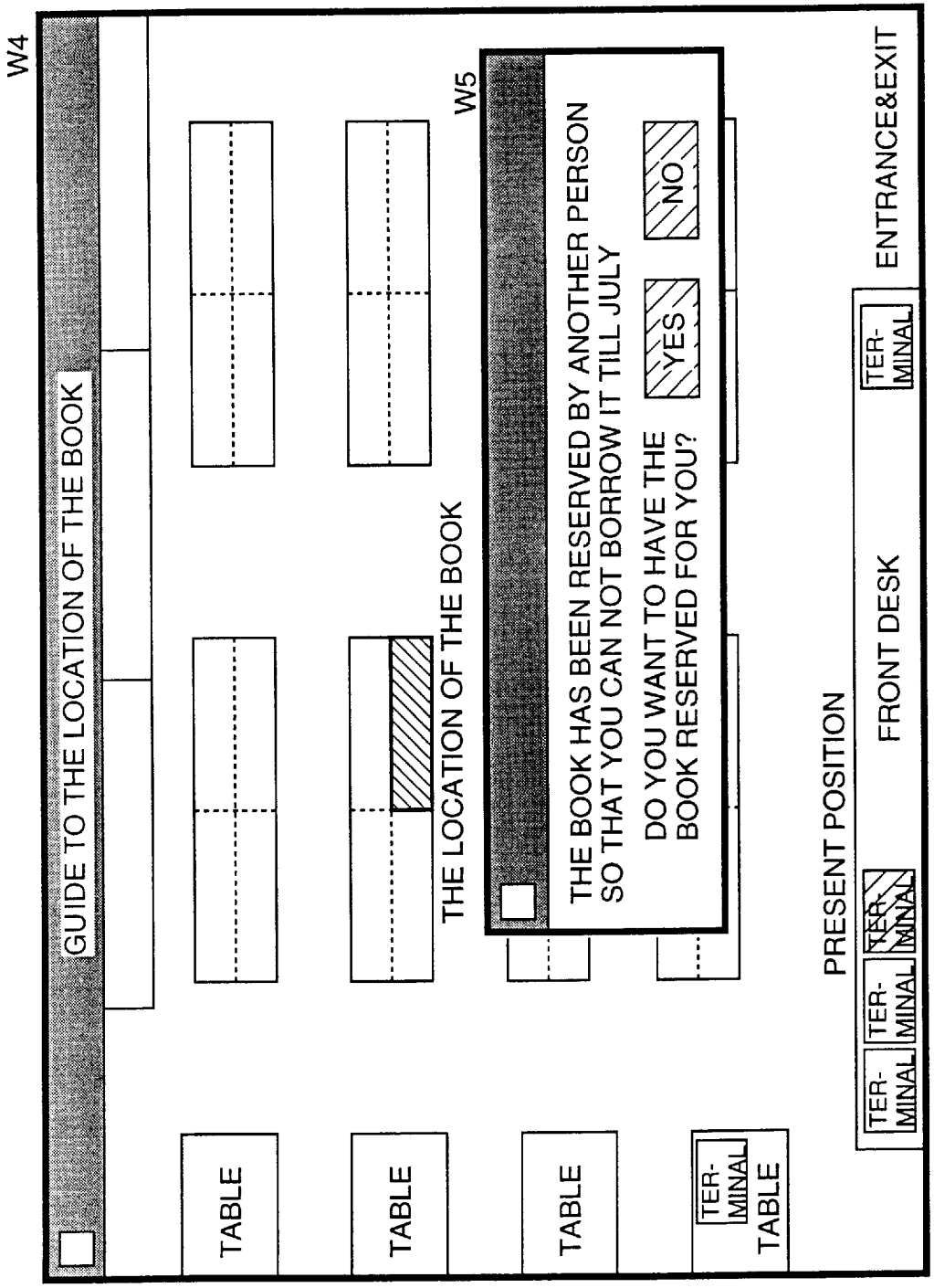
FIG. 28 is a diagram showing an example of a display output by bookshelf-layout guidance processing.

Next, as the bookshelf-layout guidance menu is selected, the main processing unit a305 requests the bookshelf-layout processing unit a315 to carry out bookshelf-layout guidance processing. The bookshelf-layout guidance processing provides the user with a guide as to the specific location of the library at which a desired book can be found. When the user specifies a desired book, the bookshelf-layout processing unit a315 reads out information on the location of each book from the bookshelf-layout data a316. Then, a bookshelf layout indicating the location of the desired book is displayed on the LCD a302 by way of the main processing unit a305 along with a simple guide showing the book-lending status of the desired book which was obtained as a result of a proper inquiry made to the book-lending processing unit a309 as shown in a window W4 of FIG. 28. In addition, detailed contents are displayed if necessary.

When the user management menu is selected, the main processing unit a305 requests the user management unit a306 to carry out user management processing which includes cataloging of a new user which has not been cataloged yet.

In the user management processing, the user management unit a306 requests the administrator of the library to enter an administrator registration number and a password used for authenticating the administrator. If the administrator can not be authenticated, a message to contact a library administrator is displayed, ending the processing. If the administrator can be authenticated, on the other hand, personal data of the user to be newly cataloged such as a name and an address entered by the administrator is received and a user number is assigned to the user. The personal data and the user number are then cataloged in the user ledger a307. At that time, a user card can also be issued to the user as well.

When the book-accession menu is selected, the main processing unit a305 requests the book-accession processing unit a317 to carry out book-accession processing.

In the book-accession processing, a new uncataloged book is included in a collection of books.

When the book-accession processing unit a317 receives book data entered by an administrator of the library, the book data is passed on to the search-table creating unit a318. The book data comprises information on a new book to be cataloged such as the title of the book, the names of the authors the publisher and a keyword assigned by the administrator to the book. The search-table creating unit a318 catalogs the book data in the book-collection ledger a322 and, subsequently or at a later proper time, uses the book data newly cataloged in the book-collection ledger a322 for updating the contents of the book-title character-to-character transition probability table a312, the author-name character-to-character transition probability table a314, the publisher character-to-character transition probability table a324, the keyword character-to-character transition probability table a326, the book-collection table a319, the author-name table a320, the publisher table a321 and the keyword table a327.

FIGS. 29 is a diagram showing the structure of the book-collection ledger a322.

As shown in the figure, the book-collection ledger a322 has entries each for cataloging data such as the title of a book, the names of the authors, the publisher and the keyword for a book-collection number which is used as a reference number of the book.

FIGS. 30(*a*), (*b*) and (*c*) are diagrams showing the book-collection table a319, the author-name table a320 and the publisher table respectively a321.

The book-collection table a319 contains the same information as the book-collection ledger a322 except that the information is cataloged in the book-collection table a319 in a format which allows a search operation to be carried out. In the book-collection table a319, the title of a book, an author number, a publisher number and a keyword number are cataloged for each book-collection number.

In the author-name table a320, an author number is assigned to each author name. For each author number, the name of the author to which the author number is assigned as well as its collection of books represented by book-collection numbers are cataloged. In the publisher table a321, on the other hand, a publisher number is assigned to each publisher name. For each publisher number, the name of the publisher to which the publisher number is assigned as well as its collection of books represented by book-collection numbers are cataloged.

The structure of the keyword table a327 is not shown in a figure. However, in the keyword table a327, a keyword number is assigned to each keyword. For each keyword number, the keyword associated with the keyword number is cataloged along with its collection of books which are represented by book-collection numbers and have the same assigned keyword.

It should be noted that book-collection numbers are associated with titles of books on a one-to-one basis. In the book-collection table a319, the title of a book is the only data item that directly describes the book. In order to make the data items cataloged in the book-collection table a319 uniform, a book-title number can be cataloged in the book-collection table a319 in place of the title of a book provided a separate table is created for associating each book title with a book-title number.

Figure 31:
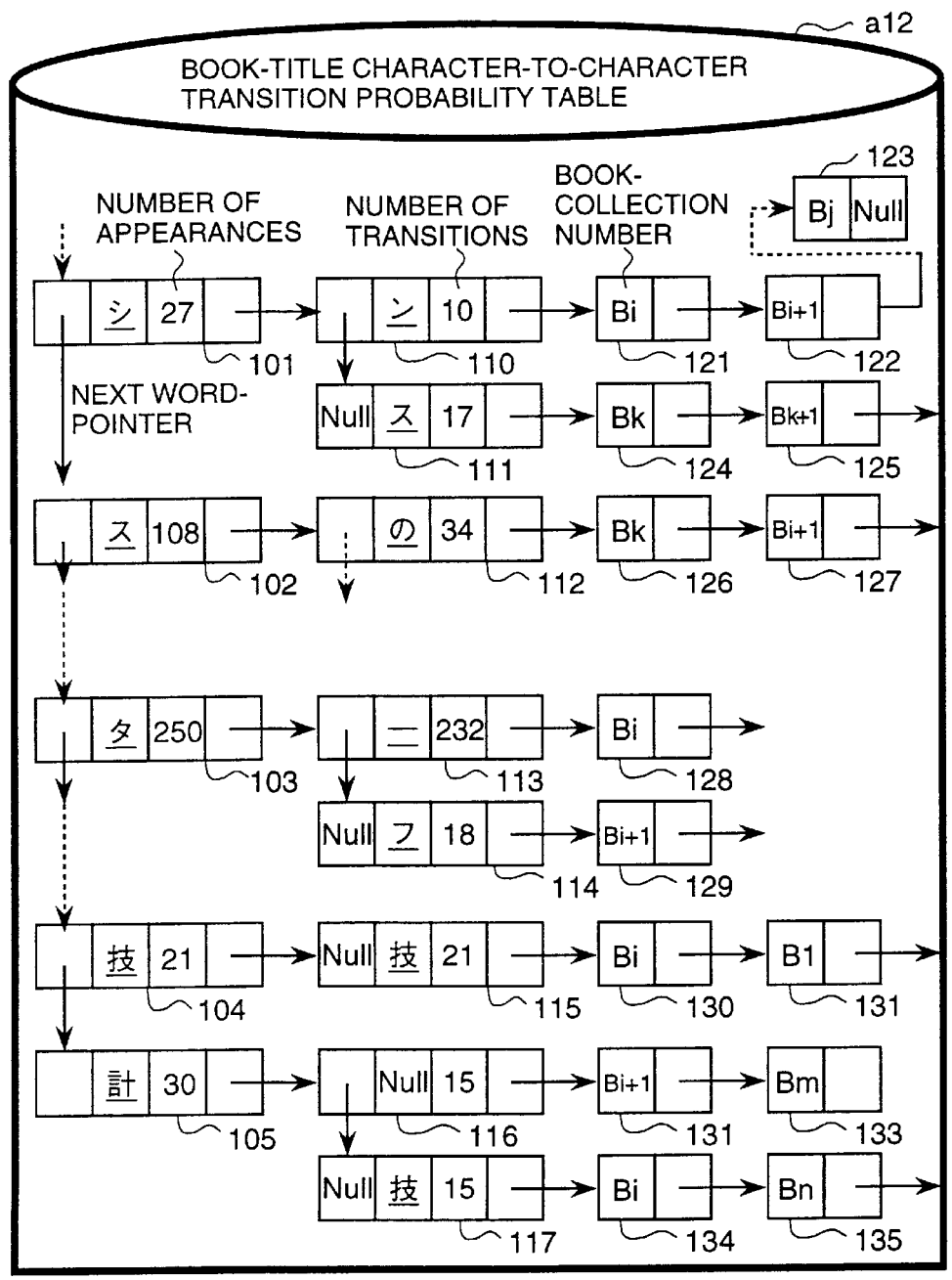
FIG. 31 is a diagram showing a structure of a book-title character-to-character transition probability table.

FIG. 31 is a diagram showing the structure of the book-title character-to-character transition probability table a312. The author-name character-to-character transition probability table a314, the publisher character-to-character transition probability table a324 and the keyword character-to-character transition probability table a326 have the same structure of the book-title character-to-character transition probability table a312 shown in the figure.

As shown in the figure, in the book-title character-to-character transition probability table a312, the number of character appearances, the number of character-to-character transitions and book-collection numbers of books, the titles of which include such a transition, are cataloged for each character included in the title of each book in the collection of books.

Reference numerals 101 to 105 shown on the left-most column of the figure each denote the number of character appearances in titles of books in the collection. As shown in the figure, the Japanese character "シ (shi)" appears 27 times and the character "ス (su)" appears 108 times whereas the character "タ (ta)" appears 250 times. A result obtained by dividing the number of appearances of a character by a total number of appearances of all characters is the appearance probability for the character.

Reference numerals 110 to 117 on the second column from the left each denote the number of character-to-character transitions. For example, reference numeral 101 is linked to reference numeral 110 to indicate that the number of times a pair of consecutive characters comprising the character "シ (shi)" 101 followed by the character "ン (ng)" appears in titles of books is 10. Even though reference numeral 101 is linked to reference numeral 111 through reference numeral 110, this indirect link indicates that the number of times a pair of consecutive characters comprising the character "シ (shi)" 101 followed by the character "ス (su)" appears in titles of books is 17 as is the case of the direct link of reference numerals 101 and 110. In this way, the number of character-to-character transitions represents the number of times a pair of characters appears consecutively in titles of books. A result obtained by dividing the number of character-to-character transitions by the number of appearances of the first character is the character-to-character transition probability of the pair of consecutive characters.

Reference numerals 121 to 135 on the third column of the figure each denote a collection-book number. For example, reference numeral 121 to 123 each denote a collection-book number of a book, the title of which includes the pair of characters "シン (shing)" indicated by reference numeral 110, even though reference numeral 121 is linked directly to reference numeral 110 while reference numeral 122 is linked indirectly to reference numeral 110 through reference numeral 121 and reference numeral 123 is linked indirectly to reference numeral 110 through reference numerals 122 and 121. Thus, reference numerals 121 to 123 denote books with book-collection numbers Bi, Bi+1 and Bj respectively, the titles of which each include the pair of characters "シン (shing)". It should be noted that the word 'Null' shown in the figure indicates the end of a link.

By the way, the book-title character-to-character transition probability table a312 can also be rearranged into a structure shown in FIG. 32.

The structure shown in FIG. 32 is appropriate for an application in which the title of a book is cataloged in Japanese kana-letters or alphabetical characters. That is to say, the structure shown in the figure is appropriate for an application in which the title of a book is cataloged for example in Japanese katakana characters, the number of which can not exceed typically about 70 as implemented in a library searching system like the one shown in FIG. 38 for cataloging the number of character appearances, the number of character-to-character transitions and a book-collection number with a high degree of efficiency.

The structure shown in FIG. 32 comprises a character appearance count table a312-1 for cataloging the number of times each character appears in titles of books, a character-to-character transition count table a312-2 for cataloging the number of times each character is followed by another character in titles of books and a character-transition/book-collection number table a312-3 with each entry thereof used for cataloging a character-to-character transition and book-collection numbers of books, the titles of which include such a transition.

Library search processing which is carried out when the library searching menu will be selected is described as follows.

When the library searching menu is selected in the library searching system shown in FIG. 27, the library search processing unit a310 is requested to carry out library search processing.

Figure 33:
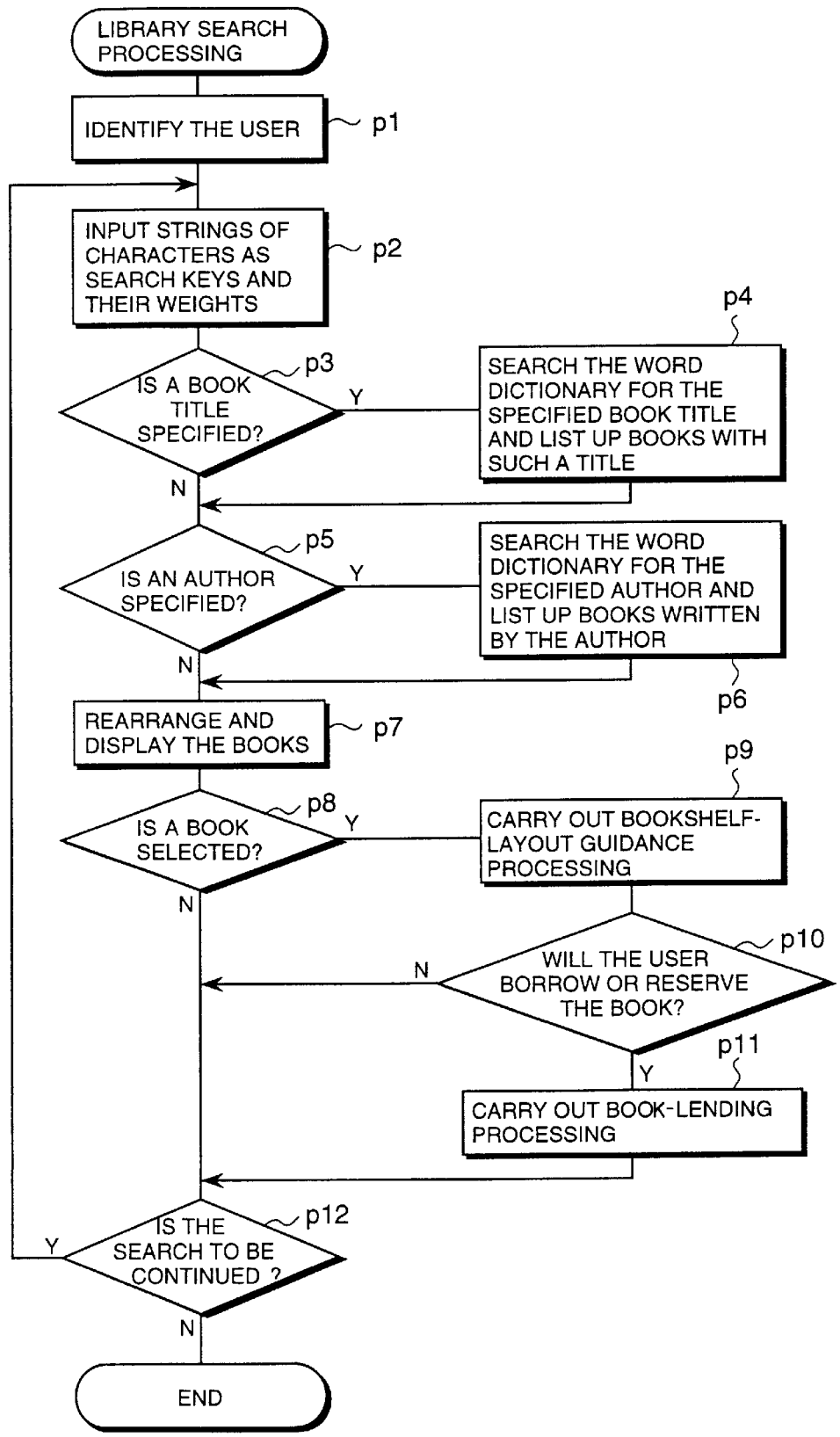
FIG. 33 is a schematic flow diagram showing a procedure of library search processing.

FIG. 33 is a schematic flow diagram showing a procedure of library search processing.

As shown in the figure, the library search processing begins with a sub-procedure p1 for identifying the user. The user is identified by the same processing as the authentication of the user carried out by the book-lending processing unit a309 explained earlier. If the user can not be authenticated, a message requesting the user to contact a library administrator is displayed on the LCD a302, ending the processing. Even if the user can not be authenticated, the processing flow may be continued to the following sub-procedure p2 for treating the user as a guest. If the user can be authenticated, on the other hand, the processing flow certainly goes on to the sub-procedure p2.

Figure 34:
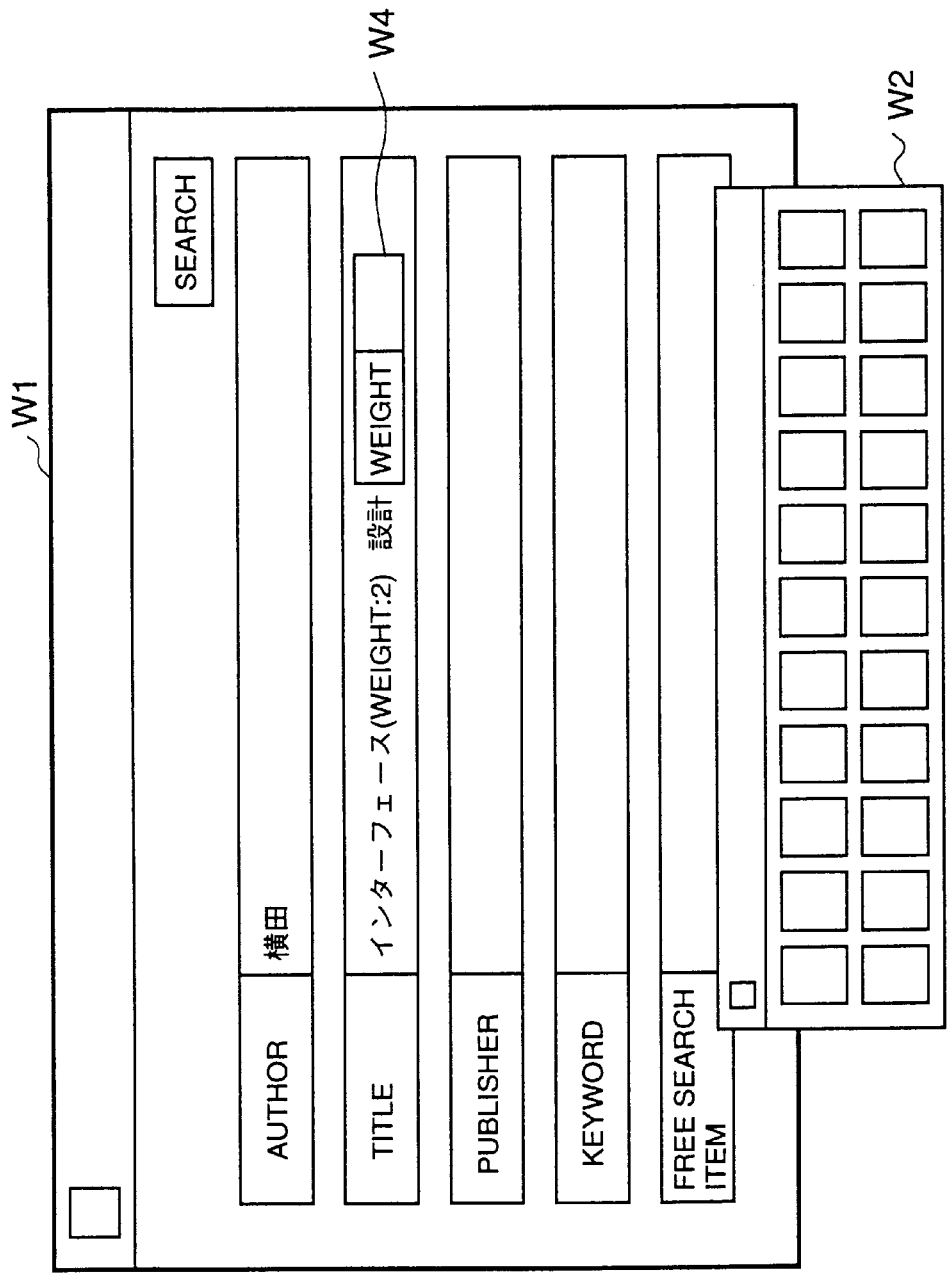
FIG. 34 is a diagram showing an example of a display for inputting a search key in the library search processing.

In the sub-procedure p2, search keys and a weight for each of the search keys are input from the user. To put it in detail, a window W1 shown in FIG. 34 is displayed on the LCD a302. The user then enters a string of characters for each search item on the window W1. At the time a search button of the window W1 is pressed, the character strings are each accepted as a search key for the respective search item. For a search item, a plurality of character strings may be entered. In this case, the user enters a space between two consecutive character strings as a delimiter. It should be noted that, in this embodiment, a handwritten input interface is adopted. To put it in detail, a string of characters handwritten by the user on the tablet a301 appears on a window W2 displayed on the LCD a302 as shown in FIG. 34. The string of characters is recognized and a result of the recognition is displayed on a cursor position in the frame of the respective search item of the window W1.

As for the weight of a search key, a weight input window W4 is displayed for a string of characters of a search item while the string of characters is being entered to the frame of the search item. An input entered by the user to the weight input window W4 is accepted as the weight for the search key. If no input is entered by the user to the weight input window W4, a weight of 1 is assumed. After a weight has been entered by the user to the weight input window W4, that is, when an operation to enter another string of characters is started, the entered weight for the string of characters is displayed by enclosing it in parentheses ( ). It should be noted that, in place of a weight, a priority-order number can be assigned to each string of characters to be used as a search key.

Here, a weight assigned to a string of characters to be used as a search key described above allows the user, for example, to distinguish a string of characters which the user is sure about from a string of characters in a faint memory of the user entered as a search key. For example, if a word in the title of a book to be searched for to be used as a search key is remembered by the user clearly, the user sets the weight of the search key at a large value. If a word in the title of a book to be searched for to be used as a search key is in a faint memory of the user, on the other hand, the user can set the weight of the search key at a small value. In addition, a default weight or a default priority-order number can be assigned to each search item in advance. In this case, when the user does not enter a weight or a priority-order number for a search item, the default value assigned to the search item is used. A default value can be set only by a data-base designer or a library administrator.

In the example shown in FIG. 34, a weight of 2 and a weight of 1 are assigned to the string of characters "インターフェース (interface)" and the string of characters "設計 (sekkei)" of the book-title search item respectively while a weight of 1 is set for the string of characters "横田 (Yokota)" of the author-name search item.

The processing flow then goes on to sub-procedures p3 to p6 as shown in FIG. 33. In the sub-procedures p3 to p6, the library search processing unit a310 requests search processing units to carry out search processing on search items indicated by character strings entered as search keys for the respective search items. The search processing units are the book-title searching unit a311, the author-name searching unit a313, the publisher searching unit a323 and the keyword searching unit a325. It should be noted that the figure shows only the book-title searching unit a311 and the author-name searching unit a313. For example, assume that a string of characters is entered for the book-title search item in the sub-procedure p2. In this case, the book-title searching unit a311 is requested to search for the title of a book indicated by the entered string of characters. It should be noted that, if a string of characters is entered for a search item not defined in the window W1 in the sub-procedure p2, all the search processing units, that is, the book-title searching unit a311, the author-name searching unit a313, the publisher searching unit a323 and the keyword searching unit a325, are requested to search for a search item indicated by the entered string of characters.

The search processing carried out by each of the search processing units, that is, the book-title searching unit a311, the author-name searching unit a313, the publisher searching unit a323 and the keyword searching unit a325, is explained below by taking operations performed by the book-title searching unit a311 as an example.

The processing begins with the sub-procedure p3 at which a search key entered by the user for the book-title search item is input. If the user enters a search key, the processing flow goes on to the sub-procedure p4 in which the book-title searching unit a311 carries out search processing to find the title of a book indicated by a string of characters entered as the search key for the book-title search item as follows.

The title of a desired book is found by referring to the book-title character-to-character transition probability table a312 to find book-collection numbers of books, the titles of which contain some or all of the entered string of characters. A book with the highest degree of transition matching is then selected among the found books. It should be noted that the degree of transition matching of a book is typically defined as the number of character-to-character transitions in the title of the book that match character-to-character transitions in the entered string of characters. As an alternative, all books with a non-zero degree of transition matching, that is, all the books with a title containing some or all of the entered string of characters, are picked up.

The degree of transition matching of a book is further explained through the following examples. In the above example, the entered string of characters is "インターフェース (interface)". The search using the book-title character-to-character transition probability table a312 results in book-collection numbers of books with titles "マンマシンインターフェースの設計技術 (Design Technique of a Man-Machine Interface)" and "マリーとポンターフェース (Marry and Ponterface)". In the case of the first book, the number of transitions from the Japanese character "イ(i)" to "ン (i)" to "ン (ng)", from "ン (ng)" to "タ (ta)" and so on in the word "インターフェース (interface)" in the book-title thereof that match those in the entered string of characters "インターフェース (interface)" is 7. Thus, the degree of transition matching of the first book is 7. In the case of the second book, on the other hand, the number of transitions from the Japanese character "タ (ta)" to "—(ah)", from "—(ah)" to "フ (fu)" and so on in the word "ポンターフェース (ponterface)" in the book-title thereof that match those in the entered string of characters "インターフェース (interface)" is 5. Thus, the degree of transition matching of the second book is 5. By the way, a book with a book-title "お庭の設計 (Design of a Garden)" has a degree of transition matching of 0. Thus, if all books with a non-zero degree of transition matching are to be picked up, the results of the search using the book-title character-to-character transition probability table a312 are book-collection numbers of the books with the titles "マンマシンインターフェースの設計技術 (Design Technique of a Man-Machine Interface)" and "マリーとポンターフェース (Marry and Ponterface)" given above.

Specifically speaking, the book-title character-to-character transition probability table a312 shown in FIG. 31 is searched for book-collection numbers linked to any transition from a character to the next one in the string of character which is entered as a search key. In this case, in place of the number of character-to-character transitions, the number of times a book-collection number appears during the search is used as a degree of transition matching and books with a high degree of transition matching are picked up. As an alternative, all books with a non-zero degree of transition matching is listed as described above. For example, assume that the string of characters entered as a search key is "シスの (shisuno)". For the transition from the Japanese character "シ (shi)" to "ス (su)" in the string of characters, the book-collection numbers Bk and Bk+1 denoted by reference numerals 124 and 125 respectively in the figure are found. For the transition from the Japanese character "ス (su)" to "の (no)" in the string of characters, on the other hand, the book-collection numbers Bk and Bi+1 denoted by reference numerals 126 and 127 respectively in the figure are found. The number of character-to-character transitions in the title of the book that match character-to-character transitions in the entered string of characters for all the book-collection numbers BC, Bk+1 and Bi+1 is 1. However, if the number of times a book-collection number appears during the search is used as the degree of transition matching, the book-collection number BC has a degree of transition matching of 2 while the remaining book-collection numbers Bk+1 and Bi+1 each have a degree of transition matching of 1.

After book-collection numbers are selected in the way described above, the book-title search processing unit a311 passes a list of book-collection numbers found for each string of characters entered as a search key for the title of a book along with their degrees of transition matching to the library search processing unit a310. The processing flow then proceeds to the sub-procedures p5 and p6 in which the author-name search processing unit a313 is requested to carry out processing on a string of characters entered by the user as a search key for the author-name search item. As described above, the author-name search processing unit a313, the publisher search processing unit a323 and the keyword search processing unit a325 also carry out the same processing as the book-title search processing unit a311.

The processing flow then goes on to a sub-procedure p7 shown in FIG. 33 in which the library search processing unit a310 rearranges book-collection numbers included on lists of book-collection numbers found for each string of characters entered as a search key received from the book-title search processing unit a311, the author-name search processing unit a313, the publisher search processing unit a323 and the keyword search processing unit a325 into an order determined by the degrees of transition matching found for the book-collection numbers and the weights entered earlier by the user along with the character strings. Pieces of library data for the book-collection numbers are then read out from the book-collection table a319, the author-name table a320, the publisher table a321 and the keyword table a327 and displayed on the LCD a302 by way of the main processing unit a305 in the same order as the rearranged book-collection numbers as shown in FIG. 35. The rearrangement is typically carried as follows.

For example, when neither weight nor priority-order number is set and only a string of characters is entered as a search key for a search item, the book-collection numbers are arranged in a descending order of the obtained degrees of transition matching. When neither weight nor priority-order number is set and N strings of characters are entered as search keys for only a search item, the book-collection numbers are arranged in a descending order of certain calculated quantities. The quantity may be the sum or the product of the N degrees of transition matching of each book. As an alternative, the quantity is a result of conversions of the N degrees of transition matching using a certain function. When neither weight nor priority-order number is set and M strings of characters are entered as search keys for each of k search items, the book-collection numbers are arranged in a descending order of certain calculated quantities. The quantity may be the sum, the product or a result of another function-based conversion of the k×M degrees of transition matching of each book. In the calculation of each quantity, be it a sum or a result of a conversion based on a function, each of the degrees of transition matching is multiplied by a weight which is determined by the length of the string of characters for the degree of transition matching. Then, the book-collection numbers are arranged in a descending order of the resulting quantities.

When strings of characters are set as search keys for the book-title and author-name search items with the string of character for the book-title search item given a priority-order number higher than that of the author-name search item, book-collection numbers are arranged in a descending order of degrees of transition matching found by the book-title search processing unit a311. If there are two or more book-collection numbers having an equal degree of transition matching found by the book-title search processing unit a311, the book-collection numbers are arranged in a descending order of degrees of transition matching found by the author-name search processing unit a312.

The two or more book-collection numbers having an equal degree of transition matching found by the book-title search processing unit a311 may have no degree of transition matching found by the author-name search processing unit a312. In this case, such a book-collection number is treated as if the transition matching found by the author-name search processing unit a312 of the book-collection number were zero. Also in a case where a plurality of character strings are set for each search item, book-collection numbers are rearranged in the same way using degrees of transition matching and priority-order numbers.

Now, for example, let the weight assigned to the string of characters " インターフェース (interface)" set as a search key for the book-title search item be 2, the weight assigned to the string of characters " 設計 (design)" set as a search key for the book-title search item be 1 and the weight assigned to the string of characters " 横田 (Yokota)" set as a search key for the author-name search item be 1. In this case, weighted degrees of transition matching are found and then book-collection numbers are arranged in a descending order of the found weighted degrees of transition matching using a technique described as follows.

Sections i to v described below are each book data comprising the title of a book, the names of the authors of the book and the publisher of the book listed in an order they are enumerated along with how to find a weighted degree of transition matching for the book.

i. Book-title: " マンマシンインターフェースの設計技術 "(Design Technique of a Man-Machine Interface)

Authors: " 横田他 (Yokota et al.)"

Publisher: "YHG社 (YHG Company)"

Calculation of a weighted degree of transition matching the keywords:

1. Degree of transition matching the keyword " インターフェース (interface)":
   The number of transitions from the Japanese character " イ (i)" to " ス (ng)", from " ス (ng)" to " タ (ta)" and so on is 7.

2. Degree of transition matching the keyword " 設計 (sekkei)":
   The number of transitions from the Japanese character " 設 (setsu)" to " 計 (kei)" is 1.

3. Degree of transition matching the keyword " 横田 (Yokota)":
   The number of transitions from the Japanese character " 横 (yoko)" to " 田 (ta)" is 1. Thus, the weighted degree of transition matching the keywords is 7*2+1*1+1*1=16.

ii. Book-title: " 日立は今インターフェース (Hitachi wa Ima Interface)"

Authors: " 横田他 (Yokota et al.)"

Publisher: " きりん堂 (Kirindoh Company)"

Calculation of a weighted degree of transition matching the keywords:
1. Degree of transition matching the keyword "インターフェース (interface)":
   The number of transitions from the Japanese character "イ (i)" to "ン (ng)", from "ン (ng)" to "タ (ta)" and so on is 7.
2. Degree of transition matching the keyword "設計 (sekkei)":
   Since there is no transition matching the transition the keyword, that is, "設 (setsu)" to "計 (kei)", the number of transitions is 0.
3. Degree of transition matching the keyword "横田 (Yokota)":
   The number of transitions from the Japanese character "横 (yoko)" to "田 (ta)" is 1. Thus, the weighted degree of transition matching the keywords is 7*2+0*1+1*1=15.

iii. Book-title: "マンマシンインターフェースの最適設計"(Optimum Technique of a Man-Machine Interface)
Authors: "山田他 (Yamada et al.)"
Publisher: "日本館 (Nihon-kan Company)"
Calculation of a weighted degree of transition matching the keywords:
1. Degree of transition matching the keyword "インターフェース (interface)":
   The number of transitions from the Japanese character "イ (i)" to "ン (ng)", from "ン (ng)" to "タ (ta)" and so on is 7.
2. Degree of transition matching the keyword "設計 (sekkei)":
   The number of transitions from the Japanese character "設 (setsu)" to "計 (kei)" is 1.
3. Degree of transition matching the keyword "横田 (Yokota)":
   Since there is no transition matching the transition in the keyword, that is, "横 (yoko)" to "田 (ta)", the number of transitions is 0.
   Thus, the weighted degree of transition matching the keywords is 7*2+1*1+0*1=15.

iv. Book-title: "マリーとポンターフェース (Marry and Ponterface)"
Authors: "・ルター著 (Ruter)"
Publisher: "よい子の童話社 (Yoi Ko No Dowa Company)"
Calculation of a weighted degree of transition matching the keywords:
1. Degree of transition matching the keyword "インターフェース (interface)":
   The number of transitions from the Japanese character "タ (ta)" to "— (ah)", from "— (ah)" to "ス (su)" and so on is 5.
2. Degree of transition matching the keyword "設計 (sekkei)":
   Since there is no transition matching the transition in the keyword, that is, "設 (setsu)" to "計 (kei)", the number of transitions is 0.
3. Degree of transition matching the keyword "横田 (Yokota)":
   Since there is no transition matching the transition in the keyword, that is, "横 (yoko)" to "田 (ta)", the number of transitions is 0. Thus, the weighted degree of transition matching the keywords is 5*2+0*1+0*1=10.

v. Book-title: "お庭の設計 (Design of a Yard)"
Authors: "横田太郎 (Taro Yokota)"
Publisher: "大邸宅社 (Daiteitaku Company)"
Calculation of a weighted degree of transition matching the keywords:
1. Degree of transition matching the keyword "インターフェース (interface)":
   Since there is no transition matching the transitions in the keyword, that is, "イ (i)" to "ン (ng), from "ン (ng)" to "タ (ta)" and so on, the number of transitions is 0.
2. Degree of transition matching the keyword "設計 (sekkei)":
   The number of transitions from the Japanese character "設 (setsu)" to "計 (kei)" is 1.
3. Degree of transition matching the keyword "横田 (Yokota)":
   The number of transitions from the Japanese character "横 (yoko)" to "田 (ta)" is 1. Thus, the weighted degree of transition matching the keywords is 0*2+1*1+1*1=2.

Accordingly, results of search operations by using the character strings "インターフェース (interface)", "設計 (sekkei)" and "横田 (Yokota)" entered by the user as search keys can be displayed in a descending order of the weighted degrees of transition matching calculated as described above.

By the way, in the library search processing shown in FIG. 33, not only are results of search operations displayed on the LCD a312, but the user can also select a book among the displayed results of the search operations and, in addition, utilize the bookshelf-layout guidance processing and the book-lending processing of the selected book.

In more detail, after the found books have been rearranged and displayed, the processing flow goes on to a sub-procedure P8 to find out whether or not a specific book is selected from a displayed list of books. If a specific book is selected from the displayed list of books, the processing flow goes on to a sub-procedure p9 in which the bookshelf-layout processing unit a315 is requested to execute book-shelf-layout guidance processing for the selected book. In response to the request, the bookshelf-layout processing unit a315 executes the bookshelf-layout guidance processing for the selected book. The processing then proceeds to a sub-procedure p10 to find out whether or not a request for a reservation to borrow the selected book exists. If a request for a reservation to borrow the selected book is found to have been entered by the user, the processing flow continues to a sub-procedure p11 in which the book-lending processing unit a309 is requested to carry out book-lending processing for the selected book. Receiving the request, the book-lending processing unit a309 executes the book-lending processing. After the book-lending processing for the selected book has been completed, the processing flow goes on to a sub-procedure p12 in which control is returned to the library search processing unit a310. It should be noted that, if a specific book is not selected from the displayed list of books in the sub-procedure p8, the processing flow also goes on to the sub-procedure p12. In the sub-procedure p12, the library search processing unit a310 receives a command for either terminating or continuing the search processing from the user. Receiving the command, the library search processing unit a310 terminates the processing or continue it by returning to the sub-procedure p2 in which the processing is repeated.

An embodiment implementing a library searching system has been described so far.

In the embodiment described above, a search processing unit and a character-to-character transition probability table are provided for each item to be searched for, that is, for the title of a book, the names of authors, the publisher and the keyword. It is also worth noting that, while the present invention has been described with reference to the illustrative embodiment, the description is not intended to be construed in a limiting sense. That is to say, it is to be understood that the subject matter encompassed by the present invention is not limited to the embodiment. A variety of changes and modifications of the embodiment will be apparent to the persons skilled in the art upon a study of the description. For example, a search processing unit and a character-to-character transition probability table can be provided for two or even more items to be searched for. To put it in more detail, the kana-letters of a string of characters entered as a search key for a search item can be used for searching a character-to-character transition probability table common to two or more items to be searched for. As a result, the size of a memory for storing such a table can be reduced.

In particular, for a search operation using a key, for which the item to be searched for is not known, either of the following two techniques is adopted: (1) A search processing unit and a character-to-character transition probability table common to all items to be searched for are provided. The search processing unit searches the table for data indicated by a key specified by the user. (2) A search processing unit and a character-to-character transition probability table is provided for each item to be searched for. Each table is searched by the unit associated with the table for data indicated by a key specified by the user.

In either case, results of a search operation are rearranged in a descending order of degrees of transition matching and weights or priority-order numbers.

In addition, each of the character-to-character transition probability tables, that is, the book-title character-to-character transition probability table, the author-name character-to-character transition probability table, the publisher character-to-character transition probability table and the keyword character-to-character transition probability table, can be structured as follows.

In the case of book data of a Western book written for example in English, a delimiter is used between two consecutive words. Thus, the following structure is advantageous.

In more detail, a word table containing entries each showing an association between a word number, a word and the book-collection number of a book associated with the word is created into a structure similar to the author-name table a320 or the other tables shown in FIG. 30. On the other hand, a word character-to-character transition probability table containing entries each showing an association between a character-to-character transition and a word number is created into a structure similar to the book-title character-to-character transition probability table a312 shown in FIG. 32. A word processing unit is further provided for using transitions from one character to another in a string of characters serving as a search key to find a word number and a degree of transition matching from the word character-to-character transition probability table. The found word number is further used to find a book-collection number and a degree of matching from the word table.

As an alternative, each of the character-to-character transition probability tables, that is, the book-title character-to-character transition probability table, the author-name character-to-character transition probability table, the publisher character-to-character transition probability table and the keyword character-to-character transition probability table, can be created into another structure described as follows.

In this regard, the book-title character-to-character transition probability table a312 is structured to comprise a book-title table containing entries each showing an association of a word character-to-character transition with the book-collection number of a book with a title including such a transition, and a word character-to-character transition table containing entries each showing an association of a character-to-character transition with a word number. The book-title search processing unit a311 is requested to find a word number and a degree of transition matching from character-to-character transitions in a string of characters used as a search key by referring to the word character-to-character transition table and find a book-collection number and a degree of transition matching from character-to-character transitions by referring to the book-title table. This structure can be applied to character-to-character transition probability tables for the other search items. It should be noted that a common word table can be provided for all search items or a word table is provided for each search item.

According to what is described above, in each of the character-to-character transition probability tables, that is, the book-title character-to-character transition probability table, the author-name character-to-character transition probability table, the publisher character-to-character transition probability table and the keyword character-to-character transition probability table, book-collection numbers are cataloged directly. It should be noted, however, that book-collection numbers can be omitted from each of the character-to-character transition probability tables. For example, in place of the book-collection number of a book written by an author whose name includes a character-to-character transition, the author number of the author can be cataloged in the author-name character-to-character transition probability table a314. In this case, the book-collection number for the book is found from the author-name table a320.

In addition, according to what is described above, the number of character appearances and the number of character-to-character transitions cataloged in each of the character-to-character transition probability tables, that is, the book-title character-to-character transition probability table, the author-name character-to-character transition probability table, the publisher character-to-character transition probability table and the keyword character-to-character transition probability table, are not used in the calculation of a degree of transition matching. That is to say, the use of the number of character appearances and the number of character-to-character transitions in such calculation is not indicated explicitly in the above description. It should be noted, however, that for example, the number of character-to-character transitions can be used as follows. Assume that there is a book with the title thereof including a low-probability character-to-character transition matching that in a specified string of characters used as a search key. That is to say, the character-to-character transition in the title of the book has a low number of character-to-character transitions cataloged in the book-title character-to-character transition probability table. In this case, the book can be deliberately treated like a book with a high degree of transition matching. This is because a low-probability character-to-character transition, that is, a rare character-tocharacter transition, indicates a characteristic peculiar to the title of the book in comparison with a high-probability character-to-character transition, that is, a common character-to-character transition.

Also, in the present embodiment, book data with a low weighted degree of transition matching can be omitted from the display. As an alternative, only a predetermined number of pieces of book data are displayed starting with one having the highest weighted degree of transition matching.

As described, according to the library searching system provided by the present embodiment, results of a search operation can be displayed in an order rearranged in accordance with weights and priority-order numbers set for a plurality of search keys. As a result, the user can obtain results of a search operation which are displayed in a format more conforming to the intention of the search.

As described above, according to the present invention, it is possible to provide a library search system capable of carrying out a search operation and presenting results of the search operation in a way and format more conforming to the search intended by the user.

The following description explains a technique for carrying out a search tolerating an ambiguous input, to be described in more detail later, with ease on a multi-item data base generally used by the user by merely adding search item attributes and simple information on a method for each search item. To be more specific, for each search item of a multi-item data, the user specifies: (1) whether or not a search operation is to be carried out; (2) a priority order among search items; and (3) attributes of each search item.

Then, a general search system creates a character-to-character transition index table to be used in the search tolerating an ambiguous input, a search that tolerates a partial error in an input string of characters or ambiguity of the meaning of an attribute. An example of the ambiguity of the "青 (blue)" color is that the word "青 (blue)" can mean "水色 (light blue)" or "紺 (dark blue)" and an example of a thing ambiguity is that the word "オレンジ (orange)" can mean "ネーブルオレンジ (navel orange)" or "みかん (tangerine)". The present invention provides embodiments for carrying out the following three kinds of search tolerating an ambiguous input:

[1] Search tolerating an ambiguous input using an analogy table such as a thesaurus,

[2] Search tolerating an ambiguous input to a multi-item data including non-text data such as pictures (not to be searched for); and

[3] Search tolerating an ambiguous input using a table of indexes each linking a character-to-character transition to a word.

[1] Search Tolerating an Ambiguous Input Using a Thesaurus

In the case of the present embodiment, it is possible to carry out a search operation wherein the use of an analogy table for each data attribute allows ambiguity of the meaning of an attribute to be tolerated. As described above, an example of the ambiguity of the "青 (blue)" color is that the word "青 (blue)" can mean "水色 (light blue)" or "紺 (dark blue)" and an example of thing ambiguity is that the word "オレンジ (orange)" can mean "ネーブルオレンジ (navel orange)" or "みかん (tangerine)".

Figure 36:
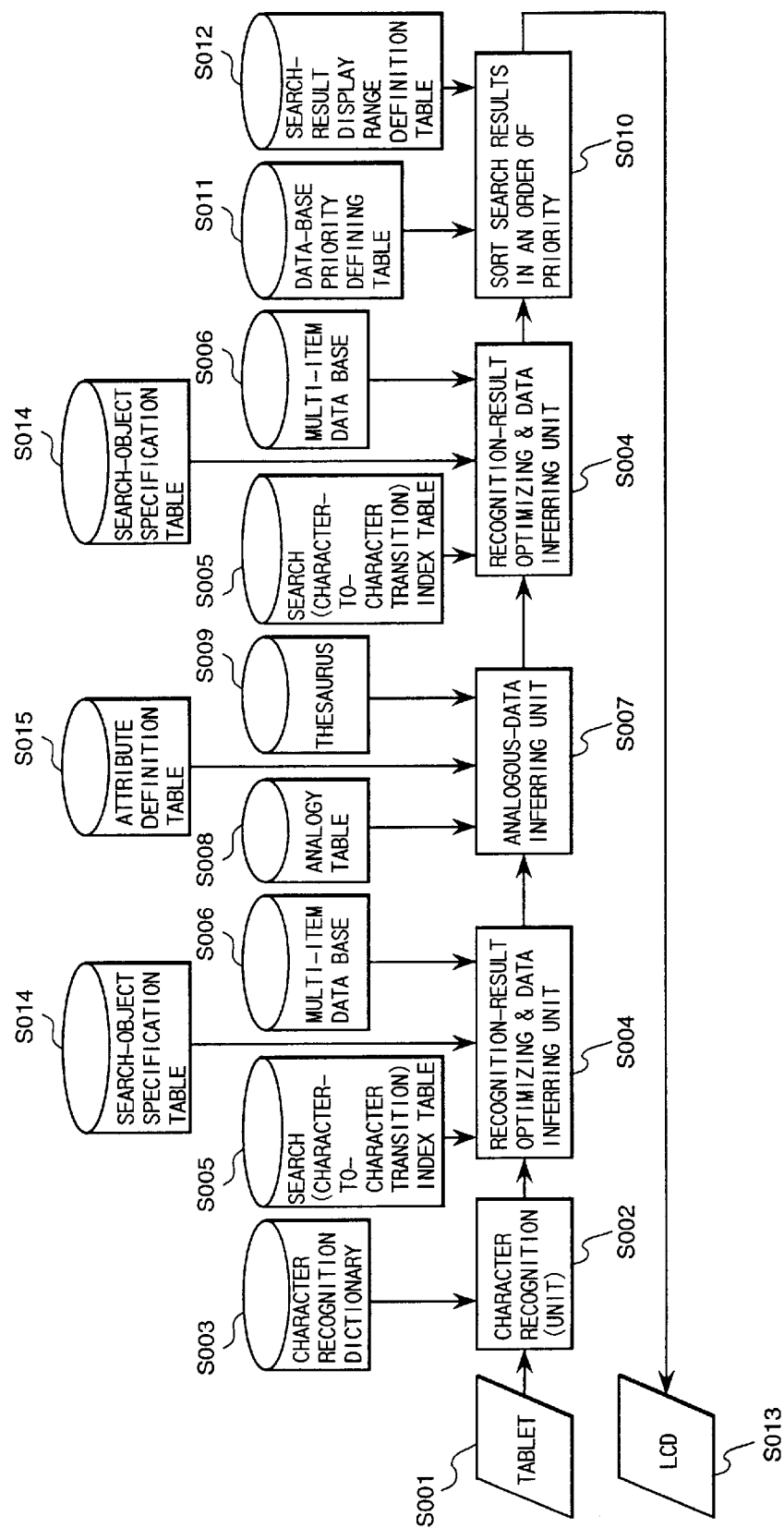
FIG. 36 is a diagram showing the configuration of a multi-item data base searching system tolerating an ambiguous input as implemented by an embodiment provided by the invention.

FIG. 36 is a diagram showing the configuration of a multi-item data base searching system tolerating an ambiguous input as implemented by an embodiment provided by the present invention. The operation of the embodiment will be explained in brief as follows. As shown in the figure, first of all, handwritten strokes are entered through a tablet S001. Then, a character recognition unit S002 recognizes the handwritten strokes by comparing them with a character recognition dictionary S003. The comparison results in strings of candidate characters. Then a recognition-result optimizing & data inferring unit S004 disassembles the candidate characters, strictly speaking, a plurality of strings of candidate characters, into pairs of two consecutive characters or character-to-character transitions. Each of the character-to-character transitions is correlated with a character-to-character transition index table S005 created in advance by a character-to-character transition index tool. If a character-to-character transition is found cataloged in the character-to-character transition index table S005, the character-to-character transition is treated as part of a candidate string of characters. The address of data including the specific candidate character-to-character transition in a multi-item data base S006 is also cataloged in the character-to-character transition index table S005, allowing the multi-item data base S006 containing the candidate string of characters to be accessed readily. In the processing described above, the strings of candidate characters are disassembled into character-to-character transitions and the character-to-character transition index table S005 is referenced in character-to-character transition units to result in candidate strings of characters which are cataloged in advance in the multi-item data base S006. As a result, the multi-item data base S006 can be searched even if there is a partial error in the string of characters entered to the tablet S001 or in the result output by the character recognizing unit S002.

In order to find data having a meaning close to the input data, hit data in the multi-item data base S006 is transferred to an analogous-data inferring unit S007. Each search item of the hit data is correlated with an analogy table prepared for the attribute of the search item. The name of an analogy table prepared for the attribute of a search item is cataloged in an attribute defining table. Data analogous to the hit data found in the analogy table is transferred to the recognition-result optimizing & data inferring unit S004. In this way, data in the multi-item data base S006 including analogous data can be accessed readily.

As described above, it is possible to search the multi-item data base S006 for data including a string of characters entered by way of the tablet S001 and analogous data with a meaning close to that of the hit data. Next, a priority is determined for each piece of found data in accordance with a definition provided by a data-base priority defining unit S011. Only some pieces of found data are then displayed on an LCD S013 piece after piece starting with a piece having the highest priority. The pieces of found data to be displayed are determined in accordance with a definition provided in a search-result display range definition table S012. In a search operation tolerating an ambiguous input, the number of pieces of data hit in the search operation is large. By displaying only some pieces of found data on the LCD S013 piece after piece starting with a piece having the highest priority, however, the user can select the desired data form the results of the search operation with ease.

The configuration of a general search system tolerating meaning ambiguity and an overview of the operation thereof using an analogy table containing analogous data such as a thesaurus have been explained above.

FIGS. 37(a) to (i) are diagrams showing outlines of tables used in the configuration of the general search system shown in FIG. 36. The contents of the tables are explained as follows.

Figure 37:
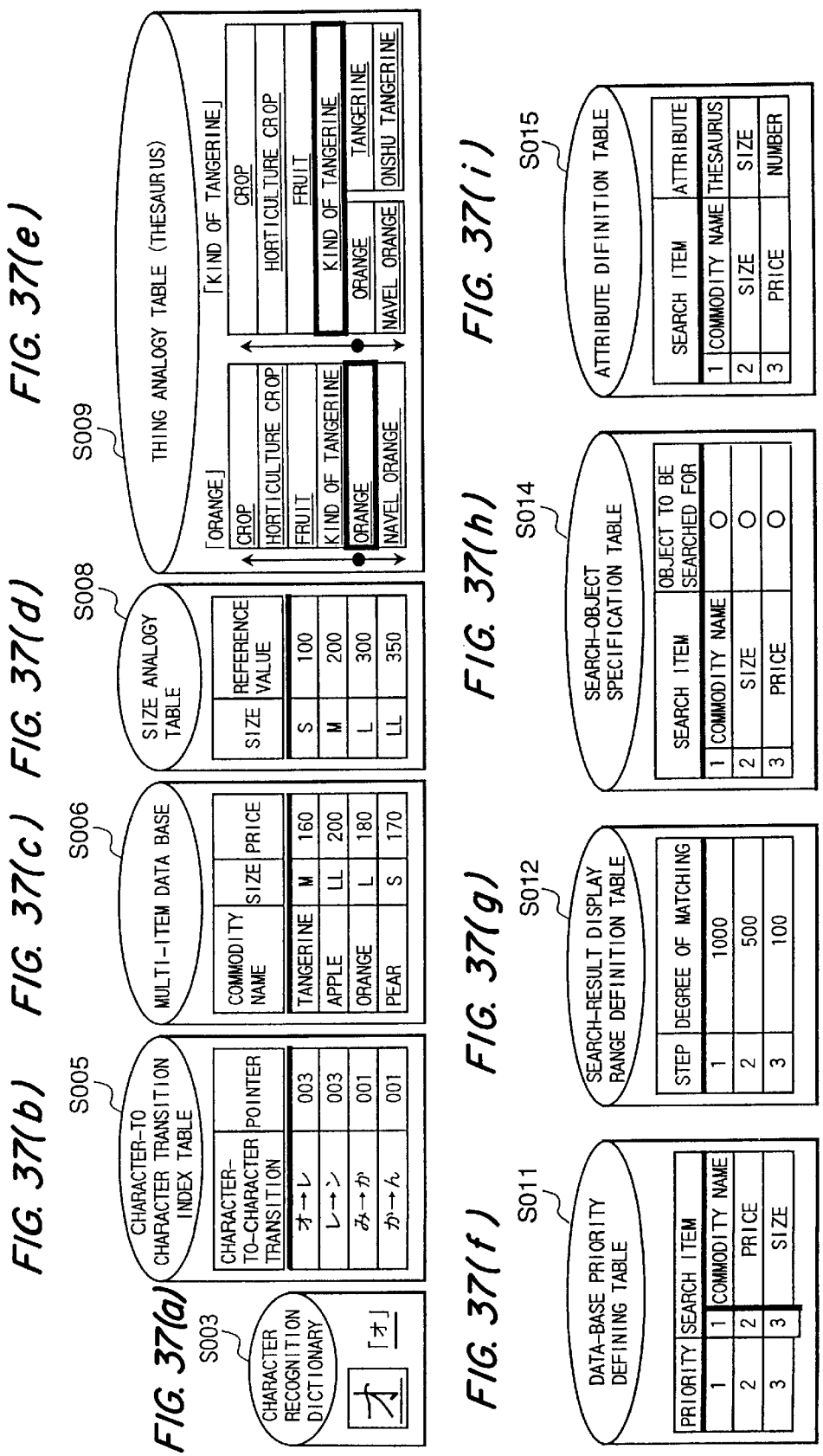
FIGS. 37(a) to 37(i) are diagrams showing tables used in the embodiment shown in FIG. 36.

First of all, reference numeral S003 shown in FIG. 37(a) is a character recognition dictionary. Typically, the character recognition table S003 is used for storing character patterns and their character codes.

Reference numeral S005 is the character-to-character transition index table for cataloging entries each showing a character-to-character transition (that is a pair of two consecutive characters) and an address in the multi-item data base S006 at which a string of characters including the character-to-character transition is cataloged in advance. The entries of the character-to-character transition index table S005 are each used as an index to a string of characters cataloged in the multi-item data base S006 when the multi-item data base S006 is searched for the string of characters. It should be noted that the character-to-character transition index table S005 is created automatically by a search index creating tool by disassembling multi-item data cataloged in the multi-item data base S006 into character-to-character transitions or pairs of two consecutive characters.

Reference numeral S006 is an example of the multi-item data base. As shown in the figure, each piece of data has three search items: search item Nos. 1 to 3 which represent the commodity name, the size and the price respectively.

Reference numeral S014 is a search-object specification table. The search-object specification table S014 is used for cataloging search items of the multi-item data base S006 that are used as a search object. The reason why the search-object specification table S014 is provided is that the multi-item data base S006 may contain data such as picture and musical data, objects difficult to search by the search based on a character string tolerating an ambiguous input. The use of the search-object specification table S014 allows search items to be clearly distinguished from non-search search items. In this examples, search item Nos. 1 to 3 which represent the commodity name, the size and the price respectively are all used as an object to be searched for.

Reference S015 is an attribute definition table for showing what attribute, that is, what property the data of each search item of the multi-item data base S006 has. In a search tolerating an ambiguous input, an analogy table for a search item indicated by an attribute cataloged in the attribute definition table S015 is referred to, allowing data with a close meaning to (that is, analogous to) the search item to be found.

Reference numeral S008 is an example of an analogy table. In this analogy table S008, analogies for the size search item are shown. To be more specific, in each entry of the analogy table S008, a value of the size search item and its reference value are cataloged. Sizes with a small difference in reference value are regarded as analogous sizes.

Reference numeral S009 is also an example of an analogy table. In this analogy table S009, analogies for general things such as goods denoted by the commodity-name search item. In this example, the analogy table S009 is implemented by a thesaurus which is a representative table for expressing analogies of general things. As shown in the example in the figure, each column in the thesaurus shows a thing and a list of goods related to the thing. The goods are classified into upper and lower hierarchical layers. The hierarchical layers are piled one on another, indicating that, the closer the hierarchical layers, the more analogous the goods at the layers.

As described above, the table S008 is a size analogy table showing analogies for the size search item whereas the table S009 is a thing analogy table showing analogies for the commodity-name search item as implemented by a thesaurus. Other analogy tables include tables showing analogies of all kinds of attribute such as color, brightness/darkness and fineness. A color analogy table will be explained in a next embodiment.

The analogy of an attribute may be obvious depending on the attribute. For example, the analogy of a numerical attribute is clear. In this case, it is not necessary to specially provide an analogy table for the numbers of the attribute. That is to say, such an attribute does not require an analogy table.

Reference numeral S011 is a data-base priority definition table. Results of a search operation may not match an input perfectly. For example, a piece of data has a matching commodity name while another has a matching size. By defining priority indicating an order as to which of the pieces of data with a matching commodity name and a matching size should be displayed first, the data close to information desired by the user can takes precedence over the other in the display.

As a result of a search tolerating an ambiguous input, in general, a number of candidates are obtained. It is quite within the bounds of possibility that a right candidate is difficult to select among all the candidates resulting from a search if they are displayed at the same time. In order to solve this problem, results of a search are displayed in a priority order step by step, starting with a step having the highest priority to be followed by those with lower priority.

Reference numeral S012 is an example of the search-result display range definition table. In this example, each entry of the search-result display range definition table S012 contains a display step and a number representing the degree of matching of data to be displayed at the step. The degree of matching of data is an indicator showing how much the data matches the input. In this example, the display steps are classified by degree of matching. It should be noted that the display steps can also be classified by search-result count or degree of difference.

The tables used in the search tolerating an ambiguous input have been described above by referring to FIGS. 37(a) to (i). In general, the user defines the multi-item data base S006, the search-object specification table S014, the data-base priority definition table S011 and the attribute definition table S015. On the other hand, the analogy tables S008 and S009 are provided by the search system in advance. A thesaurus that is generally used at the present time can be applied with ease to the search system.

Figure 38:
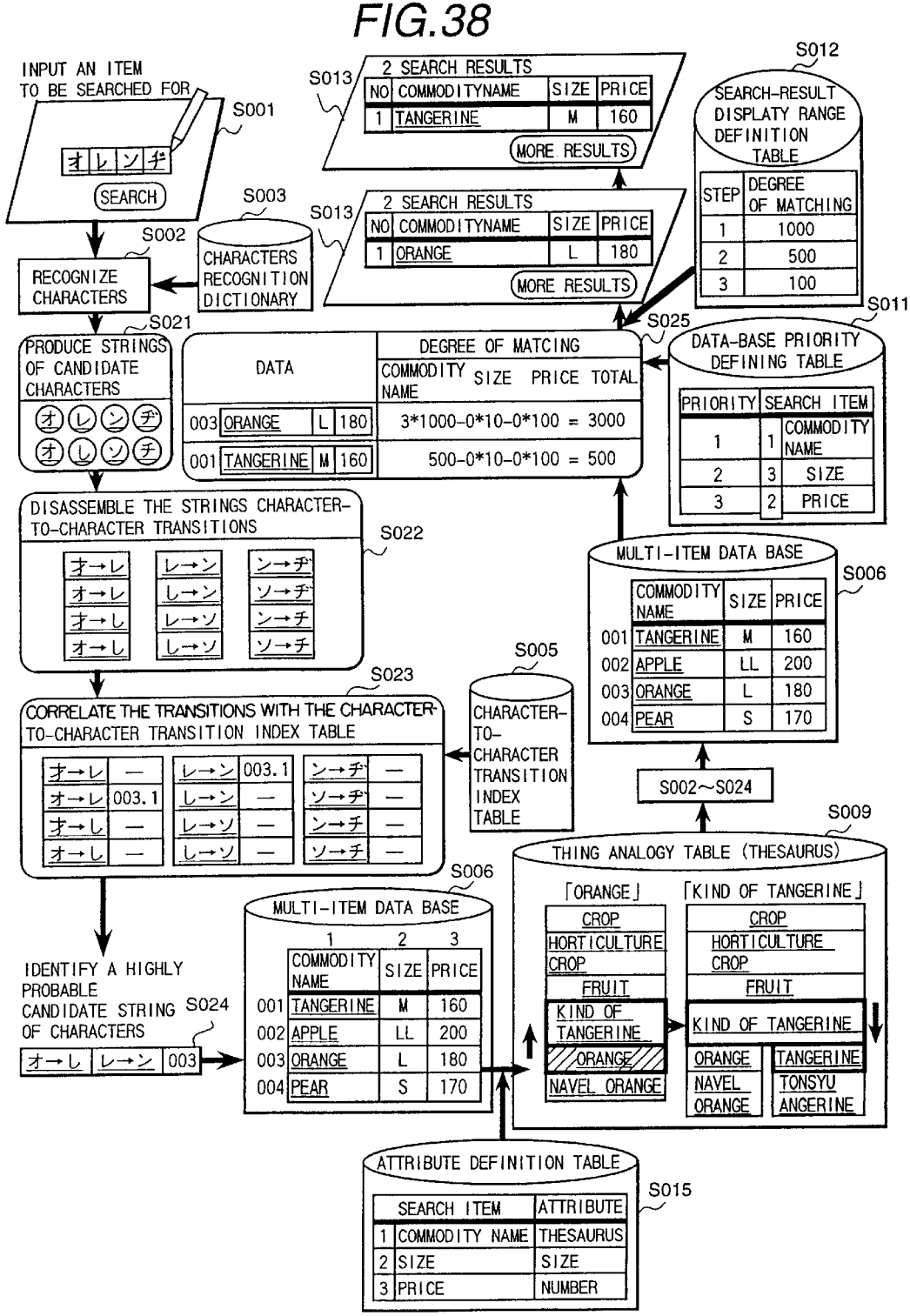
FIG. 38 is a schematic flow diagram showing processing of a search tolerating an ambiguous input.

Next, the processing flow of a search tolerating an ambiguous input is explained by referring to FIG. 38.

As shown in the figure, first of all, handwritten characters "オレンジ (orange)" are entered through the tablet S001. Then, the character recognition unit S002 recognizes the handwritten characters, outputting a first string of candidate characters "オレンジ (sairenji)" and a second string of candidate characters "オしソチ (oshisochi)" denoted by reference numeral S021 as a result of the character recognition. The processing flow then goes on to a step S022 at which the strings of candidate characters are disassembled into pairs of consecutive characters, resulting in transitions from candidate character to candidate character. The processing flow then goes on to a step S023 at which each of the transitions from a candidate character to a candidate character is correlated with the character-to-character transition index table S005. If a transition from a candidate character to a candidate character is found cataloged in the character-to-character transition index table S005, an address associated with the cataloged character-to-character transition is acquired. The address is a location in the multi-item data base S006 at which data containing the character-tocharacter transition is cataloged. In this example, the transitions from a candidate character to a candidate character "オ (o)" to "レ (re)" and "レ (re)" to "ン (ng)" are both cataloged in the character-to-character transition index table S005 and the associated addresses are both 003.1. The same address 003.1 associated with the transitions "オ (o)" to "レ (re)" and "レ (re)" to "ン (ng)" is used as an index to an address 003 in the multi-item data base S006 at which a highly probable candidate string of characters connected by a sandwiched character "レ (re)" is cataloged.

The processing flow then proceeds to a step S024 at which, by referring to the address 003 in the multi-item data base S006, data "オレンジ (orange), L, 180 yen" can be obtained readily. In this way, the data "オレンジ (orange), L, 180 yen" close to the handwritten input characters "オレンジ (orange)" is obtained. It should be noted that data having a meaning close to the handwritten input string of characters "オレンジ (orange)" can be further found. As is obvious from the attribute definition table S015, the thesaurus analogy table S009 is assigned to the commodity-name search item. Therefore, the commodity name "オレンジ (orange)" hit at the address 003.1 is provided with the thesaurus analogy table S009. By the way, commodity name "オレンジ (orange)" is cataloged as a search item in the thesaurus analogy table S009. As a concept hierarchically higher than the commodity name "オレンジ (orange)", "みかん類 (kind of tangerine) " is cataloged. Then, the search item " みかん類 (kind of tangerine)" is searched in the thesaurus S009 to find "みかん (tangerine)" in addition to "オレンジ (orange)" as a concept hierarchically lower than "みかん類 (kind of tangerine)". Here, "みかん (tangerine)" is taken as another candidate string of characters. By means of the same method as that used at the steps S022 to S024, data "みかん (tangerine), M, 160 yen" at an address 001 in the multi-item data base S006 that includes the candidate string of characters " みかん (tangerine)" is acquired.

The processing flow then goes on to a step S025 at which a degree of matching the handwritten input characters is calculated for each piece of data resulting from the search. The degree of matching is calculated from the number of hit characters in the data and the meaning closeness to the input string. In this example, the commodity name of the data " (orange), L, 180 yen" at the address 003 has three characters matching those of the input string. As obvious from the data-base priority definition table S011, the commodity-name search item has the highest priority. Thus, the data " オレンジ (orange), L, 180" is given 3*1,000=3,000 points. On the other hand, the data "みかん (tangerine), M, 160 yen" at the address 001 which was found as data with a commodity name analogous to the input string is given 500 points.

The processing flow then continues to a step S013 at which the data found by the search is displayed.

According to the search-result display range definition table S012, a first display step is defined as a step for displaying data with a degree of matching equal to or greater than 1,000 points while a second display step is defined as a step for displaying data with a degree of matching equal to or greater than 500 points. Therefore, at the step S013, only the data "オレンジ (orange), L, 180 yen" cataloged at the address 003 is displayed at the first step. If the user desires the next data to be displayed, the user requests a further display. In this case, the data " みかん (tangerine), M, 160 yen" cataloged at the address 001 is displayed at the second step.

The display of the results of the search terminates the flow of the processing carried out in the present embodiment.

[2] Search Tolerating an Ambiguous Input of Multi-Item Data Including Non-Text Data such as Pictures (not to be searched for).

The following description explains a search system tolerating an ambiguous input for searching a multi-item data base including data such as pictures excluded from the search based on a character string.

FIG. 39(a) is a diagram showing an example of the multi-item data base S006 that includes non-text data such as pictures. In general, a multi-item data base S006 including non-text data such as pictures is divided into a text data-base portion S006-1 and a non-text data-base portion S006-2. The text data-base portion S006-1 is linked to the non-text data-base portion S006-2 typically by pointers to picture data.

In the case of the multi-item data base S006, the search-object specification table S014 is used for clearly indicating objects to be searched for among pieces of data cataloged in the multi-item data base S006. For example, the search items car name, car color and model year are specified as objects to be searched for among pieces of information on cars while the search item picture pointer is treated as a non search object. By clearly indicating the objects to be searched for in this way, it is possible to search only search items appropriate for the search based on a character string even if the multi-item data base S006 contains data that is not appropriate for the search.

Much like what is described above, reference numeral S015 denotes an attribute definition table. In the attribute definition table S015, the car-name search item is treated as a general character string. A color attribute color and a number attribute are assigned to the car-color and model-year search items respectively.

Reference numeral S088 is a color analogy table. Color analogy is an analogy that can not be expressed by a one-dimensional representation. In this case, the analogy is expressed by a representation of two or more dimensions. In this example, a color is represented by vector coordinates while color analogy (or degree of difference) is expressed by a difference in vector.

FIG. 40 is a diagram showing the configuration of a search-index creating tool which works as follows. First of all, an automatic search-screen generating unit S031 checks the search-object specification table S014 in order to verify which search items cataloged in the text data-base portion S006-1 of the multi-item data base S006 are objects to be searched for. Then, the automatic search-screen generating unit S031 refers to the attribute definition table S015 to verify the attribute of the object to be searched for. Data of the search item to be searched for is analyzed in accordance with the attribute thereof in order to create a search (character-to-character transition) index table S005. A character-to-character transition index table S005-1, S005-2 or S005-3 can be created for each search item as shown in the figure. As an alternative, a character-to-character transition index table S005 common to all search items can be provided.

FIGS. 41(a) to (c) are diagrams showing examples of the character-to-character transition index tables S005-1, S500-2 and S500-3. In this example, the data of the car-name and car-color search items is disassembled into pairs of two consecutive characters or the so-called character-to-character transitions. A character-to-character transition and an address in the multi-item data base S006, at which a string of characters including the transition, form an entry for the character-to-character transition index table S005-1 and S500-2 for the car-name and car-color search items respectively. Since the attribute of the model-year search item is a number, a character-to-character transition index table S005-3 for the item model-year search item is created with the number portion thereof used as an index.

Figure 42:
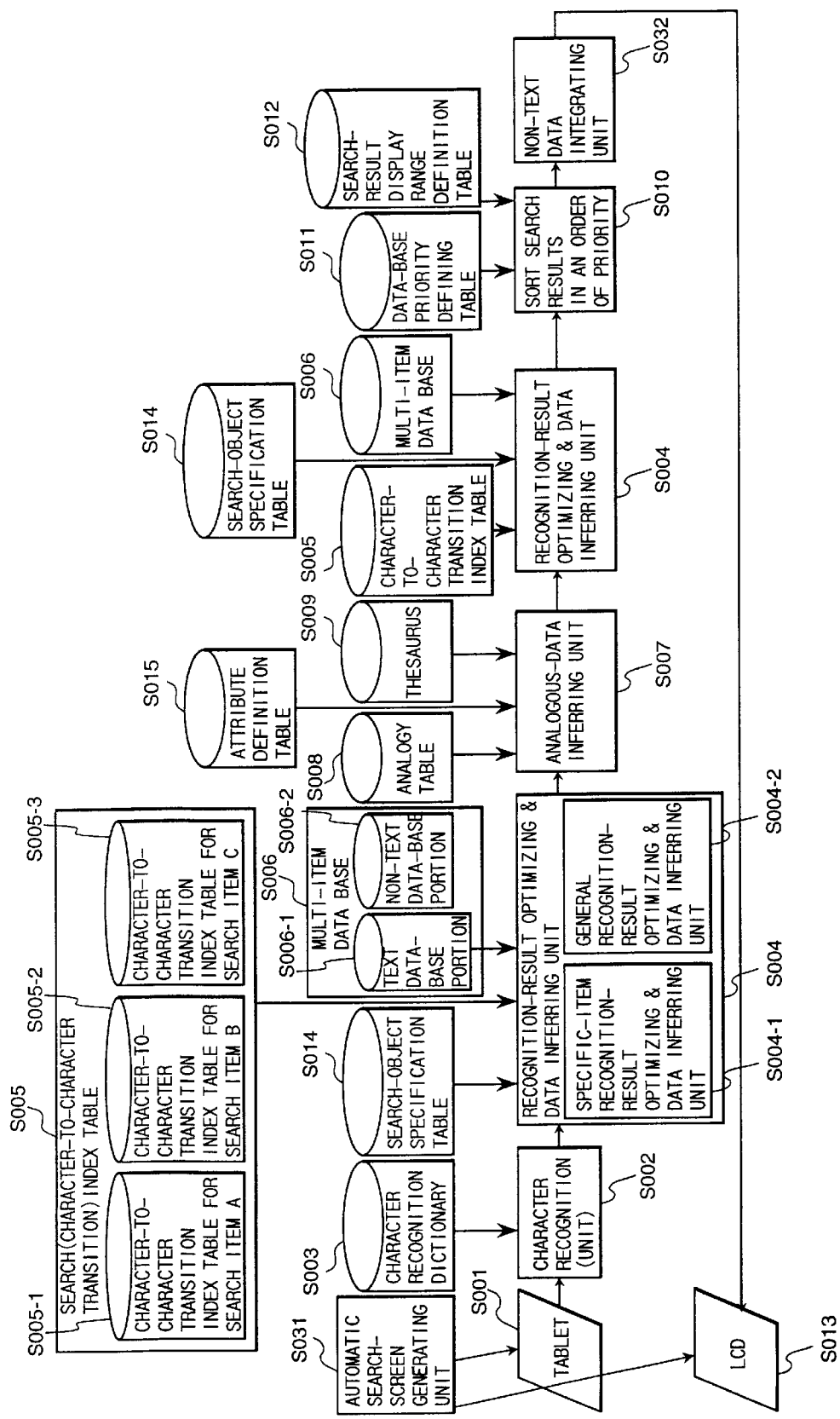
FIG. 42 is a diagram showing the configuration of a search system for searching a multi-item data base including non-text data such as pictures.

FIG. 42 is a diagram showing the configuration of the search system for searching a multi-item data base including non-text data such as pictures. Only those differences in the search system from what is shown in FIG. 36 are explained. In the case of the present embodiment, the automatic search-screen generating unit S031 automatically displays a search pallet even if the user or an application does not create a search screen. In addition, a plurality of character-to-character transition index tables are each provided for a search item as described above. Since a respective character-to-character transition index table is provided for each search item, the recognition-result optimizing & data inferring unit S004 is also divided into a specific-item recognition-result optimizing & data inferring unit S004-1 and a general recognition-result optimizing & data inferring unit S004-2. In addition, since the multi-item data base S006 is divided into the text data-base portion S006-1 and the non-text data-base portion S006-2 for storing non-text data such as pictures as described above, a non-text data integrating unit S032 is provided for merging non-text data such as a picture of the non-text data-base portion S006-2 with text data being displayed after the search of the text data-base portion S006-1 has been completed.

FIG. 43 is a diagram showing an example of a search keyword input pallet S041 created by the automatic search-screen generating unit S031. As shown in the figure, the search keyword input pallet S041 displays a keyword input frame of a search item of the multi-item data base S006 defined as an object to be searched for on the screen as an input frame to be used by the user to specify a search item. In addition, a free keyword input frame is also displayed as well. This free keyword input frame is used for specifying an input that is not defined as a search item. In the case for a string of characters entered to the free keyword input frame, the entered keyword is correlated with all the character-to-character transition index tables by a general search unit. Note that it is desirable to enter a string of characters to a keyword input frame with a character count thereof not exceeding a data length of the search item associated with the keyword input frame. If the keyword can not be accommodated in frame of the screen, a scroll bar is used.

FIG. 44 is a diagram an example of a search-result displaying pallet S043 created by the automatic search-screen generating unit S031. Results of a search may include a search item of an object not to be searched for such as a picture. As an alternative, a pointer to picture data is displayed as it is in a numeric-character format in place of the picture data itself.

Figure 45:
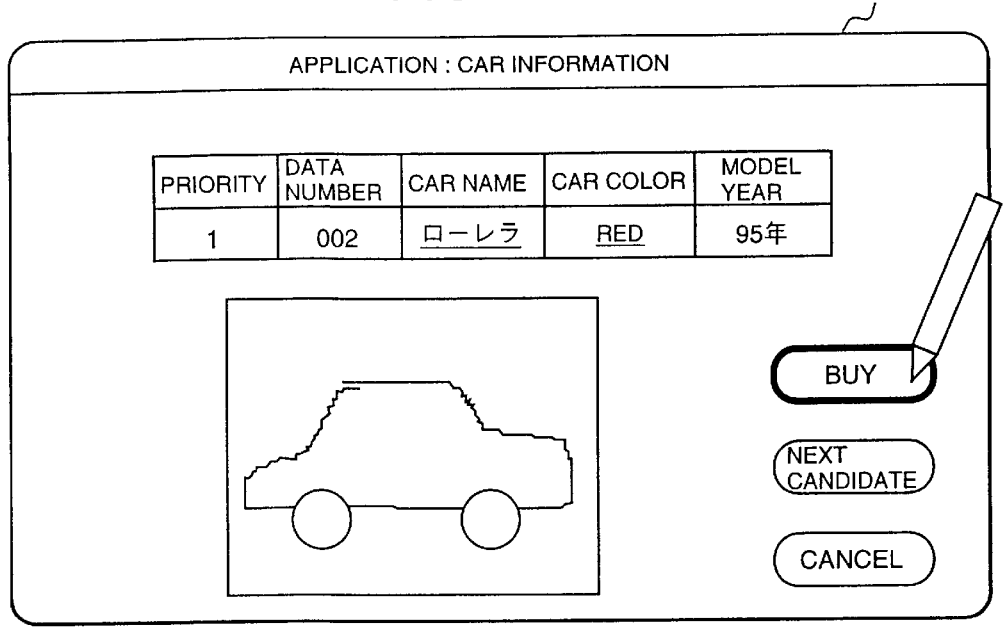
FIG. 45 is a diagram showing an example of a screen derived and displayed by an application from results of a search received from the search system.

FIG. 45 is a diagram showing an example of a screen which is displayed by an application program. The screen is derived by the application from results of a search received from the search system. In this example, it is the application that carries out processing involving a picture. That is to say, the search system can take partial charge of processing to the end by handling only the text-base portion S006-1.

Figure 46:
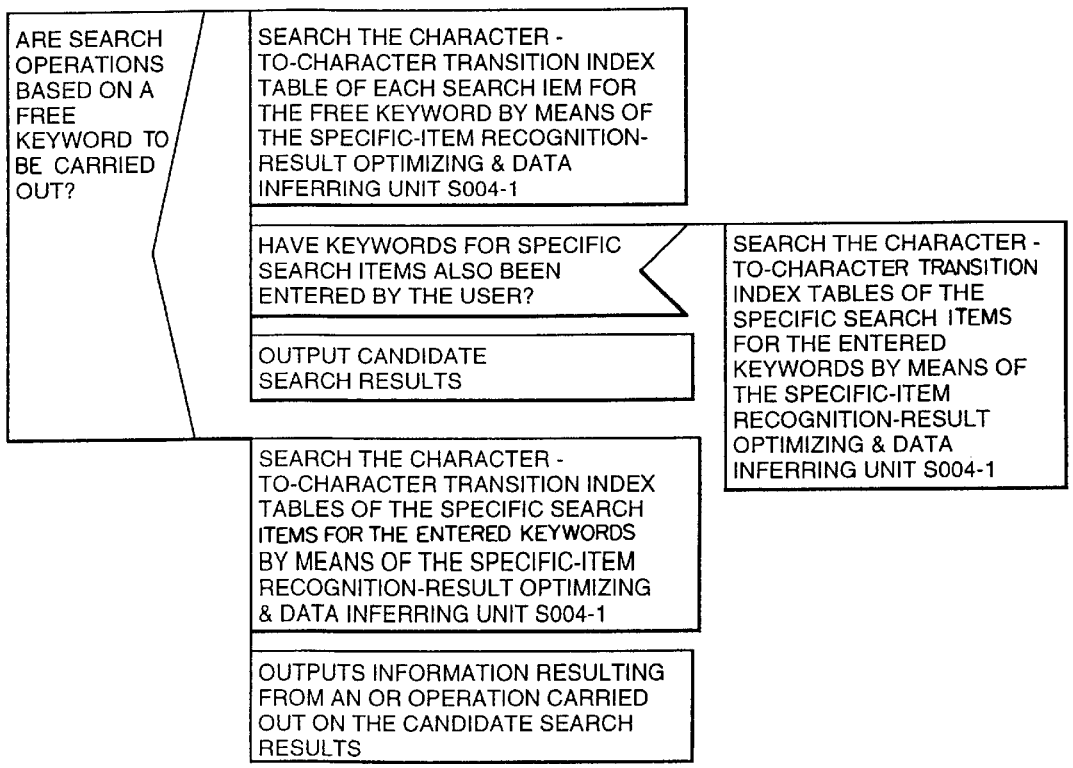
FIG. 46 is a schematic flow diagram showing processing carried out by a recognition-result optimizing & data inferring unit.

FIG. 46 is a schematic diagram showing a flow of processing carried out by the general recognition-result optimizing & data inferring unit S004-2. The processing is explained in brief as follows. If a keyword is entered to the free keyword frame of the search keyword input pallet S041, a search operation is carried out by referencing a character-to-character index table common to all search items to find pieces of data indicated by the keyword. In addition, if keywords are also entered to keyword input frames provided for specific search items as well, the specific-item recognition-result optimizing & data inferring unit S004-1 searches for pieces of data indicated by the keywords and outputs information resulting from combining (carrying out an OR operation on) the found pieces of data indicated by the keyword entered to the free keyword input frame and the keywords entered to the specific-item keyword input frames. If only keywords are entered to keyword input frames provided for specific search items with no keyword entered to the free keyword frame, on the other hand, only the specific-item recognition-result optimizing & data inferring unit S004-1 searches for pieces of data indicated by the keywords and outputs results of the search operations.

In the above description, there has been described a search system tolerating an ambiguous input for searching a multi-item data base including non-text data such as pictures excluded from the search based on a character string.

[3] Search Tolerating an Ambiguous Input Using a Table of Indexes each Linking a Character-To-Character Transitions to a Word FIGS. 47(*a*) to (*c*) are diagrams showing an outline of a search tolerating an ambiguous input using a table containing indexes each linking a character-to-character transition to a word and a degree of analogy for the index. As shown in the figure, the table is characterized in that information cataloged therein is comprised of indexes each used for associating a character-to-character transition with an entry which comprises data (or a word) containing the character-to-character transition, an analogy evaluation value of the data, the number of multi-item data containing the data (the word) cataloged in the multi-item data base or an address of the multi-item data in the multi-item data base. In this way, since each index includes a character-to-character transition, a search can be carried out by absorbing a small mistake such as a difference between a string of Japanese characters "カーデガン (written to mean a cardigan)" and another string of Japanese characters "カーディガン (also written to mean a cardigan)" as is the case with the embodiments implementing the search systems tolerating an ambiguous input described so far. It should be noted that the difference in Japanese spelling between the two strings of characters is caused by ambiguous results obtained in an attempt to write the pronunciation of the English word 'cardigan' in Japanese characters. It is a matter of course that a problem caused by a partial input mistake made by the user can also be overcome as well. The table is further structured with each index containing a word cataloged in the multi-item data base and by sorting the indexes in accordance with the analogy among the words, that is, in an ascending order of the analogy evaluation values. As a result, data containing a word analogous to a word detected in a search operation can also be found readily.

In this example, "カーディガン (cardigan), Size No. 9, (red), 5000 yen" is specified in the search keyword input pallet as data to be searched for. As a result of the search operation close to what is desired by the user, the following first data is obtained: "カーディガン (cardigan), 赤 (red), Size No. 9, 4,900 yen". As data analogous to the first data, the following second data is further resulted in readily: "カーディガン (cardigan), ワイン (wine), Size No, 9, 4,700 yen". Likewise, the following third data analogous to the first one is also obtained immediately: "カーディガン (cardigan), ピンク (pink), No. 9, 5,400 yen".

The description given above explains an outline of a search tolerating an ambiguous input using a table containing indexes each linking a character-to-character transition to a word and a degree of analogy for the index.

As described above, in the search of the multi-item data base, problems caused by an input mistake made by the user as well as partial imperfection of the multi-item data base itself can be overcome. Further, a search tolerating an ambiguous input can be carried out to also result in data that has a meaning close to the input as well.

What is claimed is:

1. A character recognition apparatus having recognition means for recognizing input character strings and display means for displaying recognized results, said character recognition apparatus comprising:

a word dictionary storing word identification information and hierarchy information for layering a plurality of words into a hierarchy and for recognizing each of said words within said hierarchy;

a character transition probability table storing at least probabilities of transitions from any one character to another, and those pieces of said word identification information which correspond to combinations of characters resulting from said transitions;

optimization means for using said character transition probability table in optimizing candidate character strings obtained by said recognition means; and retrieval means for searching through said word dictionary for words defined by those pieces of said word identification information which correspond to the optimized candidate character string, thereby retrieving the searched words which are identified by the applicable pieces of said hierarchy information and which have yet to be input.

2. A character recognition apparatus according to claim 1, wherein said hierarchy information is constituted by word identification information about the words higher in hierarchy than each of the words in said word dictionary.

3. A character recognition apparatus according to claim 2, wherein said retrieval means retrieves, as yet-to-be input words, words higher in hierarchy than those of said optimized character string from said word dictionary.

4. A character recognition apparatus having recognition means for recognizing input character strings and display means for displaying recognized results, said character recognition apparatus comprising:

a dictionary having each of a plurality of character strings stored beforehand at a specific address;

a character transition probability table storing at least probabilities of transitions from any one character to another, said probabilities being stored in correspondence with the addresses of those of said character strings which include combined characters involved in said transitions; and optimization means for using said character transition probability table in optimizing candidate character strings obtained by said recognition means;

wherein said dictionary is accessed for the addresses of the character strings corresponding to the optimized candidate character string, and wherein the character strings at said addresses in said dictionary are displayed as recognized results.

5. A character recognition apparatus according to claim 1 or 4, wherein said recognition means selects, from among a plurality of candidate character strings obtained by said recognition means, the candidate character string in which the probabilities of transitions from one character to another are higher than any other candidate character strings, whereby the optimized candidate character string is determined.

6. A character recognition apparatus according to claim 1 or 4, said character strings are handwritten for input.

7. A character recognition apparatus according to claim 1 or 4, said character strings are input by voice.

8. A pattern recognition apparatus having input means for inputting character patterns, recognition means for recognizing input character patterns, and display means for displaying recognized results, said pattern recognition apparatus comprising:

a word dictionary having a plurality of words stored beforehand;

a character transition probability table describing previously learned probabilities of transitions from any one character to another, and pointers to those words in said word dictionary which include said transitions;

pointer determination means for optimizing recognized candidate character strings based on said probabilities of said transitions and for detecting pointers to those words in said word dictionary which include the character-to-character transitions of said recognized candidate character strings; and inference means for matching the optimized candidate character string with those words in said word dictionary which are referenced by the corresponding pointers, and for inferring information about the referenced words from within said word dictionary.

9. A pattern recognition apparatus according to claim 8, wherein the words in said word dictionary are constituted by hierarchical data.

10. A pattern recognition apparatus according to claim 8, wherein said character patterns are handwritten for input, and wherein the candidate character strings inferred by said inference means are displayed in the vicinity of the handwritten input character patterns.

11. A pattern recognition apparatus according to claim 10, wherein, of the candidate character strings, those corresponding to said handwritten input character patterns are displayed either in reverse video or in a different font.

12. A pattern recognition method for recognizing input character patterns and displaying recognized results, said pattern recognition method comprising the steps of:

extracting candidate character strings from an input character pattern recognized;

optimizing the extracted candidate character strings by use of a character transition probability table describing previously learned probabilities of transitions from any one character to another, the probabilities being stored in correspondence with pointers to those words in a word dictionary which include said transitions;

detecting pointers to those words in said word dictionary which include the character-to-character transitions of the optimized candidate character string;

matching said optimized candidate character string with those words pointed to by the detected pointers from among said plurality of words stored in said word dictionary; and inferring information about the words in question from said word dictionary in order to display inferred results as the candidate character strings.

13. A pattern recognition method according to claim 12, wherein the words in said word dictionary are constituted by hierarchical data.

14. A pattern recognition method according to claim 12, wherein said character patterns are handwritten for input, and wherein the inferred candidate character strings are displayed in the vicinity of the handwritten input character patterns.

15. A pattern recognition method according to claim 14, wherein, of the candidate character strings, those corresponding to said handwritten input character patterns are displayed either in reverse video or in a different font.

* * * * *

UNITED STATES PATENT AND TRADEMARK OFFICE
CERTIFICATE OF CORRECTION

PATENT NO. : 6,097,841
DATED : August 1, 2000
INVENTOR(S) : Keiko Gunji et al.

It is certified that error appears in the above-identified patent and that said Letters Patent is hereby corrected as shown below:

<u>Title page,</u>
Item [56], References Cited, add the following:

-- U.S. PATENT DOCUMENTS
| | | |
|---|---|---|
| 4,654,875 | 3/1987 | Srihari et al |
| 5,377,281 | 12/1994 | Ballard et al |

FOREIGN PATENT DOCUMENTS
| | | |
|---|---|---|
| 02308384 | 12/1990 | Japan |
| 07093467 | 4/1995 | Japan -- |

Signed and Sealed this

First Day of April, 2003

JAMES E. ROGAN
*Director of the United States Patent and Trademark Office*